(12) United States Patent
Yamaguchi et al.

(10) Patent No.: US 8,628,885 B2
(45) Date of Patent: Jan. 14, 2014

(54) SECONDARY BATTERY AND ELECTRONIC DEVICE

(75) Inventors: Hiroyuki Yamaguchi, Fukushima (JP); Shunsuke Saito, Fukushima (JP); Toru Odani, Fukushima (JP); Masayuki Ihara, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 13/000,852

(22) PCT Filed: Jun. 30, 2009

(86) PCT No.: PCT/JP2009/061961
§ 371 (c)(1),
(2), (4) Date: Jun. 23, 2011

(87) PCT Pub. No.: WO2010/001892
PCT Pub. Date: Jan. 7, 2010

(65) Prior Publication Data
US 2011/0250509 A1    Oct. 13, 2011

(30) Foreign Application Priority Data

| Jul. 4, 2008 | (JP) | ................................ P2008-175936 |
| Aug. 13, 2008 | (JP) | ................................ P2008-208365 |
| Aug. 21, 2008 | (JP) | ................................ P2008-212832 |

(51) Int. Cl.
*H01M 6/16* (2006.01)

(52) U.S. Cl.
USPC ............ 429/328; 429/324; 429/344; 429/345

(58) Field of Classification Search
None
See application file for complete search history.

(56) References Cited

U.S. PATENT DOCUMENTS

| 5,660,951 A | 8/1997 | Yoshida |
| 2003/0228524 A1 | 12/2003 | Heider et al. |
| 2005/0238957 A1 | 10/2005 | Kim et al. |
| 2008/0311472 A1 | 12/2008 | Yamaguchi et al. |

FOREIGN PATENT DOCUMENTS

| JP | 1996-78058 | 3/1996 |
| JP | 1996-138745 | 5/1996 |
| JP | 200-243442 | 9/2000 |
| JP | 2000-268863 | 9/2000 |

(Continued)

OTHER PUBLICATIONS

Machine translation of JP 2005-197058, retrieved from <http://www19.ipdl.inpit.go.jp/PA1/cgi-bin/PA1DETAIL> on May 20, 2013.*

*Primary Examiner* — Cynthia K. Walls
(74) *Attorney, Agent, or Firm* — K&L Gates LLP

(57) ABSTRACT

A secondary battery capable of improving battery characteristics is provided. The secondary battery includes a cathode 21 containing a cathode active material capable of inserting and extracting an electrode reactant, an anode 22 containing an anode active material capable of inserting and extracting the electrode reactant, and an electrolyte containing a solvent and an electrolyte salt. At least one of the cathode 21, the anode 22, and the electrolyte contains a radical scavenger compound. The radical scavenger compound is a compound in which a group having a radical scavenger function exists as a matrix, to which one or more carboxylic metal bases or one or more sulfonic metal bases are introduced. Chemical stability of the cathode 21, the anode 22, or the electrolyte containing the radical scavenger compound is improved. Thus, at the time of charge and discharge, decomposition reaction of the electrolytic solution is easily inhibited.

8 Claims, 20 Drawing Sheets

(56) References Cited

FOREIGN PATENT DOCUMENTS

| JP | 2001-357874 | | 12/2001 | |
| JP | 2002-56891 | | 2/2002 | |
| JP | 2005-197058 | * | 7/2005 | .............. H01M 4/60 |
| JP | 2005-332606 | | 12/2005 | |
| JP | 2007-149535 | | 6/2007 | |
| JP | 2007-519186 | | 7/2007 | |
| JP | 2007-273395 | | 10/2007 | |
| JP | 2009-21229 | | 1/2009 | |
| JP | 2009-129893 | | 6/2009 | |

* cited by examiner

SECONDARY BATTERY AND ELECTRONIC DEVICE

CROSS REFERENCE TO RELATED APPLICATIONS

The present application is a national stage of International Application No. PCT/JP2008/061961 filed on Jun. 30, 2009 and claims priority to Japanese Patent Applications Nos. 2008-1175936 filed on Jul. 4, 2009, JP 2008-208365 filed on Aug. 13, 2008; and JP 2008-212832 filed on Aug. 21, 2008 the disclosures of which are incorporated herein by reference.

BACKGROUND

The present invention relates to a secondary battery including a cathode, an anode, and an electrolyte and an electronic device including a secondary battery.

In recent years, portable electronic devices such as a video camera, a digital still camera, a mobile phone, and a notebook personal computer have been widely used, and it is strongly demanded to reduce their size and weight and to achieve their long life. Accordingly, as a power source for the portable electronic devices, a battery, in particular, a light-weight secondary battery capable of providing a high energy density has been developed.

Specially, a secondary battery using insertion and extraction of lithium ions for charge and discharge reaction (so-called lithium ion secondary battery) is in practical use widely, since such a lithium ion secondary battery is able to provide a higher energy density than a lead battery and a nickel cadmium battery.

The lithium ion secondary battery includes an electrolyte together with a cathode and an anode. The cathode has a cathode active material layer containing a cathode active material on a cathode current collector. The anode has an anode active material layer containing an anode active material on an anode current collector. The electrolyte contains a solvent and an electrolyte salt dissolved therein.

As the anode active material, a carbon material such as graphite is widely used. In the carbon material, the crystal structure change at the time of inserting and extracting lithium ions is very little. Therefore, a battery capacity and the like are able to be stably obtained.

In recent years, as the high performance and the multi functions of the portable electronic devices are developed, further improvement of the battery capacity is demanded. Thus, it has been considered to use a high capacity material such as silicon and tin instead of the carbon material. Since the theoretical capacity of silicon (4199 mAh/g) or the theoretical capacity of tin (994 mAh/g) is significantly higher than the theoretical capacity of graphite (372 mAh/g), it is prospected that the battery capacity is thereby highly improved.

However, in such a lithium ion secondary battery, at the time of charge and discharge, the anode active material inserting lithium ions becomes highly active. Thus, the electrolyte becomes easily decomposed, and part of lithium ions becomes easily inactive. Thereby, battery characteristics such as sufficient cycle characteristics and swollenness characteristics are hardly obtained. Such a problem is significant in the case where the high capacity material is used as an anode active material.

To solve the foregoing problems of the lithium ion secondary battery, various studies have been made. For example, a technology to improve battery characteristics such as high temperature characteristics, storage characteristics, and cycle characteristics by containing various additives into an electrolyte has been proposed. As the additive, phenylsulfonic metal salt (for example, refer to Patent document 1), organic alkali metal borate (for example, refer to Patent document 2), 1,5-naphthaline-disulfonic sodium (for example, refer to Patent document 3), a compound containing a cyanoethyl group such as 2-cyanoethyl propionate (for example, refer to Patent document 4), a compound having a sulfonyl group and an unsaturated bond (for example, refer to Patent document 5) and the like are used. In addition, an aromatic compound such as biphenyl, terphenyl, cyclohexyl, benzene, and a derivative thereof is also used (for example, refer to Patent documents 6 to 9). Further, a technology of coating a surface of an electrode (specially a cathode) with an aliphatic nitrile compound such as adiponitrile in order to prevent thermorunaway at the time of overcharge (for example, refer to Patent document 10) or a technology of coating a surface of a carbon material used as an anode active material with a lithium alkoxide compound such as ethanediol dilithium in order to prevent lowering of battery capacity (for example, refer to Patent document 11) have been also proposed.

PRIOR ART DOCUMENTS

Patent Documents

Patent document 1: Japanese Unexamined Patent Application Publication No. 2002-056891
Patent document 2: Japanese Unexamined Patent Application Publication No. 2000-268863
Patent document 3: Japanese Unexamined Patent Application Publication No. 2001-357874
Patent document 4: Japanese Unexamined Patent Application Publication No. 2000-243442
Patent document 5: Japanese Unexamined Patent Application Publication No. 2007-273395
Patent document 6: Japanese Unexamined Patent Application Publication No. 09-106835
Patent document 7: Japanese Unexamined Patent Application Publication No. 2002-117895
Patent document 8: Japanese Unexamined Patent Application Publication No. 2004-281073
Patent document 9: Japanese Unexamined Patent Application Publication No. 2007-172969
Patent document 10: Japanese Unexamined Patent Application Publication No. 2007-519186
Patent document 11: Japanese Unexamined Patent Application Publication No. 08-138745

SUMMARY

However, although various studies have been made as described above, sufficient battery characteristics such as the cycle characteristics and the swollenness characteristics have not been obtained. Thus, further improvement of the battery characteristics has been aspired. In particular, in recent years, as the high performance and the multi functions of the portable electronic devices have been developed, and the electric consumption thereof tends to be increased. Therefore, improvement of the battery characteristics have been more and more aspired.

In view of the foregoing problem, it is an object of the present invention to provide a secondary battery capable of improving the battery characteristics and an electronic device including the same.

A first secondary battery of the present invention includes: a cathode containing a cathode active material capable of inserting and extracting an electrode reactant; an anode containing an anode active material capable of inserting and extracting the electrode reactant; and an electrolyte containing a solvent and an electrolyte salt, wherein at least one of the cathode, the anode, and the electrolyte contains a compound shown in Formula (1) or a nitrile compound shown in Formula (2). Further, an electronic device of the present invention includes the first secondary battery of the present invention.

[Chemical Formula 1]

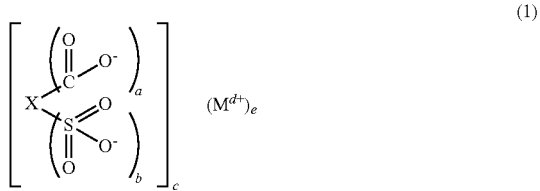

(1)

(x is a group with (a+b) valency having a radical scavenger function, and M is a metal element. a and b are an integer equal to or more than 0. c, d, and e are an integer equal to or more than 1. (a+b)≥1 is satisfied.)

[Chemical Formula 2]

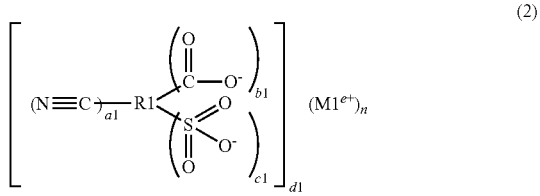

(2)

(R1 is a group with (a1+b1+c1) valency composed of an element selected from the group consisting of hydrogen (H), oxygen (O), and halogen elements and carbon (C), and M1 is a metal element. a1, d1, f1, and e1 are an integer equal to or more than 1. b1 and c1 are an integer equal to or more than 0. (b1+c1)≥1 is satisfied.)

A second secondary battery of the present invention includes: a cathode containing a cathode active material capable of inserting and extracting an electrode reactant; an anode containing an anode active material capable of inserting and extracting the electrode reactant; and an electrolyte containing a solvent and an electrolyte salt, wherein at least one of the cathode and the anode contains a compound shown in Formula (3).

[Chemical formula 3]

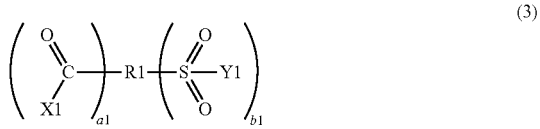

(3)

(R1 is a group with (a1+b1) valency including at least one of a benzene ring and a cyclohexane ring in the range from 2 to 5 in total. X1 and Y1 are a halogen group, a hydroxyl group, or a group expressed by —OM1. a1 and b1 are an integer equal to or more than 0. M1 is an alkali metal, an alkali earth metal, or an alkylsilyl group. a1 and b1 satisfy (a1+b1)≥1.)

According to the first secondary battery of the present invention, since at least one of the cathode, the anode, and the electrolyte contains the compound shown in Formula (1) or the nitrile compound shown in Formula (2), the chemical stability thereof is improved. Thereby, at the time of electrode reaction, the electrode reactant is easily inserted and extracted in the anode or the cathode, and decomposition reaction of the electrolyte is inhibited. Thus, the battery characteristics such as the cycle characteristics are able to be improved. Accordingly, the first secondary battery of the present invention is able to be suitably used, for example, as a power source for an electronic device such as a portable electronic device, an electric power tool, and a power source supply system.

According to the second secondary battery of the present invention, since at least one of the cathode and the anode contains the compound shown in Formula (3), the chemical stability of at least one of the anode and the cathode is improved compared to a case that at least one of the cathode and the anode does not contain the compound shown in Formula (3). Thus, at the time of charge and discharge, the cathode and the anode are hardly reacted with the electrolyte. Thus, the battery characteristics such as the cycle characteristics, the swollenness characteristics, and the reaction resistance characteristics are able to be improved. Accordingly, the second secondary battery of the present invention is able to be suitably used, for example, as a power source for an electronic device such as a portable electronic device, an electric power tool, and a power source supply system.

Additional features and advantages of the present invention are described in, and will be apparent from, the following Detailed Description and the Figures.

DETAILED DESCRIPTION

Figure 1:
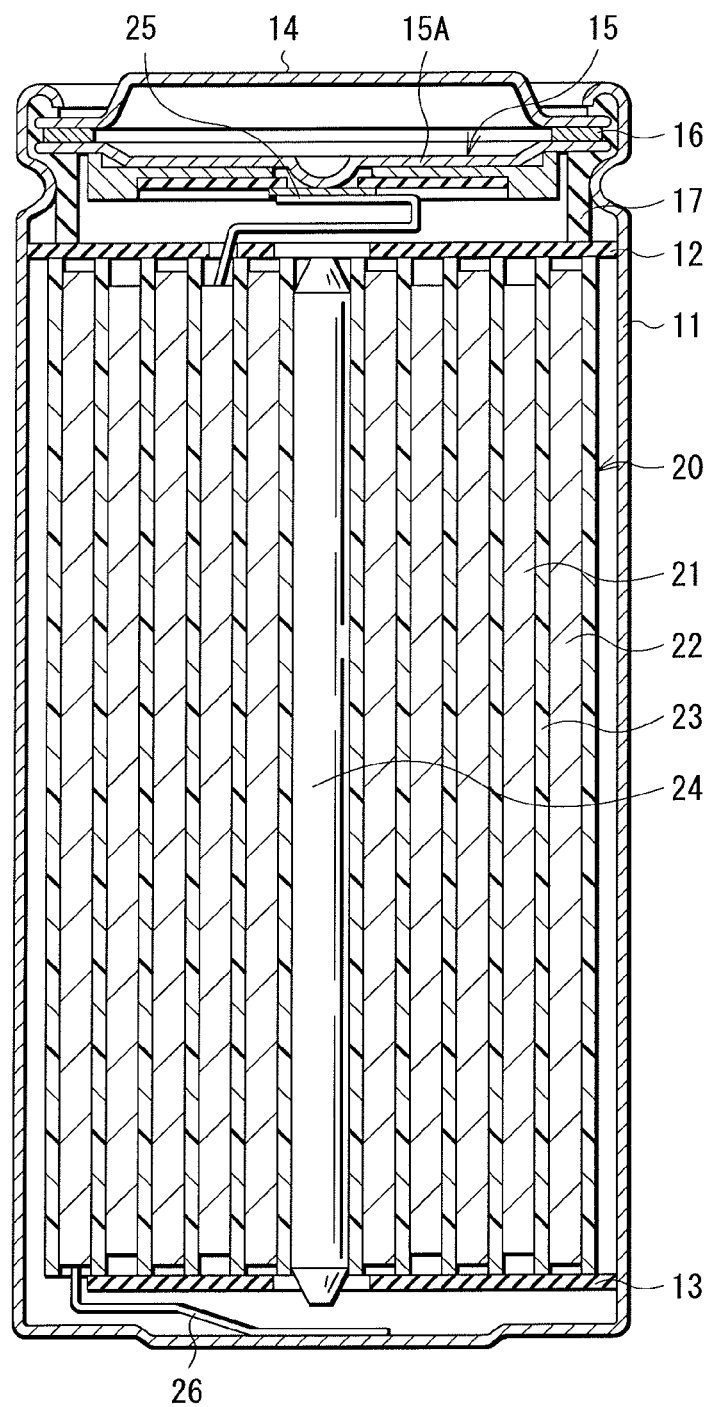
FIG. 1 is a cross sectional view illustrating a structure of a secondary battery (first secondary battery) according to a first embodiment of the present invention.

Embodiments of the present invention will be hereinafter described in detail with reference to the drawings.

First Embodiment

A secondary battery according to a first embodiment of the present invention includes an electrolyte together with a cathode and an anode. The cathode contains a cathode active material capable of inserting and extracting an electrode reactant. The anode contains an anode active material capable of inserting and extracting the electrode reactant. Further, the electrolyte contains a solvent and an electrolyte salt dissolved therein. In particular, at least one of the cathode, the anode, and the electrolyte contains a compound shown in Formula (1) (hereinafter referred to as "radical scavenger compound" as well). In this case, only one of the radical scavenger compounds shown in Formula (1) may be contained, or two or more thereof may be contained.

[Chemical Formula 4]

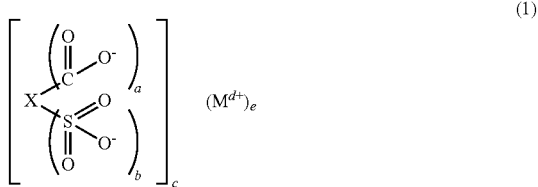

(x is a group with (a+b) valency having a radical scavenger function, and M is a metal element. a and b are an integer equal to or more than 0. c, d, and e are an integer equal to or more than 1. (a+b)≥1 is satisfied.)

In the case where the cathode contains the radical scavenger compound, for example, the radical scavenger compound is introduced into the cathode as a coat. Specifically, for example, in the case where the cathode has a cathode active material layer on a cathode current collector, a cathode coat containing the radical scavenger compound is provided on the cathode active material layer.

In the case where the anode contains the radical scavenger compound, for example, as in the foregoing cathode case, the radical scavenger compound is introduced into the anode as a coat. Specifically, for example, in the case where the anode has an anode active material layer on an anode current collector, an anode coat containing the radical scavenger compound is provided on the anode active material layer.

In addition, for example, the radical scavenger compound may be introduced into the cathode or the anode as a particle coating film. Specifically, for example, in the case where the cathode active material or the anode active material is composed of a plurality of particles, the particle coating film containing the radical scavenger compound is provided to coat the surface of the cathode active material or the anode active material.

In the case where the electrolyte contains the radical scavenger compound, for example, the radical scavenger compound is introduced into the electrolyte as an additive. Specifically, for example, the radical scavenger compound is dissolved or dispersed in the solvent of the electrolyte. In this case, all the radical scavenger compound may be dissolved therein, or only part thereof may be dissolved therein.

At least one of the cathode, the anode, and the electrolyte contains the radical scavenger compound for the following reason. That is, chemical stability of a component containing the radical scavenger compound is thereby improved. More specifically, in the case where the cathode or the anode contains the radical scavenger compound, the coat containing the radical scavenger compound functions as a protective film, and thus the cathode or the anode is stabilized chemically. Thereby, at the time of charge and discharge, the electrode reactant is easily inserted and extracted in the cathode or the anode, and decomposition reaction of the electrolyte is inhibited. Meanwhile, in the case where the electrolyte contains the radical scavenger compound, the radical scavenger compound functions as a stabilizer, and thus the electrolyte is stabilized chemically. Thereby, at the time of charge and discharge, decomposition reaction of the electrolyte is inhibited.

At least one of the cathode, the anode, and the electrolyte contains the radical scavenger compound. Thus, one of the cathode, the anode, and the electrolyte may contain the radical scavenger compound, a mixture of given two thereof may contain the radical scavenger compound, or all thereof may contain the radical scavenger compound.

Out of the cathode, the anode, and the electrolyte, the number of components containing the radical scavenger compound is preferably large as much as possible, since thereby higher effect is able to be obtained.

The radical scavenger compound shown in Formula (1) is a compound in which a group (X) having the radical scavenger function exists as a matrix, to which one or more carboxylic metal bases (—C(=O)—OM) or one or more sulfonic metal bases (—S(=O)$_2$—OM) are introduced. In this case, since a and b in Formula (1) are an integer equal to or more than 0, and (a+b)≥1 is satisfied, the radical scavenger compound has only the carboxylic metal base, has only the sulfonic metal base, or has both the carboxylic metal base and the sulfonic metal base. In the case where the radical scavenger compound has both the carboxylic metal base and the sulfonic metal base, the number of carboxylic metal bases may correspond with the number of sulfonic metal bases, or the number of carboxylic metal bases may be different from the number of sulfonic metal bases. c, d, and e in Formula (1) are determined by valency of the group (X) having the radical scavenger function, the number of carboxylic metal bases, the number of sulfonic metal bases, valency of a metal element (M) or the like.

The type of the group (X) having the radical scavenger function is not particularly limited as long as the group has the radical scavenger function. Examples of the group having the radical scavenger function include a group obtained by detaching at least one hydrogen group from edaravone, hindered phenol, ortho-methoxy-phenol, 1-naphthol, or phenol and a derivative thereof.

The foregoing "hindered phenol" is a compound in which phenolic hydroxyl group characteristics are inhibited by introducing a high dimension group such as an isobutyl group (—C(CH$_3$)$_3$) to an ortho position to a hydroxyl group (—OH) out of phenolic compounds. The high dimension group may be introduced to one of two ortho positions, or may be introduced to both positions.

Further, the foregoing "derivative" is obtained by, for example, introducing other group such as an alkylene group and a halogenated alkylene group to a location where at least one hydrogen group is detached out of edaravone or the like. In the case where such other group is the alkylene group or the halogenated alkylene group, the carbon number thereof is not particularly limited, but is preferably small as much as possible, for example, is preferably 2 or less. "Halogenated alkylene group" is a group obtained by substituting at least one hydrogen group with a halogen group out of an alkylene group. The type of halogen group in this case is not particularly limited, but is preferably, for example, a fluorine group (—F).

Specially, a group obtained by detaching at least one hydrogen group from edaravone or hindered phenol or a derivative thereof is preferable, since thereby chemical stability of the component containing the radical scavenger compound becomes sufficiently high.

The type of M (metal element) in Formula (1) is not particularly limited, but specially, an alkali metal element or an alkali earth metal element is preferable, and the alkali metal element is more preferable, since thereby chemical stability of the component containing the radical scavenger compound becomes sufficiently high. "Alkali earth metal" in the present invention includes berylium (Be) and magnesium (Mg), that is, represents a Group 2 element in the long period periodic table. Specifically, the Group 2 element represents berylium, magnesium, calcium (Ca), strontium (Sr), barium (Ba), and radium (Ra). The long period periodic table is shown in "Inorganic chemistry nomenclature (revised edition)" proposed by IUPAC (International Union of Pure and Applied Chemistry).

The type of M (metal element) in this case is preferably, for example, the same type of metal element as the electrode reactant. Specifically, for example, in the case where the electrode reactant is lithium ions, M is preferably lithium, since thereby higher effect is obtained.

Specific examples of the radical scavenger compound shown in Formula (1) include compounds shown in Formula (1-1) to Formula (1-9). More specifically, Formula (1-1) is a compound obtained by introducing a sulfonic lithium base to a location where one hydrogen group is detached from edaravone. Formula (1-2) to Formula (1-4) are a compound obtained by introducing a sulfonic lithium base to a location where one hydrogen group is detached from hindered phenol. Formula (1-5) and Formula (1-6) are a compound obtained by introducing an ethylene group to a location where one hydrogen group is detached and introducing a carboxylic lithium base or a sulfonic lithium base to an end of the ethylene group out of hindered phenol. Formula (1-7) is a compound obtained by introducing a sulfonic lithium base to a location where one hydrogen group is detached from ortho-methoxy-phenol. Formula (1-8) is a compound obtained by introducing a sulfonic lithium base to a location where one hydrogen group is detached from 1-naphthol. Formula (1-9) is a compound obtained by introducing a carboxylic lithium base or a sulfonic lithium base to a location where two hydrogen groups are detached from phenol. Specially, as described above, the compound shown in Formula (1-1) in which edaravone exists as a matrix or the compound shown in Formula (1-2) in which hindered phenol exists as a matrix is preferable.

[Chemical formula 5]

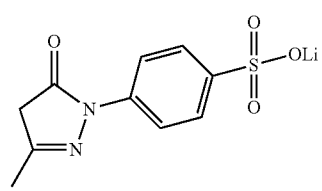

(1-1)

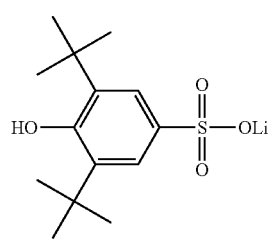

(1-2)

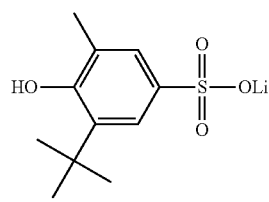

(1-3)

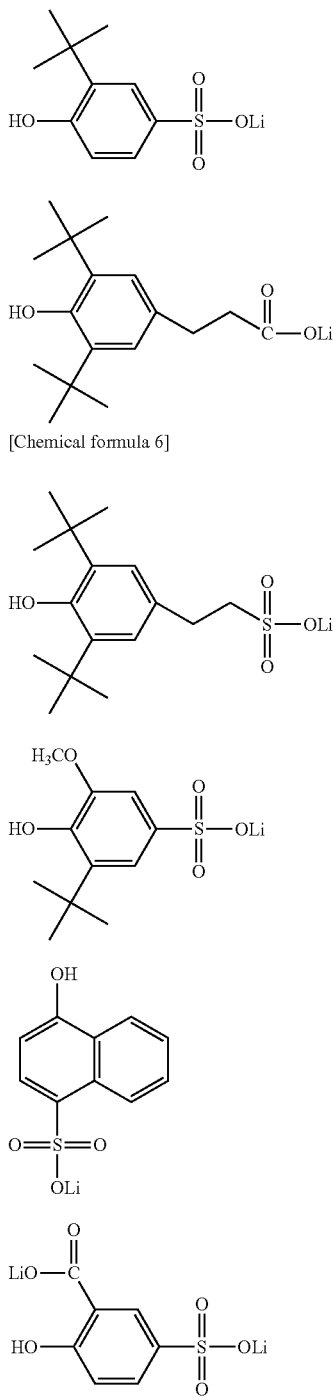

[Chemical formula 6]

(1-4)
(1-5)
(1-6)
(1-7)
(1-8)
(1-9)

The secondary battery is manufactured by forming or preparing at least one of the cathode, the anode, and the electrolyte to contain the radical scavenger compound.

Specifically, in the case where the cathode or the anode contains the radical scavenger compound, for example, a solution containing the radical scavenger compound is used. In other words, in the case where the cathode contains the radical scavenger compound, for example, the cathode active material layer is soaked in the solution containing the radical scavenger compound, or the surface of the cathode active material layer is coated with the solution containing the radical scavenger compound, and therefore a cathode coat containing the radical scavenger compound is formed. Further, in the case where the anode contains the radical scavenger compound, for example, in a procedure similar to the foregoing procedure of the cathode, the anode active material layer is soaked in the solution containing the radical scavenger compound, or the surface of the anode active material layer is coated with the solution containing the radical scavenger compound, and therefore an anode coat containing the radical scavenger compound is formed. In these cases, the radical scavenger compound contains a carboxylic metal base or a sulfonic metal base, and is a so-called soluble compound. Thus, as a solvent in which the radical scavenger compound is dispersed, water or the like is able to be used. Thus, cost for dispersion solvent is low, and evacuation facility or the like is not necessitated.

In the case where the electrolyte contains the radical scavenger compound, for example, after the radical scavenger compound is dissolved or dispersed in the solvent, the electrolyte salt is dissolved in the solvent.

According to the secondary battery and a manufacturing method thereof, at least one of the cathode, the anode, and the electrolyte contains the radical scavenger compound shown in Formula (1), that is, the radical scavenger compound having a carboxylic metal base or a sulfonic metal base. In this case, compared to a case that the radical scavenger compound shown in Formula (1) is not contained or a case that a radical scavenger compound not having a carboxylic metal base or a sulfonic metal base is contained, chemical stability of the cathode, the anode, and the electrolyte is improved. Thus, the cycle characteristics are able to be improved. In other words, in the secondary battery of this embodiment, the battery characteristics are able to be improved. Accordingly, the secondary battery of this embodiment is able to be suitably used, for example, as a power source for an electronic device such as a portable electronic device, an electric power tool, and a power source supply system.

In this case, in the case where the solution containing the radical scavenger compound is used for forming the cathode or the anode, the cathode or the anode containing the radical scavenger compound is able to be more stably and more easily formed compared to a case of using a method necessitating special environmental conditions such as reduced pressure environment.

In particular, in the case where the radical scavenger compound is the compound shown in Formula (1-1) or the compound shown in Formula (1-2), the superior cycle characteristics are able to be obtained.

Next, a description will be given in detail of the secondary battery according to this embodiment taking a specific example.

The secondary battery herein described is, for example, a lithium ion secondary battery in which the capacity of the anode is expressed based on insertion and extraction of lithium ions as an electrode reactant.

(First Secondary Battery)

Figure 2:
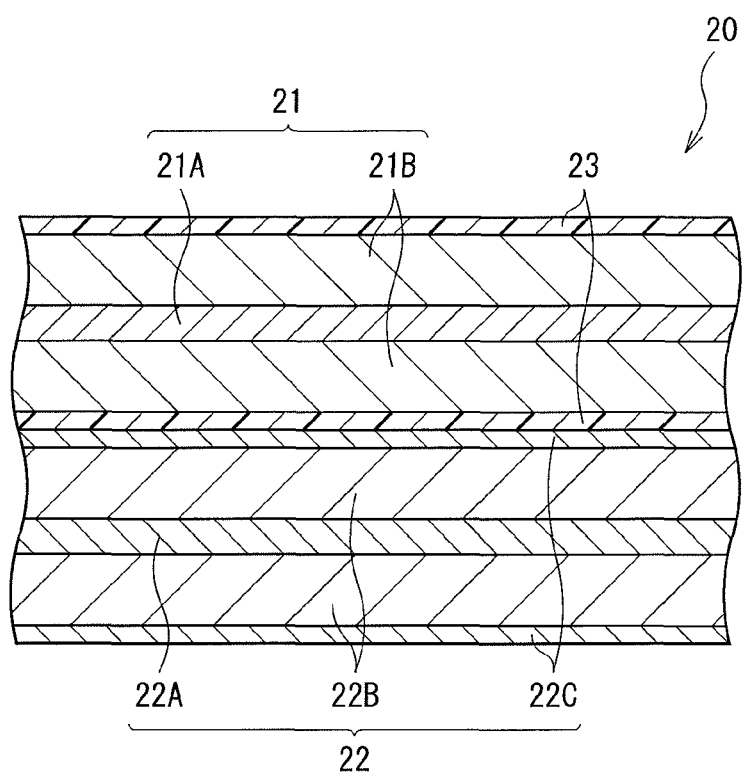
FIG. 2 is a cross sectional view illustrating an enlarged part of the wound electrode body illustrated in FIG. 1.

FIG. 1 and FIG. 2 illustrate a cross sectional structure of a first secondary battery. FIG. 2 illustrates an enlarged part of a wound electrode body 20 illustrated in FIG. 1. In the first secondary battery, for example, out of a cathode 21, an anode 22, and an electrolyte, the anode 22 contains a radical scavenger compound.

The secondary battery mainly contains the wound electrode body 20 in which the cathode 21 and the anode 22 are layered and spirally wound with a separator 23 in between and a pair of insulating plates 12 and 13 inside of a battery can 11 in the shape of an approximately hollow cylinder. The battery structure using such a cylindrical battery can 11 is called cylinder type.

The battery can 11 has a hollow structure in which one end of the battery can 11 is closed and the other end of the battery can 11 is opened. The battery can 11 is made of a metal material such as iron, aluminum, and an alloy thereof. In the case where the battery can 11 is made of iron, for example, plating of nickel or the like may be provided. The pair of insulating plates 12 and 13 is arranged to sandwich the wound electrode body 20 in between from the upper and the lower sides, and to extend perpendicularly to the spirally wound periphery face.

At the open end of the battery can 11, a battery cover 14, and a safety valve mechanism 15 and a PTC (Positive Temperature Coefficient) device 16 provided inside thereof are attached by being caulked with a gasket 17. Inside of the battery can 11 is thereby hermetically sealed. The battery cover 14 is made of, for example, a metal material similar to that of the battery can 11. The safety valve mechanism 15 is electrically connected to the battery cover 14 through the PTC device 16. In the safety valve mechanism 15, in the case where the internal pressure becomes a certain level or more by internal short circuit, external heating or the like, a disk plate 15A inverts to cut the electric connection between the battery cover 14 and the wound electrode body 20. As temperature rises, the PTC device 16 increases the resistance and thereby limits a current to prevent abnormal heat generation resulting from a large current. The gasket 17 is made of, for example, an insulating material. The surface of the gasket 17 is coated with, for example, asphalt.

For example, a center pin 24 is inserted in the center of the wound electrode body 20. In the wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by, for example, being welded to the safety valve mechanism 15. The anode lead 26 is, for example, welded and thereby electrically connected to the battery can 11.

In the cathode 21, for example, a cathode active material layer 21B is provided on both faces of a cathode current collector 21A having a pair of faces. However, the cathode active material layer 21B may be provided only on a single face of the cathode current collector 21A.

The cathode current collector 21A is made of, for example, a metal material such as aluminum, nickel, and stainless (SUS).

The cathode active material layer 21B contains, as a cathode active material, one or more cathode materials capable of inserting and extracting lithium ions. According to needs, the cathode active material layer 21B may contain other material such as a cathode binder and a cathode electrical conductor.

As the cathode material capable of inserting and extracting lithium ions, for example, a lithium-containing compound is preferable, since thereby a high energy density is able to be obtained. Examples of lithium-containing compounds include a composite oxide having lithium and a transition metal element as an element and a phosphate compound containing lithium and a transition metal element as an element. Specially, a compound containing at least one of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

Examples of the composite oxide having lithium and a transition metal element include a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ (z<1)), a lithium nickel cobalt manganese composite oxide ($Li_xNi_{(1-v-w)}Co_vMn_wO_2$ (v+w<1)), and lithium manganese composite oxide having a spinel structure ($LiMn_2O_4$). Specially, a composite oxide having cobalt is preferable, since thereby a high battery capacity is obtained and superior cycle characteristics are obtained. Further, examples of the lithium cobalt composite oxide include a composite oxide obtained by substituting part of cobalt with aluminum and magnesium ($LiCo_{(1-j-k)}Al_jMg_kO_2$) (0<j<0.1, 0<k<0.1)). Further, examples of the phosphate compound having lithium and a transition metal element include lithium iron phosphate compound ($LiFePO_4$) and a lithium iron manganese phosphate compound ($LiFe_{1-u}Mn_uPO_4$ (u<1)).

In addition, examples of the cathode material capable of inserting and extracting lithium ions include an oxide such as titanium oxide, vanadium oxide, and manganese dioxide; a disulfide such as titanium disulfide and molybdenum sulfide; a chalcogenide such as niobium selenide; sulfur; and a conductive polymer such as polyaniline and polythiophene.

It is needless to say that the cathode material capable of inserting and extracting lithium ions may be a material other than the foregoing compounds. Further, two or more of the foregoing cathode materials may be used by mixture voluntarily.

Examples of cathode electrical conductors include a carbon material such as graphite, carbon black, acetylene black, and Ketjen black. Such a carbon material may be used singly, or a plurality thereof may be used by mixture. The cathode electrical conductor may be a metal material, a conductive polymer or the like as long as the material has the electric conductivity.

Examples of cathode binders include a synthetic rubber such as styrene butadiene rubber, fluorinated rubber, and ethylene propylene diene; and a polymer material such as polyvinylidene fluoride. One thereof may be used singly, or a plurality thereof may be used by mixture.

In the anode 22, for example, an anode active material layer 22B and an anode coat 22C are provided in this order on both faces of an anode current collector 22A having a pair of faces. However, the anode active material layer 22B may be provided only on a single face of the anode current collector 22A. The same thing is applied to the anode coat 22C.

The anode current collector 22A is preferably made of a material having favorable electrochemical stability, favorable electric conductivity, and favorable mechanical strength. Examples of such a material include a metal material such as copper, nickel, and stainless. Specially, copper is preferable since a high electric conductivity is thereby obtained.

In particular, the material composing the anode current collector 22A preferably has one or more metal elements not forming an intermetallic compound with lithium ions as an element. In the case where the intermetallic compound is formed with lithium ions, lowering of the current collectivity characteristics and exfoliation of the anode active material layer 22B from the anode current collector 22A may occur, being affected by a stress due to expansion and shrinkage of the anode active material layer 22B at the time of charge and discharge. Examples of the foregoing metal element include copper, nickel, titanium (Ti), iron, and chromium (Cr).

Further, the material composing the anode current collector 22A preferably has one or more metal elements being alloyed with the anode active material layer 22B as an element. Thereby, the contact characteristics between the anode current collector 22A and the anode active material layer 22B are improved, and thus the anode active material layer 22B is hardly exfoliated from the anode current collector 22A. Examples of a metal element that does not form an intermetallic compound with lithium ions and is alloyed with the anode active material layer 22B include copper, nickel, and iron. These metal elements are preferable in view of the physical strength and the electric conductivity as well.

The anode current collector 22A may have a single layer structure or a multilayer structure. In the case where the anode current collector 22A has the multilayer structure, for example, it is preferable that the layer adjacent to the anode active material layer 22B is made of a material being alloyed with the anode active material layer 22B, and layers not adjacent to the anode active material layer 22B are made of other material.

The surface of the anode current collector 22A is preferably roughened. Thereby, due to the so-called anchor effect, the contact characteristics between the anode current collector 22A and the anode active material layer 22B are improved. In this case, it is enough that the surface of the anode current collector 22A is roughened at least in the region opposed to the anode active material layer 22B. Examples of roughening method include a method of forming fine particles by electrolytic treatment. The electrolytic treatment is a method that the fine particles are formed on the surface of the anode current collector 22A by using electrolytic method in an electrolytic bath, and thereby concavity and convexity is provided for the surface. A copper foil formed by using the electrolytic treatment including the foregoing copper foil roughened by the electrolytic treatment is generally called "electrolytic copper foil."

The anode active material layer 22B contains, as an anode active material, one or more anode materials capable of inserting and extracting lithium ions. If necessary, the anode active material layer 22B may contain other material such as an anode binder and an anode electrical conductor. Details for the anode binder and the anode electrical conductor are similar to those of the cathode electrical conductor and the cathode binder respectively described above.

Examples of the anode material include a material that is capable of inserting and extracting lithium ions, and has at least one of metal elements and metalloid elements as an element, since a high energy density is thereby obtained. Such a material may be a simple substance, an alloy, or a compound of a metal element or a metalloid element, or may have one or more phases thereof at least in part. In the present invention, "alloys" include an alloy having one or more metal elements and one or more metalloid elements, in addition to an alloy composed of two or more metal elements. Further, "alloy" may have a nonmetallic element. The structure thereof includes a solid solution, a eutectic crystal (eutectic mixture), an intermetallic compound, and a structure in which two or more thereof coexist.

Examples of the foregoing metal element or the foregoing metalloid element include a metal element or a metalloid element capable of forming an alloy with lithium. Specific examples thereof include magnesium (Mg), boron (B), aluminum, gallium (Ga), indium (In), silicon, germanium, tin, lead (Pb), bismuth (Bi), cadmium (Cd), silver (Ag), zinc, hafnium (Hf), zirconium (Zr), yttrium (Y), palladium (Pd), and platinum (Pt). Specially, at least one of silicon and tin is preferable, and silicon is more preferable. Silicon has the high ability to insert and extract lithium ions, and provides a high energy density.

Examples of a material having at least one of silicon and tin include the simple substance, an alloy, or a compound of silicon; the simple substance, an alloy, or a compound of tin; and a material having one or more phases thereof at least in part.

Examples of a material having the silicon simple substance include a material having the silicon simple substance as a main component. The anode active material layer 22B containing such a material has, for example, a structure in which an element other than silicon and oxygen exist between layers composed of the silicon simple substance. The total content of silicon and oxygen in the anode active material layer 22B is preferably 50 wt % or more, and in particular, the content of silicon simple substance is preferably 50 wt % or more. Examples of the element other than silicon include titanium, chromium, manganese, iron, cobalt, nickel, copper, zinc, indium, silver, magnesium, aluminum, germanium, tin, bismuth, and antimony (Sb). The anode active material layer 22B containing the material having the silicon simple substance as a main component is formed by, for example, co-evaporating silicon and other element.

Examples of alloys of silicon include an alloy having at least one metal element selected from the group consisting of tin, nickel, copper, iron, cobalt, manganese, zinc, indium, silver, titanium, germanium, bismuth, antimony (Sb), and chromium as an element other than silicon. Examples of compounds of silicon include a compound having a nonmetal element such as oxygen (O) and carbon (C) and a compound having the metal element described for the alloy of silicon as an element other than silicon. Examples of alloys or compounds of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO.

Examples of alloys of tin include an alloy having at least one metal element selected from the group consisting of silicon, nickel, copper, iron, cobalt, manganese, zinc, indium, silver, titanium, germanium, bismuth, antimony, and chromium as an element other than tin. Examples of compounds of tin include a compound having a nonmetal element such as oxygen and carbon and a compound having the metal element described for the alloy of tin as an element other than tin. Examples of alloys or compounds of tin include $SnO_w$ ($0<w\leq2$), $SnSiO_3$, $LiSnO$, and $Mg_2Sn$.

In particular, as a material having at least one of silicon and tin, for example, a material having the second element and the third element in addition to tin as the first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved.

Specially, an SnCoC-containing material that has tin, cobalt, and carbon as an element in which the carbon content is from 9.9 wt % to 29.7 wt % both inclusive, and the cobalt ratio to the total of tin and cobalt (Co/(Sn+Co)) is from 20 wt % to 70 wt % both inclusive is preferable. In such a composition range, a high energy density is able to be obtained.

The SnCoC-containing material may further have other element according to needs. Examples of other elements include silicon, iron, nickel, chromium, indium, niobium, germanium, titanium, molybdenum, aluminum, phosphorus, gallium, and bismuth. Two or more thereof may be contained, since thereby higher effect is obtained.

The SnCoC-containing material has a phase containing tin, cobalt, and carbon. Such a phase preferably has a low crystalline structure or an amorphous structure. The phase is a reaction phase capable of being reacted with lithium ions. The half bandwidth of the diffraction peak obtained by X-ray diffraction of the phase is preferably 1.0 degree or more based on diffraction angle of $2\theta$ in the case where $CuK\alpha$ ray is used as a specific X-ray, and the insertion rate is 1 degree/min. Thereby, lithium ions are more smoothly inserted and extracted, and reactivity with the electrolyte is decreased.

It is easily determined whether or not the diffraction peak obtained by X-ray diffraction corresponds to the reaction phase capable of being reacted with lithium ions by comparing an X-ray diffraction chart before the electrochemical reaction with lithium ions to an X-ray diffraction chart after the electrochemical reaction with lithium ions. For example, if the diffraction peak position in the X-ray diffraction chart after the electrochemical reaction with lithium ions is changed from the diffraction peak position in the X-ray diffraction chart before the electrochemical reaction with lithium ions, the diffraction peak obtained by X-ray diffraction of the phase corresponds to the reaction phase capable of being reacted with lithium ions. In this case, for example, the diffraction peak of the low crystalline or amorphous reaction phase is shown in the range from $2\theta$=from 20 degrees to 50 degrees both inclusive. The low crystalline or amorphous reaction phase contains, for example, the foregoing respective elements. The low crystalline or amorphous reaction phase may be mainly realized by carbon.

The SnCoC-containing material may have a phase having a simple substance of each element or part thereof, in addition to the low crystalline or the amorphous phase.

In particular, in the SnCoC-containing material, at least part of carbon as an element is preferably bonded with a metal element or a metalloid element as other element. Cohesion or crystallization of tin or the like is thereby inhibited.

Examples of measurement methods for examining bonding state of elements include X-ray Photoelectron Spectroscopy (XPS). XPS is a method for examining element composition and element bonding state in the region up to several nm from the sample surface by irradiating the sample surface with soft X-ray (in a commercial device, Al—$K\alpha$ ray or Mg—$K\alpha$ ray is used) and measuring motion energy of a photoelectron jumping out from the sample surface.

The bound energy of an inner orbit electron of an element is changed correlatively to the charge density on the element in an initial approximate manner. For example, in the case where the charge density of carbon element is decreased by interaction with an element existing in the vicinity thereof, an outer electron such as 2p electron is decreased, and thus is electron of carbon element is subject to strong binding force by the shell. In other words, in the case where the charge density of the element is decreased, the bound energy becomes high. In XPS, in the case where the bound energy becomes high, the peak is shifted to a higher energy region.

In XPS, in the case where energy calibration is made so that the peak of 4f orbit of gold atom (Au4f) is obtained in 84.0 eV, the peak of is orbit of carbon (C1s) is shown in 284.5 eV for graphite, and the peak is shown in 284.8 eV for surface contamination carbon. Meanwhile, in the case of higher charge density of carbon element, for example, if carbon is bonded with an element that is more positive than carbon, the peak of C1s is shown in the region lower than 284.5 eV. In other words, in the case where at least part of carbon contained in the SnCoC-containing material is bonded with the metal element or the metalloid element as other element, the peak of the composite wave of C1s obtained for the SnCoC-containing material is shown in the region lower than 284.5 eV.

In the case where the sample surface is covered with surface contamination carbon, the sample surface is preferably slightly sputtered by using an argon ion gun attached to an XPS device. Further, for example, if the SnCoC-containing material as a measuring target exists in the anode of the secondary battery, it is preferable that after the secondary battery is disassembled and the anode is taken out, the anode is washed with a volatile solvent such as dimethyl carbonate in order to remove a low volatile solvent and an electrolyte salt existing on the surface of the anode. Such sampling operation is desirably performed under the inactive atmosphere.

Further, in XPS measurement, for example, the peak of C1s is used for calibrating the energy axis of spectrums. Since surface contamination carbon generally exists on a material surface, the peak of C1s of the surface contamination carbon is set to in 284.8 eV, which is used as an energy reference value. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference value (284.8 eV).

The SnCoC-containing material is able to be formed by, for example, mixing raw materials of respective elements, dissolving the resultant mixture in an electric furnace, a high frequency induction furnace, an arc melting furnace or the like and subsequently solidifying the resultant. Otherwise, the SnCoC-containing material may be formed by various atomization methods such as gas atomizing and water atomizing; various roll methods; a method using mechanochemical reaction such as mechanical alloying method and mechanical milling method or the like. Specially, the method using mechanochemical reaction is preferable, since thereby the SnCoC-containing material easily becomes the low crystalline structure or the amorphous structure. In the method using the mechanochemical reaction, for example, a manufacturing apparatus such as a planetary ball mill apparatus and an attritor is able to be used.

As the raw material, a mixture of simple substances of the respective elements may be used, but an alloy is preferably used for part of elements other then carbon. In the case where carbon is added to the alloy and thereby the material is synthesized by the method using mechanical alloying method, the low crystalline structure or the amorphous structure is easily obtained and reaction time is shortened as well. The state of the raw material may be powder or a mass.

As a material having at least one of silicon and tin, in addition to the foregoing SnCoC-containing material, an SnCoFeC-containing material having tin, cobalt, iron, and carbon as an element is also preferable. The composition of the SnCoFeC-containing material is able to be voluntarily set. For example, as a composition in which the iron content is set small, it is preferable that the carbon content is from 9.9 wt % to 29.7 wt % both inclusive, the iron content is from 0.3 wt % to 5.9 wt % both inclusive, and the cobalt ratio to the total of tin and cobalt (Co/(Sn+Co)) is from 30 wt % to 70 wt % both inclusive. Further, for example, as a composition in which the iron content is set large, it is preferable that the carbon content is from 11.9 wt % to 29.7 wt % both inclusive, the ratio of the total of cobalt and iron to the total of tin, cobalt, and iron ((Co+Fe)/(Sn+Co+Fe)) is from 26.4 wt % to 48.5 wt % both inclusive, and the cobalt ratio to the total of cobalt and iron (Co/(Co+Fe)) is from 9.9 wt % to 79.5 wt % both inclusive. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

Further, examples of anode material include a carbon material. Specific examples of carbon material include graphitizable carbon, non-graphitizable carbon in which the spacing of (002) plane is 0.37 nm or more, and graphite in which the spacing of (002) plane is 0.34 nm or less. More specific examples include pyrolytic carbon, coke, graphite, glassy carbon fiber, an organic polymer compound fired body, carbon fiber, activated carbon, and carbon black. Of the foregoing, the coke includes pitch coke, needle coke, petroleum coke and the like. The graphite includes natural graphite and artificial graphite such as MCMB (meso-carbon micro beads). The organic polymer compound fired body is obtained by carbonizing a phenol resin, a furan resin or the like by firing the same at appropriate temperature. In the carbon material, the crystal structure change associated with inserting and extracting lithium ions is very little. Therefore, by using the carbon material, a high energy density is obtained, the carbon material also functions as an electrical conductor, and thus the carbon material is preferably used. The shape of the carbon material may be any of a fibrous shape, a spherical shape, a granular shape, and a scale-like shape.

Further, examples of anode material include a metal oxide and a polymer compound capable of inserting and extracting lithium ions. Examples of the metal oxide include iron oxide, ruthenium oxide, and molybdenum oxide. Examples of the polymer compound include polyacetylene, polyaniline, and polypyrrole.

It is needless to say that the anode material may be a material other than the foregoing materials. Further, two or more of the foregoing anode materials may be used by mixture voluntarily.

The anode active material layer 22B is formed, for example, by using vapor-phase deposition method, liquid-phase deposition method, spraying method, coating method, firing method, or a combination of two or more of these methods. In this case, the anode current collector 22A and the anode active material layer 22B are preferably alloyed in at least part of the interface thereof. More specifically, at the interface thereof, the element of the anode current collector 22A may be diffused in the anode active material layer 22B; or the element of the anode active material layer 22B may be diffused in the anode current collector 22A; or these elements may be diffused in each other. Thereby, destruction due to expansion and shrinkage of the anode active material layer 22B at the time of charge and discharge is inhibited, and the electron conductivity between the anode current collector 22A and the anode active material layer 22B is improved.

Examples of vapor-phase deposition method include physical deposition method and chemical deposition method. Specific examples thereof include vacuum evaporation method, sputtering method, ion plating method, laser ablation method, thermal Chemical Vapor Deposition (CVD) method, and plasma CVD method. As liquid-phase deposition method, a known technique such as electrolytic plating and electroless plating is able to be used. Coating method is a method in which, for example, after a particulate anode active material is mixed with a binder and the like, the resultant mixture is dispersed in a solvent and coating is provided. Firing method is, for example, a method in which after coating is provided by coating method, heat treatment is provided at temperature higher than the melting point of the binder or the like. For firing method, a known technique such as atmosphere firing method, reactive firing method, and hot press firing method is able to be used.

The anode active material contained in the anode active material layer 22B is composed of, for example, a plurality of particles. In other words, the anode active materiel layer 22B has a plurality of particulate anode active materials (hereinafter referred to as "anode active material particles"). The anode active material particles are formed by, for example, the foregoing vapor-phase deposition method or the like. However, the anode active material particles may be formed by a method other than vapor-phase deposition method.

In the case where the anode active material particles are formed by a deposition method such as vapor-phase deposition method, the anode active material particles may have a single layer structure formed by a single deposition step or may have a multilayer structure formed by a plurality of deposition steps. However, in the case where the anode active material particles are formed by using evaporation method or the like associated with high heat at the time of deposition, the anode active material particles preferably have a multilayer structure. In this case, since the deposition step of the anode material is divided into several steps (a plurality of thin layers of the anode material are sequentially formed and deposited), time that the anode current collector 22A is exposed at high heat is shortened compared to a case that the deposition is performed in a single deposition step. Thereby, the anode current collector 22A is hardly subject to thermal damage.

It is preferable that the anode active material particles are grown, for example, in the thickness direction of the anode active material layer 22B from the surface of the anode current collector 22A, and the anode active material particles are linked to the anode current collector 22A at the root thereof. Thereby, expansion and shrinkage of the anode active material layer 22B are inhibited at the time of charge and discharge. In this case, it is preferable that the anode active material particles are formed by vapor-phase deposition method or the like, and at least part of the interface with the anode current collector 22A is alloyed. More specifically, at the interface in between, the element of the anode current collector 22A may be diffused in the anode active material particles; or the element of the anode active material particles may be diffused in the anode current collector 22A; or the respective elements may be diffused in each other.

In particular, the anode active material layer 22B preferably has an oxide-containing film to cover the surface of the anode active material particles (region to be contacted with the electrolyte if the oxide-containing film is not provided) according to needs. In this case, the oxide-containing film functions as a protective film, and thus chemical stability of the anode 22 is improved. Accordingly, decomposition reaction of the electrolyte is inhibited at the time of charge and discharge. The oxide-containing film may cover the entire surface of the anode active material particles, or may cover only part thereof. Specially, the oxide-containing film preferably covers the entire surface of the anode active material particles, since thereby decomposition reaction of the electrolyte is more inhibited.

The oxide-containing film contains, for example, at least one of a silicon oxide, a germanium oxide, and a tin oxide. Specially, the oxide-containing film preferably contains the silicon oxide, since thereby the oxide-containing film easily covers the entire surface of the anode active material particles, and superior protective function is thereby obtained. It is needless to say that the oxide-containing film may contain an oxide other than the foregoing silicon oxide and the like.

Further, the oxide-containing film is formed by, for example, vapor-phase deposition method or liquid-phase deposition method. Specially, the oxide-containing film is preferably formed by liquid-phase deposition method, since thereby the oxide-containing film easily covers a wide range of the surface of the anode active material particles. Examples of liquid-phase deposition methods include liquid-phase precipitation method, sol-gel method, coating method, and dip coating method. Specially, liquid-phase precipitation method, sol-gel method, or dip coating method is preferable, and liquid-phase precipitation method is more preferable, since thereby higher effect is obtained. The oxide-containing film may be formed by a single formation method of the foregoing formation methods, or may be formed by two or more formation methods thereof.

Further, the anode active material layer 22B preferably contains a metal material not being alloyed with lithium ions in a gap inside of the anode active material layer 22B according to needs. Thereby, the plurality of anode active material particles is bound to each other with the metal material in between. In addition, in the case where the metal material exists in the foregoing gap, expansion and shrinkage of the anode active material layer 22B are inhibited.

The metal material has, for example, a metal element not being alloyed with lithium ions as an element. Examples of the metal element include at least one selected from the group consisting of iron, cobalt, nickel, zinc, and copper, since thereby the metal material easily enters into the foregoing gap, and superior binding characteristics are obtained. It is needless to say that the metal material may have a metal element other than the foregoing iron and the like. However, "metal material" herein is a comprehensive term, including not only a simple substance but also an alloy and a metal compound.

Further, the metal material is formed by, for example, vapor-phase deposition method or liquid-phase deposition method. Specially, the metal material is preferably formed by liquid-phase deposition method, since thereby the metal material easily enters into the gap inside of the anode active material layer 22B. Examples of liquid-phase deposition methods include electrolytic plating method and non-electrolytic plating method. Specially, electrolytic plating method is preferable, since thereby the metal material more easily enters into the foregoing gap, and the formation time thereof is shortened. The metal material may be formed by a single formation method out of the foregoing formation methods, or may be formed by two or more formation methods thereof.

Further, the metal material preferably has crystalline characteristics, since thereby resistance of the entire anode 22 is decreased and lithium ions are easily inserted and extracted in the anode 22 compared to a case that the metal material does not have crystalline characteristics (amorphous). Further, in this case, lithium ions are inserted and extracted uniformly at the time of initial charge. Thus, local stress is hardly applied to the anode 22, and wrinkle generation is inhibited.

The anode active material layer 22B may have only one of the foregoing oxide-containing film and the foregoing metal material, or may have both thereof. However, in order to obtain higher effect, the anode active material layer 22B preferably has both thereof. In the case where the anode active material layer 22B has only one thereof, in order to obtain higher effect, the anode active material layer 22B preferably has the oxide-containing film. In the case where the anode active material layer 22B has both the oxide-containing film and the metal material, it is possible to firstly form any thereof. However, in order to obtain higher effect, the oxide-containing film is preferably formed first.

A description will be given in detail of the anode with reference to FIG. 3 to FIG. 6.

Figure 3:
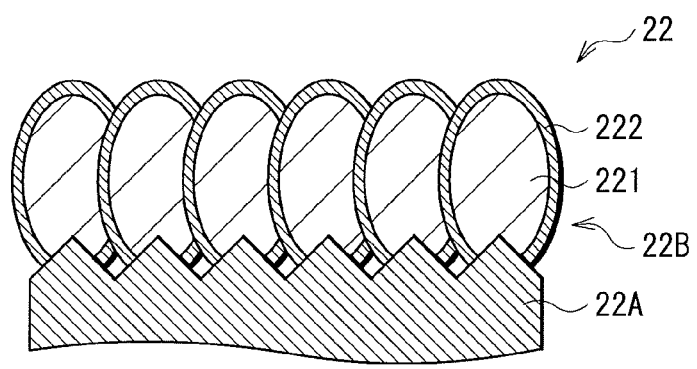
FIG. 3 is a cross sectional view illustrating an enlarged part of the anode illustrated in FIG. 2.
Figure 4:
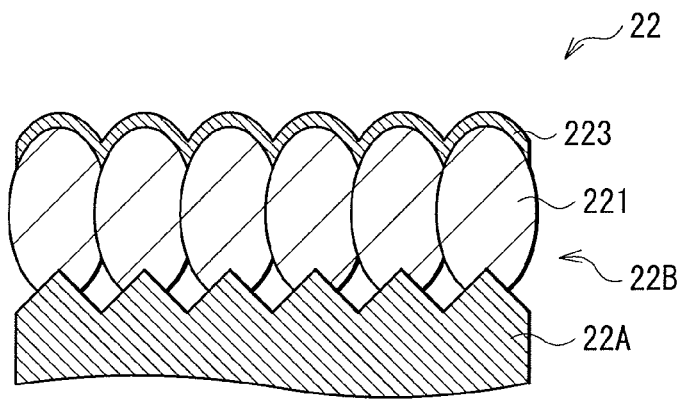
FIG. 4 is cross sectional view illustrating an anode of a reference example in relation to the anode illustrated in FIG. 3.

First, a description will be given of a case that the anode active material layer 22B contains the oxide-containing film together with the plurality of anode active material particles. FIG. 3 schematically illustrates a cross sectional structure of the anode of the present invention. FIG. 4 schematically illustrates a cross sectional structure of an anode of a reference example. FIG. 3 and FIG. 4 illustrate a case that the anode active material particles have a single layer structure.

In the anode of the present invention, as illustrated in FIG. 3, for example, in the case where the anode material is deposited on the anode current collector 22A by using vapor-phase deposition method such as evaporation method, a plurality of anode active material particles 221 are formed on the anode current collector 22A. In this case, in the case where the surface of the anode current collector 22A is roughened and a plurality of projection sections (for example, fine particles formed by electrolytic treatment) exist on the surface thereof, the anode active material particles 221 are grown for every projection section described above in the thickness direction. Thus, the plurality of anode active material particles 221 are arranged on the anode current collector 22A, and are linked to the surface of the anode current collector 22A at the root thereof. Thereafter, for example, in the case where an oxide-containing film 222 is formed on the surface of the anode active material particle 221 by using liquid-phase deposition method such as liquid-phase precipitation method, the oxide-containing film 222 covers almost entire surface of the anode active material particle 221, in particular, covers a wide range from the apex section to the root of the anode active material particle 221. Such a covering state in the wide range with the oxide-containing film 222 is a characteristic shown in the case that the oxide-containing film 222 is formed by liquid-phase deposition method. In other words, in the case where the oxide-containing film 222 is formed by using liquid-phase deposition method, such covering action is applied not only to the apex section of the anode active material particle 221 but also to the root thereof. Accordingly, the anode active material particle 221 is covered with the oxide-containing film 222 down to the root thereof.

Meanwhile, in the anode of the reference example, as illustrated in FIG. 4, for example, in the case where the plurality of anode active material particles 221 are formed by using vapor-phase deposition method and an oxide-containing film 223 is subsequently formed by similarly using vapor-phase deposition method, the oxide-containing film 223 covers only the apex section of the anode active material particle 221. Such a small range covered with the oxide-containing film 223 is a characteristic shown in the case that the oxide-containing film 223 is formed by vapor-phase deposition method. In other words, in the case where the oxide-containing film 223 is formed by using vapor-phase deposition method, such covering action is applied to the apex section of the anode active material particle 221 but not applied to the root thereof. Accordingly, the anode active material particle 221 is not covered with the oxide-containing film 223 down to the root thereof.

In FIG. 3, the description has been given of a case that the anode active material layer 22B is formed by vapor-phase deposition method. However, in the case where the anode active material layer 22B is formed by other method such as coating method and sintering method, the oxide-containing film 222 is similarly formed to cover almost entire surface of the plurality of anode active material particles 221.

Figure 5A:
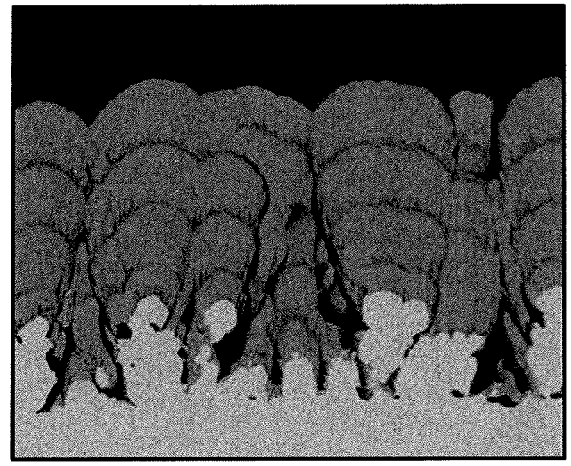
FIG. 5 is an SEM photograph illustrating an cross sectional structure of the anode illustrated in FIG. 2 and a schematic view thereof.
Figure 5B:
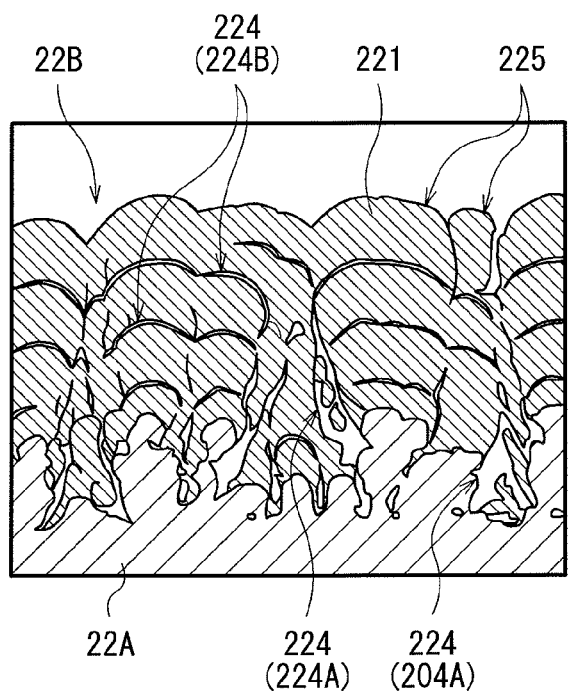

Next, a description will be given of a case that the anode active material layer 22B contains the plurality of anode active material particles and the metal material not being alloyed with lithium ions. FIG. 5 illustrates an enlarged cross sectional structure of the anode. FIG. 5A is a Scanning Electron Microscope (SEM) photograph (secondary electron image), and FIG. 5B is a schematic drawing of the SEM image illustrated in FIG. 5A. FIGS. 5A and 5B illustrate a case that the plurality of anode active material particles 221 has a multilayer structure in the particles.

In the case where the anode active material particles 221 have the multilayer structure, a plurality of gaps 224 are generated in the anode active material layer 22B due to the arrangement structure, the multilayer structure, and the surface structure of the plurality of anode active material particles 221. The gap 224 mainly includes two types of gaps 224A and 224B categorized according to the cause of generation. The gap 224A is a gap generated between adjacent anode active material particles 221. Meanwhile, the gap 224B is a gap generated between each layer in the anode active material particles 221.

On the exposed face (outermost surface) of the anode active material particle 221, a void 225 may be generated. As a fibrous minute projection section (not illustrated) is generated on the surface of the anode active material particles 221, the void 225 is generated between the projection sections. The void 225 may be generated entirely over the exposed face of the anode active material particles 221, or may be generated in only part thereof. Since the foregoing fibrous minute projection section is generated on the surface of the anode material every time the anode material is deposited, the void 225 may be generated between each layer in addition to on the exposed face of the anode active material particles 221.

Figure 6A:
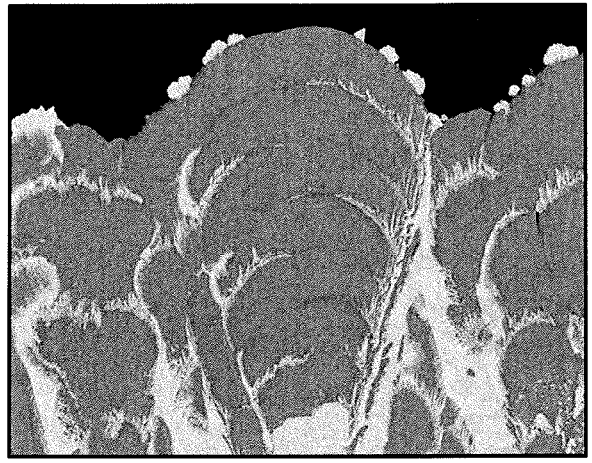
FIG. 6 is an SEM photograph illustrating another cross sectional structure of the anode illustrated in FIG. 2 and a schematic view thereof.
Figure 6B:
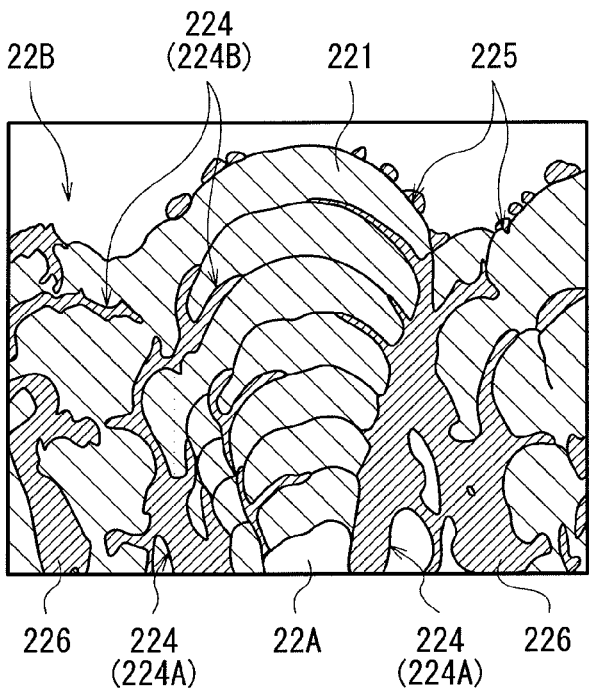

FIG. 6 illustrates another cross sectional structure of the anode, and corresponds to FIG. 5. The anode active material layer 22B has a metal material 226 not being alloyed with lithium ions in the gaps 224A and 224B. In this case, only one of the gaps 224A and 224B may have the metal material 226, but both the gaps 224A and 224B preferably have the metal material 226, since thereby higher effect is obtained.

The metal material 226 intrudes into the gap 224A between adjacent anode active material particles 221. More specifically, in the case where the anode active material particles 221 are formed by vapor-phase deposition method or the like, the anode active material particles 221 are grown for every projection section existing on the surface of the anode current collector 22A as described above, and thus the gap 224A is generated between the adjacent anode active material particles 221. The gap 224A causes lowering of the binding characteristics of the anode active material layer 22B. Therefore, to improve the binding characteristics, the metal material 226 fills in the gap 224A. In this case, it is enough that part of the gap 224A is filled therewith, but the larger filling amount is preferable, since thereby the binding characteristics of the anode active material layer 22B are more improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material particles 22B as the foregoing gap 224A does. Therefore, to improve the binding characteristics, the metal material 226 fills in the foregoing gap 224B. In this case, it is enough that part of the gap 224B is filled therewith, but the larger filling amount is preferable, since thereby the binding characteristics of the anode active material layer 22B are more improved.

To prevent the fibrous minute projection section (not illustrated) generated on the exposed face (uppermost face) of the anode active material particles 221 from adversely affecting the performance of the anode, the void 225 may have the metal material 226. More specifically, in the case where the anode active material particles 221 are formed by vapor-phase deposition method or the like, the fibrous minute projection sections are generated on the surface thereof, and thus the void 225 is generated between the projection sections. The void 225 causes increase of the surface area of the anode active material particles 221, and accordingly the amount of an irreversible coat formed on the surface is also increased, possibly resulting in lowering of progression of charge and discharge reaction. Therefore, to avoid the lowering of progression of charge and discharge reaction, the void 225 is filled with the metal material 226. In this case, it is enough that part of the void 225 is filled therewith, but the larger filling amount is preferable, since thereby the lowering of progression of charge and discharge reaction is more inhibited. In FIG. 6, the metal material 226 is dotted on the exposed face of the anode active material particles 221, which means that the foregoing minute projection section exists in the location where the metal material 226 is dotted. It is needless to say that the metal material 226 is not necessarily dotted on the surface of the anode active material particles 221, but may cover the entire surface thereof.

In particular, the metal material 226 that enters into the gap 224B has a function to fill in the void 225 in each layer. More specifically, in the case where the anode material is deposited several times, the foregoing minute projection section is generated for every deposition. Therefore, the metal material 226 fills in not only the gap 224B in each layer, but also the void 225 in each layer.

FIGS. 5 and 6, the description has been given of a case that the anode active material particles 221 have the multilayer structure, and both gaps 224A and 224B exist in the anode active material layer 22B. Thus, in this case, the anode active material layer 22B has the metal material 226 in the gaps 224A and 224B. Meanwhile, in the case where the anode active material particles 221 have a single layer structure, and only the gap 224A exists in the anode active material layer 22B, the anode active material layer 22B has the metal material 226 only in the gap 224A. It is needless to say that the void 225 is generated in both cases, and thus in any case, the metal material 226 is included in the void 225.

After the anode active material layer 22B is formed on the anode current collector 22A, the anode coat 22C is formed on the anode active material layer 22B. As described above, the anode coat 22C contains the radical scavenger compound shown in Formula (1), since thereby chemical stability of the anode 22 is improved. Thereby, at the time of charge and discharge, lithium ions are efficiently inserted and extracted in the anode 22, and decomposition reaction of the electrolyte is inhibited.

The anode coat 22C may be provided to cover the entire face of the anode active material layer 22B, or may be provided to cover part of the surface thereof. In this case, part of the anode coat 22C may enter into the anode active material layer 22B.

In particular, the anode coat 22C preferably contains one or more of an alkali metal salt or an alkali earth metal salt (except for a compound corresponding to the radical scavenger compound) together with the radical scavenger compound. Thereby, coat resistance is inhibited, and thus the cycle characteristics are more improved.

Examples of the alkali metal salt or the alkali earth metal salt include a carbonate, a halogenated salt, a borate, a phosphate, a sulfonate, a carboxylate, an oxocarbonate and the like of the alkali metal element or the alkali earth metal element. Specific examples thereof include lithium carbonate ($Li_2CO_3$), lithium fluoride (LiF), lithium tetraborate ($Li_2B_4O_7$), lithium metaborate ($LiBO_2$), lithium pyrophosphate ($Li_4P_2O_7$), lithium tripolyphosphate ($Li_5P_3O_{10}$), lithium orthosilicate ($Li_4SiO_4$), lithium metasilicate ($Li_2SiO_3$), dilithium ethanedisulfonate, dilithium propanedifulfonate, dilithium sulfoacetate, dilithium sulfopropionate, dilithium sulfobutanate, dilithium sulfobenzoate, dilithium succinate, trilithium sulfosuccinate, quadratic acid dilithium, magnesium ethanedisulfonate, magnesium propanedisulfonate, magnesium sulfoacetate, magnesium sulfopropionate, magnesium sulfobutanate, magnesium sulfobenzoate, magnesium succinate, trimagnesium disulfosuccinate, calcium ethanedisulfonate, calcium propanedisulfonate, calcium sulfoacetate, calcium sulfopropionate, calcium sulfobutanate, calcium sulfobenzoate, calcium succinate, and tricalcium disulfosuccinate.

Examples of a method of forming the anode coat 22C include liquid-phase deposition method such as coating method, dipping method, dip coating method, and spray method; and vapor-phase deposition method such as evaporation method, sputtering method, and CVD method. One thereof may be used singly, or two or more methods may be used. Specially, for example, in the liquid-phase deposition method, the anode coat 22C is preferably formed by using a solution containing the radical scavenger compound. Specifically, for example, in the dipping method, after the anode active material layer 22B is dipped in the solution containing the radical scavenger compound, the anode active material layer 22B is raised to be dried. Further, in the coating method, after the surface of the anode active material layer 22B is coated with the solution containing the radical scavenger compound, the resultant is dried. Thereby, the favorable anode coat 22C having high chemical stability is stably and easily formed. Examples of a solvent in which the radical scavenger compound is dissolved include, for example, a solvent having high polarity such as water as described above.

The separator 23 separates the cathode 21 from the anode 22, and passes lithium ions while preventing current short circuit due to contact of both electrodes. The separator 23 is made of, for example, a porous film made of a synthetic resin such as polytetrafluoroethylene, polypropylene, and polyethylene, a ceramics porous film or the like. The separator 23 may have a structure in which two or more porous films as the foregoing porous films are layered.

An electrolytic solution as a liquid electrolyte is impregnated in the separator 23. The electrolytic solution contains a solvent and an electrolyte salt dissolved in the solvent.

The solvent contains, for example, one or more nonaqueous solvents such as an organic solvent. The after-mentioned solvents may be combined voluntarily.

Examples of nonaqueous solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Specially, at least one selected from the group consisting of ethylene carbonate, propylene carbonate, dimethyl carbonate, diethyl carbonate, and ethyl methyl carbonate is preferable. In this case, a mixture of a high viscosity (high dielectric constant) solvent (for example, specific inductive $\in \geq 30$) such as ethylene carbonate and propylene carbonate and a low viscosity solvent (for example, viscosity≤1 mPa·s) such as dimethyl carbonate, ethyl methyl carbonate, and diethyl carbonate is more preferable. Thereby, the dissociation property of the electrolyte salt and the ion mobility are improved.

In particular, the solvent preferably contains at least one of a chain ester carbonate having halogen as an element shown in Formula (4) and a cyclic ester carbonate having halogen as an element shown in Formula (5). Thereby, at the time of charge and discharge, a stable protective film is formed on the surface of the anode 22 and decomposition reaction of the electrolyte is inhibited. The content of the chain ester carbonate having halogen and the content of the cyclic ester carbonate having halogen in the solvent is, for example, from 0.01 wt % to 50 wt % both inclusive.

[Chemical formula 7]

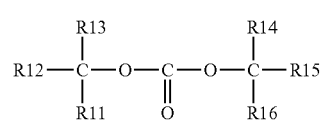

(4)

(R11 to R16 are a hydrogen group, a halogen group, an alkyl group, or a halogenated alkyl group. At least one thereof is a halogen group or a halogenated alkyl group.)

[Chemical formula 8]

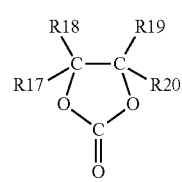

(5)

(R17 to R20 are a hydrogen group, a halogen group, an alkyl group, or a halogenated alkyl group. At least one thereof is a halogen group or a halogenated alkyl group.)

R11 to R16 in Formula (4) may be identical with each other or different from each other. In other words, each type of R11 to R16 is able to be individually set in the range of the foregoing groups. The same is applied to R17 to R20 in Formula (5).

The halogen type is not particularly limited, but specially, fluorine, chlorine, or bromine is preferable, and fluorine is more preferable. By using fluorine, higher effect is obtained compared to the other halogens.

The number of halogens is more preferably two than one, and further may be three or more, since thereby an ability to form the protective film becomes high, and more rigid and stable protective film is formed. Accordingly, decomposition reaction of the electrolytic solution is more inhibited.

Examples of the chain ester carbonate having halogen as an element shown in Formula (4) include fluoromethyl methyl carbonate, bis(fluoromethyl)carbonate, and difluoromethyl methyl carbonate. One thereof may be used singly, or a plurality thereof may be used by mixture.

Examples of the cyclic ester carbonate having halogen as an element shown in Formula (5) include compounds shown in the following Formula (5-1) to Formula (5-21). In other words, examples thereof include 4-fluoro-1,3-dioxolane-2-one, 4-chloro-1,3-dioxolane-2-one, 4,5-difluoro-1,3-dioxolane-2-one, tetrafluoro-1,3-dioxolane-2-one, 4-chloro-5-fluoro-1,3-dioxolane-2-one, 4,5-dichloro-1,3-dioxolane-2-one, tetrachloro-1,3-dioxolane-2-one, 4,5-bis trifluoro methyl-1,3-dioxolane-2-one, 4-trifluoro methyl-1,3-dioxolane-2-one, 4,5-difluoro-4,5-dimethyl-1,3-dioxolane-2-one, 4,4-difluoro-5-methyl-1,3-dioxolane-2-one, 4-ethyl-5,5-difluoro-1,3-dioxolane-2-one, 4-fluoro-5-trifluoromethyl-1,3-dioxolane-2-one, 4-methyl-5-trifluoro-methyl-1,3-dioxolane-2-one, 4-fluoro-4,5-dimethyl-1,3-dioxolane-2-one, 5-(1,1-difluoroethyl)-4,4-difluoro-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. One thereof may be used singly, or a plurality thereof may be used by mixture.

Chemical formula 9

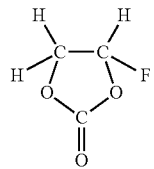
(5-1)

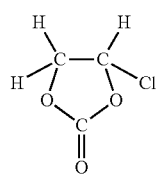
(5-2)

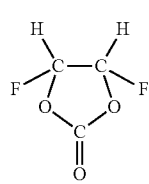
(5-3)

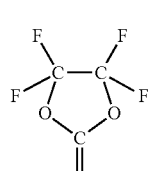
(5-4)

-continued

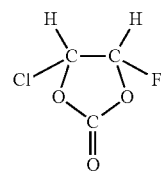
(5-5)

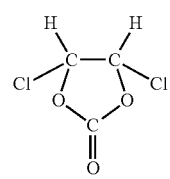
(5-6)

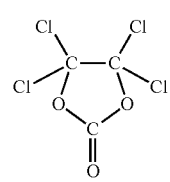
(5-7)

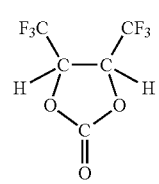
(5-8)

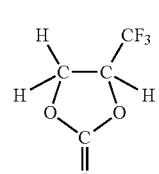
(5-9)

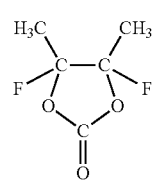
(5-10)

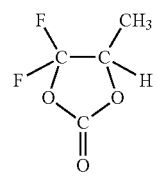
(5-11)

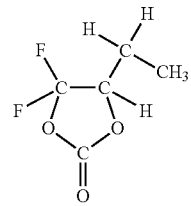
(5-12)

Chemical formula 10

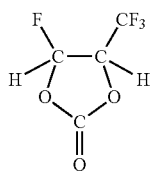
(5-13)

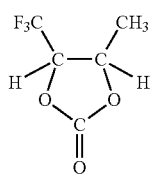
(5-14)

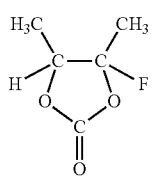
(5-15)

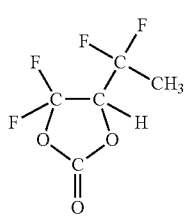
(5-16)

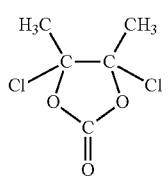
(5-17)

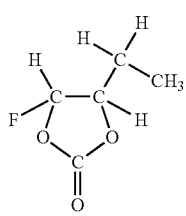
(5-18)

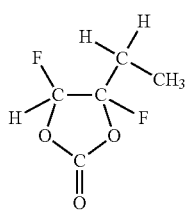
(5-19)

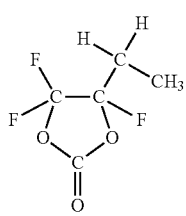
(5-20)

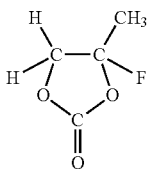
(5-21)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

Further, the solvent preferably contains at least one of cyclic ester carbonates having an unsaturated carbon bond shown in Formula (6) to Formula (8), since thereby a stable protective film is formed on the surface of the anode 22 at the time of charge and discharge, and decomposition reaction of the electrolyte is inhibited. The content of the cyclic ester carbonate having an unsaturated carbon bond in the solvent is, for example, from 0.01 wt % to 10 wt % both inclusive.

[Chemical formula 11]

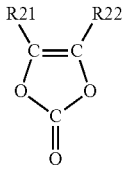
(6)

(R21 and R22 are a hydrogen group or an alkyl group.)

[Chemical formula 12]

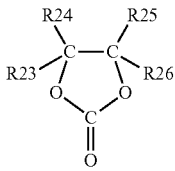
(7)

(R23 to R26 are a hydrogen group, an alkyl group, a vinyl group, or an aryl group. At least one of R23 to R26 is the vinyl group or the aryl group.)

[Chemical formula 13]

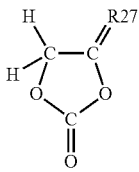
(8)

(R27 is an alkylene group.)

The cyclic ester carbonate having an unsaturated carbon bond shown in Formula (6) is a vinylene carbonate compound. Examples of vinylene carbonate compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The cyclic ester carbonate having an unsaturated carbon bond shown in Formula (7) is a vinylethylene carbonate compound. Examples of vinylethylene carbonate compounds include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated carbon bond shown in Formula 8 is a methylene ethylene carbonate compound. Examples of methylene ethylene carbonate compounds include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate compound may have one methylene group (compound shown in Formula (8)), or may have two methylene groups.

The cyclic ester carbonate having an unsaturated carbon bond may be catechol carbonate or the like having a benzene ring, in addition to the compounds shown in Formula (6) to Formula (8).

Further, the solvent preferably contains sultone (cyclic sulfonic ester), since thereby chemical stability of the electrolyte is more improved. Examples of sultone include propane sultone and propene sultone. Such sultone may be used singly, or a plurality thereof may be used by mixture. The sultone content in the solvent is, for example, from 0.5 wt % to 5 wt % both inclusive.

Further, the solvent preferably contains an acid anhydride, since thereby chemical stability of the electrolytic solution is more improved. Examples of acid anhydrides include carboxylic anhydride such as succinic anhydride, glutaric anhydride, and maleic anhydride; disulfonic anhydride such as ethane disulfonic anhydride and propane disulfonic anhydride; and an anhydride of carboxylic acid and sulfonic acid such as sulfobenzoic anhydride, sulfopropionic anhydride, and sulfobutyric anhydride. The anhydrides may be used singly, or a plurality thereof may be used by mixture. The content of the acid anhydride in the solvent is, for example, from 0.5 wt % to 5 wt % both inclusive.

The electrolyte salt contains, for example, one or more light metal salts such as a lithium salt. The electrolyte salts described below may be combined voluntarily.

Examples of lithium salts include lithium hexafluorophosphate, lithium tetrafluoroborate, lithium perchlorate, lithium hexafluoroarsenate, lithium tetraphenylborate (LiB($C_6H_5$)$_4$), lithium methanesulfonate (LiCH$_3$SO$_3$), lithium trifluoromethane sulfonate (LiCF$_3$SO$_3$), lithium tetrachloroaluminate (LiAlCl$_4$), dilithium hexafluorosilicate (Li$_2$SiF$_6$), lithium chloride (LiCl), lithium bromide (LiBr), lithium monofluorophosphate (LiPFO$_3$), and lithium difluorophosphate (LiPF$_2$O$_2$).

Specially, at least one of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one of the compounds shown in Formula (9) to Formula (11). Thereby, higher effect is obtained. R31 and R33 in Formula (9) may be identical or different. The same is applied to R41 to R43 in Formula (10) and R51 and R52 in Formula (11).

[Chemical formula 14]

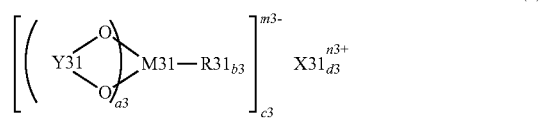

(9)

(X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O═)C—R32-C(═O)—, —(O═)C—C(R33)$_2$-, or —(O═)C—C—(═O)—. R32 is an alkylene group, a halogenated alkylene group, an arylene group, or a halogenated arylene group. R33 is an alkyl group, a halogenated alkyl group, an aryl group, or a halogenated aryl group. a3 is an integer of 1 to 4. b3 is 0, 2, or 4. c3, d3, m3, and n3 are an integer of 1 to 3.

Chemical formula 15

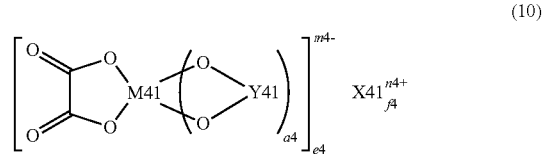

(10)

(X41 is a Group 1 element or a Group 2 element in the long period periodic table. M41 is a transition metal element, a Group 13 element, a Group 14 element, or a Group 15 element in the long period periodic table. Y41 is —(O═)C—(C(R41)$_2$)$_{b4}$-C(O═)—, —(R43)$_2$C—(C(R42)$_2$)$_{c4}$-C(═O)—, —(R43)$_2$C—(C(R42)$_2$)$_{c4}$-C(R43)$_2$—, —(R43)$_2$C—(C(R42)$_2$)$_{c4}$-S(═O)$_2$—, —(O═)$_2$S—(C(R42)$_2$)$_{d4}$-S(═O)$_2$—, or —(O═)C—(C(R42)$_2$)$_{d4}$-S(═O)$_2$—. R41 and R43 are a hydrogen group, an alkyl group, a halogen group, or a halogenated alkyl group. At least one of R41/R43 is respectively the halogen group or the halogenated alkyl group. R42 is a hydrogen group, an alkyl group, a halogen group, or a halogenated alkyl group. a4, e4, and n4 are an integer of 1 or 2. b4 and d4 are an integer of 1 to 4. c4 is an integer of 0 to 4. f4 and m4 are an integer of 1 to 3.

Chemical formula 16

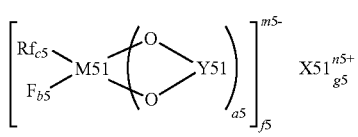
(11)

(X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$—, —(R52)$_2$C—(C(R51)$_2$)$_{d5}$-S(=O)$_2$—, —(O=)$_2$S—(C(R51)$_2$)$_{e5}$-S(=O)$_2$—, or —(O=)C—(C(R51)$_2$)$_{e5}$-S(=O)$_2$—. R51 is a hydrogen group, an alkyl group, a halogen group, or a halogenated alkyl group. R52 is a hydrogen group, an alkyl group, a halogen group, or a halogenated alkyl group, and at least one thereof is the halogen group or the halogenated alkyl group. a5, f5, and n5 are 1 or 2. b5, c5, and e5 are an integer of 1 to 4. d5 is an integer of 0 to 4. g5 and m5 are an integer of 1 to 3.

Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of the compounds shown in Formula (9) include compounds shown in Formula (9-1) to Formula (9-6). Examples of the compounds shown in Formula (10) include compounds shown in Formula (10-1) to Formula (10-8). Examples of the compounds shown in Formula (11) include a compound shown in Formula (11-1). It is needless to say that the compound is not limited to the foregoing compounds as long as the compound has a structure shown in Formula (9) to Formula (11).

[Chemical formula 17]

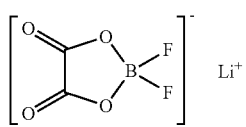
(9-1)

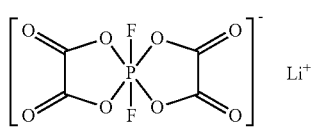
(9-2)

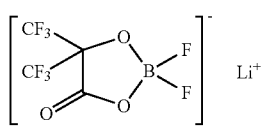
(9-3)

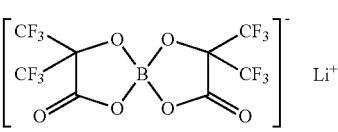
(9-4)

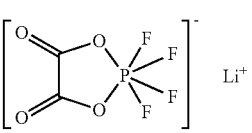
(9-5)

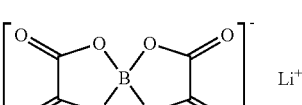
(9-6)

[Chemical formula 18]

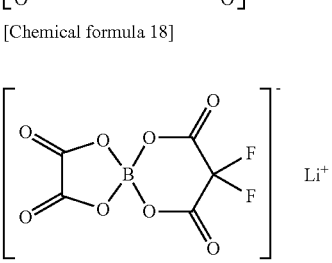
(10-1)

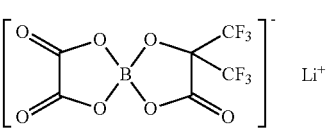
(10-2)

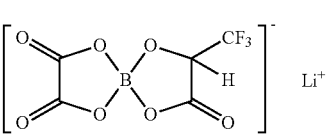
(10-3)

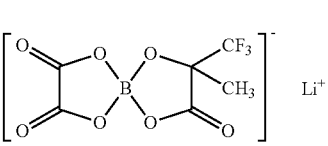
(10-4)

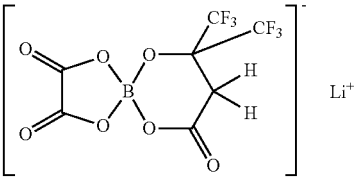
(10-5)

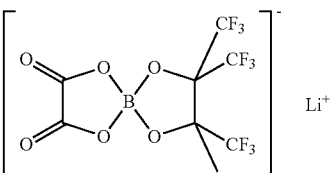
(10-6)

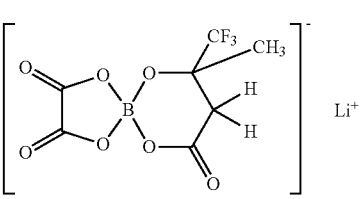
(10-7)

-continued

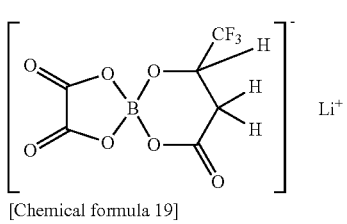

[Chemical formula 19] (10-8)

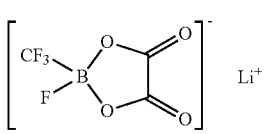

(11-1)

Further, the electrolyte salt may contain at least one of the compounds shown in the following Formula (12) to Formula (14). Thereby, higher effect is obtained. m and n in Formula (12) may be identical or different. The same is applied to p, q, and r in Formula (14).

[Chemical formula 20]

$$LiN(C_mF_{2m+1}SO_2)(C_nF_{2n+1}SO_2) \quad (12)$$

(m and n are an integer equal to or more than 1.)

[Chemical formula 21]

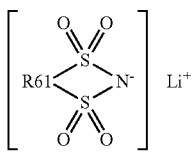

(13)

(R61 is a straight chain/branched perfluoro alkylene group with the carbon number from 2 to 4 both inclusive.)

[Chemical formula 22]

$$LiC(C_pF_{2p+1}SO_2)(C_qF_{2q+1}SO_2)(C_rF_{2r+1}SO_2) \quad (14)$$

(p, q, and r are an integer equal to or more than 1.)

Examples of the chain compounds shown in Formula (12) include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium(trifluoromethanesulfonyl)(heptafluoropropanesulfonyl)imide (LiN(CF$_3$SO$_2$)(C$_3$F$_7$SO$_2$)), and lithium(trifluoromethanesulfonyl)(nonafluorobutanesulfonyl)imide (LiN(CF$_3$SO$_2$)(C$_4$F$_9$SO$_2$)). One thereof may be used singly, or a plurality thereof may be used by mixture.

Examples of the cyclic compounds shown in Formula (13) include compounds shown in the following Formula (13-1) to Formula (13-4). In other words, examples thereof include 1,2-perfluoroethanedisulfonyl imide lithium, 1,3-perfluoropropanedisulfonyl imide lithium, 1,3-perfluorobutanedisulfonyl imide lithium, and 1,4-perfluorobutanedisulfonyl imide lithium. One thereof may be used singly, or a plurality thereof may be used by mixture.

[Chemical formula 23]

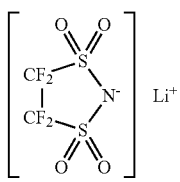

(13-1)

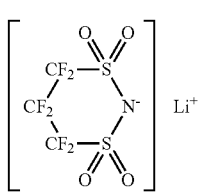

(13-2)

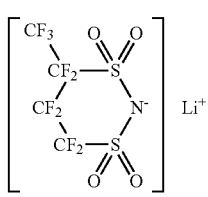

(13-3)

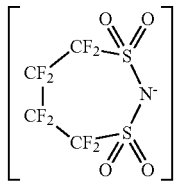

(13-4)

Examples of the chain compounds shown in Formula 14 include lithium tris(trifluoromethanesulfonyl)methyde (LiC(CF$_3$SO$_2$)$_3$).

The content of the electrolyte salt to the solvent is preferably from 0.3 mol/kg to 3.0 mol/kg both inclusive. If out of the foregoing range, there is a possibility that the ion conductivity is significantly lowered.

In the secondary battery, at the time of charge, for example, lithium ions are extracted from the cathode 21, and are inserted in the anode 22 through the electrolytic solution impregnated in the separator 23. Meanwhile, at the time of discharge, for example, lithium ions are extracted from the anode 22, and are inserted in the cathode 21 through the electrolytic solution impregnated in the separator 23.

The cylindrical type secondary battery is manufactured, for example, by the following procedure.

First, the cathode 21 is formed. First, a cathode active material, a cathode binder, and a cathode electrical conductor are mixed to prepare a cathode mixture, which is subsequently dispersed in an organic solvent to form a paste cathode mixture slurry. Subsequently, both faces of the cathode current collector 21A are uniformly coated with the cathode mixture slurry by using a doctor blade, a bar coater or the like. Thereafter, the organic solvent is volatilized to dry the resultant to form the cathode active material layer 21B. Finally, the cathode active material layer 21B is compression-molded by a rolling press machine or the like while being heated if necessary. In this case, the compression-molding may be repeated over several times.

Next, the anode 22 is formed. First, the anode current collector 22A made of an electrolytic copper foil or the like is prepared. Thereafter, the plurality of anode active material particles are formed by depositing the anode material on both faces of the anode current collector 22A by using vapor-phase deposition method such as evaporation method. Subsequently, according to needs, the oxide-containing film is formed by using liquid-phase deposition method such as liquid-phase precipitation method, the metal material is formed by using liquid-phase deposition method such as electrolytic plating method, or both the oxide-containing film and the metal material are formed, and thereby the anode active material layer 22B is formed. Finally, the anode current collector 22A on which the anode active material layer 22B is formed is dipped in the solution containing the radical scavenger compound, and the resultant is pulled out and dried. Thereby, the anode coat 22C containing the radical scavenger compound is formed on the anode active material layer 22B. In forming the anode coat 22C, it is possible that the surface of the anode active material layer 22B is coated with the solution containing the radical scavenger compound, and the resultant is dried.

The secondary battery is assembled as follows. First, the cathode lead 25 is attached to the cathode 21 by welding or the like, and the anode lead 26 is attached to the anode 22 by welding or the like. Subsequently, the cathode 21 and the anode 22 are layered with the separator 23 in between, and the resultant is spirally wound to form the wound electrode body 20. Subsequently, the center pin 24 is inserted in the center of the wound electrode body 20. Subsequently, while the wound electrode body 20 is sandwiched between the pair of insulating plates 12 and 13, the wound electrode body 20 is contained in the battery can 11. An end of the cathode lead 25 is welded to the safety valve mechanism 15, and an end of the anode lead 26 is welded to the battery can 11. Subsequently, an electrolyte is injected into the battery can 11, and impregnated in the separator 23. Finally, the battery cover 14, the safety valve mechanism 15, and the PTC device 16 are fixed at the open end section of the battery can 11 by being caulked with the gasket 17. Accordingly, the cylindrical type secondary battery illustrated in FIG. 1 to FIG. 6 is thereby completed.

According to the first secondary battery and the method of manufacturing the same, since the anode coat 22C containing the radical scavenger compound shown in Formula (1) is provided on the anode active material layer 22B, chemical stability of the anode 22 is improved. Thereby, at the time of charge and discharge, lithium ions are easily inserted and extracted in the anode 22, and decomposition reaction of the electrolyte is inhibited. Accordingly, the cycle characteristics are able to be improved.

In this case, in the case where the anode coat 22C is formed by using a solution containing the radical scavenger compound, specifically, in the case where a simple treatment such as dipping treatment and coating treatment is used, the favorable anode coat 22C is able to be stably and easily formed compared to a case that a method necessitating special environmental conditions such as reduced pressure environment is used.

In particular, in the case where the anode 22 contains a high capacity material as an anode active material, the cycle characteristics are improved and thus higher effect is able to be obtained than in the case that a carbon material or the like is contained as an anode active material.

Further, in the case where the solvent of the electrolyte contains at least one of the chain ester carbonate having the halogen as an element shown in Formula (4) and the cyclic ester carbonate having halogen as an element shown in Formula (5); at least one of the cyclic ester carbonates having an unsaturated carbon bond shown in Formula (6) to Formula (8); sultone; or an acid anhydride, higher effect is able to be obtained.

Further, in the case where the electrolyte salt of the electrolyte contains at least one of lithium hexafluorophosphate, lithium tetrafluoroborate, lithium perchlorate, and lithium hexafluoroarsenate; at least one of the compounds shown in Formula (9) to Formula (11); or at least one of the compounds shown in Formula (12) to Formula (14), higher effect is able to be obtained.

The description has been hereinbefore given of the case that the battery structure of the secondary battery is cylindrical type. However, the battery structure of the secondary battery is not limited thereto, but the battery structure of the secondary battery may be a structure other than the cylindrical type.

Figure 7:
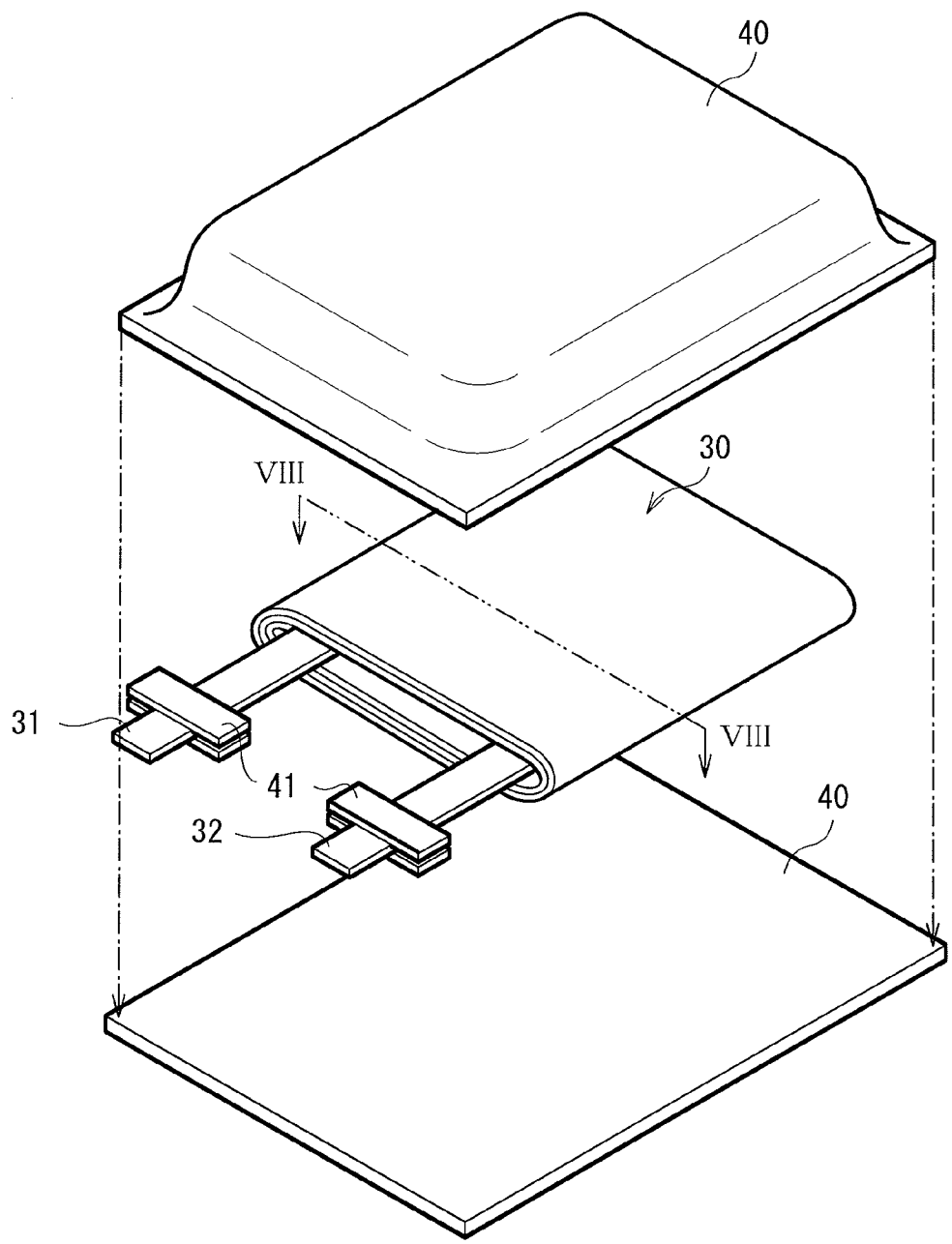
FIG. 7 is a cross sectional view illustrating a structure of a modified example of the secondary battery according to the first embodiment of the present invention (another first secondary battery).
Figure 8:
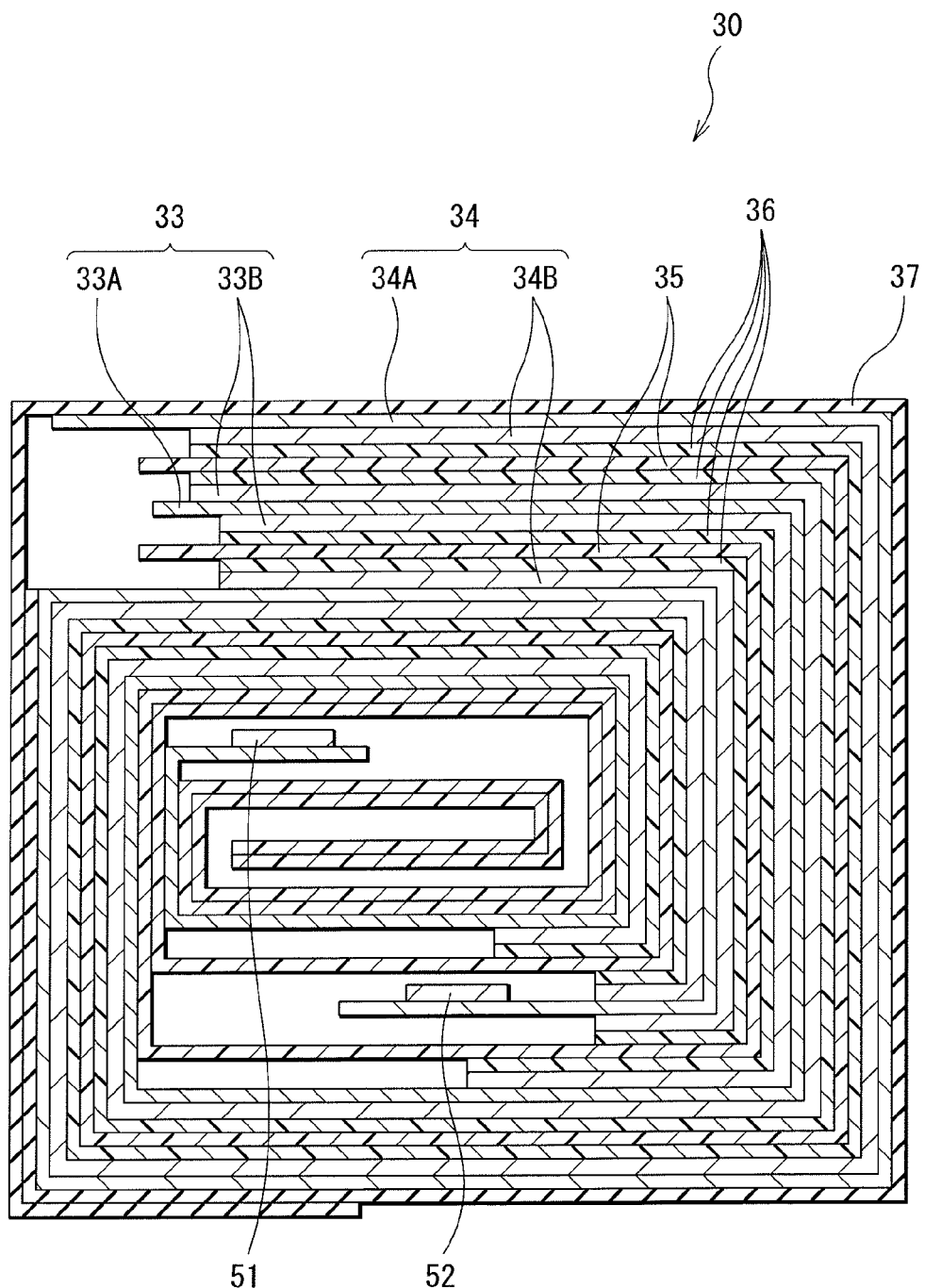
FIG. 8 is a cross sectional view taken along line VIII-VIII of the wound electrode body illustrated in FIG. 7.
Figure 9:
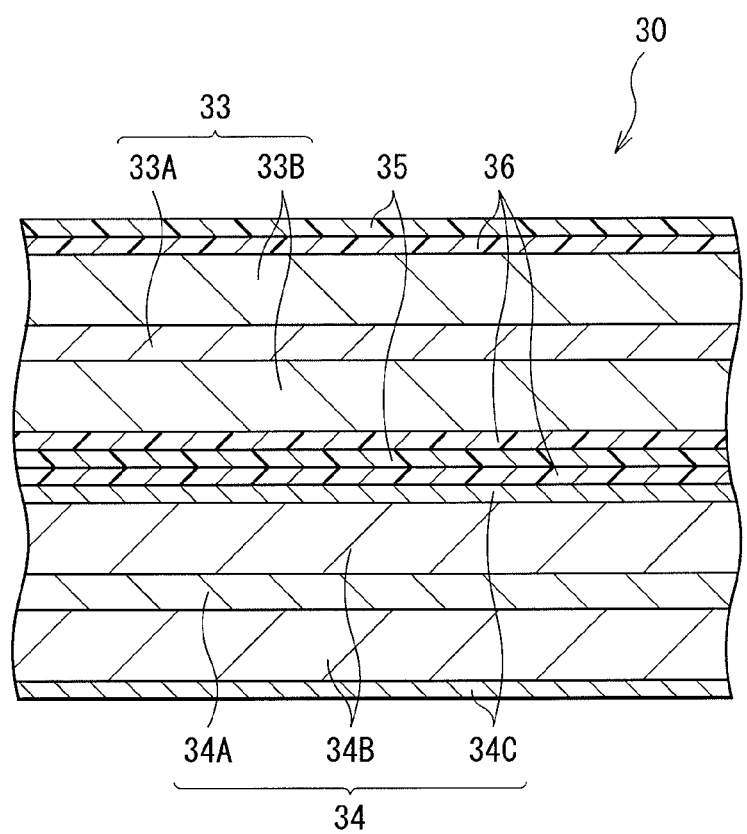
FIG. 9 is a cross sectional view illustrating an enlarged part of the wound electrode body illustrated in FIG. 8.

FIG. 7 illustrates an exploded perspective structure of another first secondary battery. FIG. 8 illustrates an enlarged cross section taken along line VIII-VIII of a wound electrode body 30 illustrated in FIG. 7. FIG. 9 illustrates an enlarged part of the wound electrode body 30 illustrated in FIG. 8.

The secondary battery is, for example, a lithium ion secondary battery similar to the foregoing first secondary battery. In the secondary battery, the wound electrode body 30 on which a cathode lead 31 and an anode lead 32 are attached is mainly contained in a film package member 40. The battery structure using the film package member 40 is called laminated film type structure.

The cathode lead 31 and the anode lead 32 are directed from inside to outside of the package member 40 in the same direction, for example. The cathode lead 31 is made of, for example, a metal material such as aluminum, and the anode lead 32 is made of, for example, a metal material such as copper, nickel, and stainless. The metal materials are in the shape of a thin plate or mesh.

The package member 40 is made of an aluminum laminated film in which, for example, a nylon film, an aluminum foil, and a polyethylene film are bonded together in this order. The package member 40 has, for example, a structure in which respective outer edges of 2 pieces of rectangle aluminum laminated films are bonded with each other by fusion bonding or an adhesive so that the polyethylene film and the wound electrode body 30 are opposed to each other.

An adhesive film 41 to protect from outside air intrusion is inserted between the package member 40 and the cathode lead 31, and between the package member 40 and the anode lead 32. The adhesive film 41 is made of a material having contact characteristics in relation to the cathode lead 31 and the anode lead 32. Examples of such a material include, for example, a polyolefin resin such as polyethylene, polypropylene, modified polyethylene, and modified polypropylene.

The package member 40 may be made of a laminated film having other lamination structure, a polymer film such as polypropylene, or a metal film, instead of the foregoing aluminum laminated film.

In the wound electrode body 30, a cathode 33 and an anode 34 are layered with a separator 35 and an electrolyte layer 36 in between and the resultant is spirally wound. The outermost periphery thereof is protected by, for example, a protective tape 37.

The cathode 33 has a structure in which, for example, a cathode active material layer 33B is provided on both faces of a cathode current collector 33A having a pair of faces. The anode 34 has a structure in which an anode active material layer 34B and an anode coat 34C are provided in this order on both faces of an anode current collector 34A having a pair of faces. The structures of the cathode current collector 33A, the cathode active material layer 33B, the anode current collector 34A, the anode active material layer 34B, the anode coat 34C, and the separator 35 are respectively similar to those of the cathode current collector 21A, the cathode active material layer 21B, the anode current collector 22A, the anode active material layer 22B, the anode coat 22C, and the separator 23 of the foregoing first secondary battery.

The electrolyte layer 36 is a so-called gel electrolyte, containing an electrolytic solution and a polymer compound that holds the electrolytic solution. The gel electrolyte is preferable, since thereby high ion conductivity (for example, 1 mS/cm or more at room temperatures) is obtained and liquid leakage is prevented.

Examples of the polymer compound include, for example, polyacrylonitrile, polyvinylidene fluoride, a copolymer of polyvinylidene fluoride and polyhexafluoro propylene, polytetrafluoroethylene, polyhexafluoro propylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. One of these polymer compounds may be used singly, or a plurality thereof may be used by mixture. Specially, polyacrylonitrile, polyvinylidene fluoride, polyhexafluoro propylene, or polyethylene oxide is preferable, since such a compound is electrochemically stable.

The composition of the electrolytic solution is similar to the composition of the electrolytic solution in the foregoing first secondary battery. However, in this case, the solvent means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte layer 36 in which the electrolytic solution is held by the polymer compound, the electrolytic solution may be directly used. In this case, the electrolytic solution is impregnated in the separator 35.

The secondary battery including the gel electrolyte layer 36 is manufactured, for example, by the following three manufacturing methods.

In the first manufacturing method, first, for example, the cathode 33 is formed by forming the cathode active material layer 33B on both faces of the cathode current collector 33A, and the anode 34 is formed by forming the anode active material layer 34B and the anode coat 34C on both faces of the anode current collector 34A by a procedure similar to the procedure of forming the cathode 21 and the anode 22 in the foregoing first secondary battery. Subsequently, a precursor solution containing an electrolytic solution, a polymer compound, and a solvent is prepared. After the cathode 33 and the anode 34 are coated with the precursor solution, the solvent is volatilized to form the gel electrolyte layer 36. Subsequently, the cathode lead 31 is attached to the cathode current collector 33A by welding or the like, and the anode lead 32 is attached to the anode current collector 34A by welding or the like. Subsequently, the cathode 33 and the anode 34 provided with the electrolyte layer 36 are layered with the separator 35 in between, and the resultant is spirally wound in the longitudinal direction. The protective tape 37 is adhered to the outermost periphery thereof to form the wound electrode body 30. Finally, for example, after the wound electrode body 30 is sandwiched between 2 pieces of the film package members 40, outer edges of the package members 40 are contacted by thermal fusion bonding or the like to enclose the wound electrode body 30. At this time, the adhesive films 41 are inserted between the cathode lead 31 and the package member 40, and between the anode lead 32 and the package member 40. Thereby, the laminated film type secondary battery illustrated in FIG. 7 to FIG. 9 is completed.

In the second manufacturing method, first, the cathode lead 31 is attached to the cathode 33, and the anode lead 32 is attached to the anode 34. Thereafter, the cathode 33 and the anode 34 are layered with the separator 35 in between and the resultant is spirally wound. The protective tape 37 is adhered to the outermost periphery thereof, and thereby a wound body as a precursor of the wound electrode body 30 is formed. Subsequently, after the wound body is sandwiched between 2 pieces of the film package members 40, the outermost peripheries except for one side are bonded by thermal fusion bonding or the like to obtain a pouched state, and the wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. Thereafter, the opening of the package member 40 is hermetically sealed by thermal fusion bonding or the like. Finally, the monomer is thermally polymerized to obtain a polymer compound. Thereby, the gel electrolyte layer 36 is formed. Accordingly, the secondary battery is completed.

In the third manufacturing method, the wound body is formed and contained in the pouch-like package member 40 in the same manner as that of the foregoing second manufacturing method, except that the separator 35 with both faces coated with a polymer compound is used firstly. Examples of the polymer compound with which the separator 35 is coated include a polymer containing vinylidene fluoride as a component, that is, a homopolymer, a copolymer, and a multi-component copolymer. Specific examples include polyvinylidene fluoride, a binary copolymer containing vinylidene fluoride and hexafluoro propylene as a component, a ternary copolymer containing vinylidene fluoride, hexafluoro propylene, and chlorotrifluoroethylene as a component. As a polymer compound, in addition to the polymer containing vinylidene fluoride as a component described above, another one or more polymer compounds may be contained. Subsequently, an electrolytic solution is prepared and injected into the package member 40. Thereafter, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution is impregnated into the polymer compound, and the polymer compound is gelated to form the electrolyte layer 36. Accordingly, the secondary battery is completed.

In the third manufacturing method, the swollenness of the secondary battery is inhibited compared to the first manufacturing method. Further, in the third manufacturing method, the monomer as a raw material of the polymer compound, a polymer initiator and the like are hardly left in the electrolyte layer 36 compared to the second manufacturing method, and the formation step of the polymer compound is favorably controlled. Thus, sufficient contact characteristics are obtained between the cathode 33/the anode 34/the separator 35 and the electrolyte layer 36.

According to another first secondary battery and the method of manufacturing the same, the anode coat 34C containing the radical scavenger compound shown in Formula (1) is provided on the anode active material layer 34B. Thus, the cycle characteristics are able to be improved by action similar to that of the foregoing first secondary battery. Other effect of the secondary battery and the method of manufacturing the same are similar to those described for the foregoing first secondary battery and the method of manufacturing the same.

Figure 10:
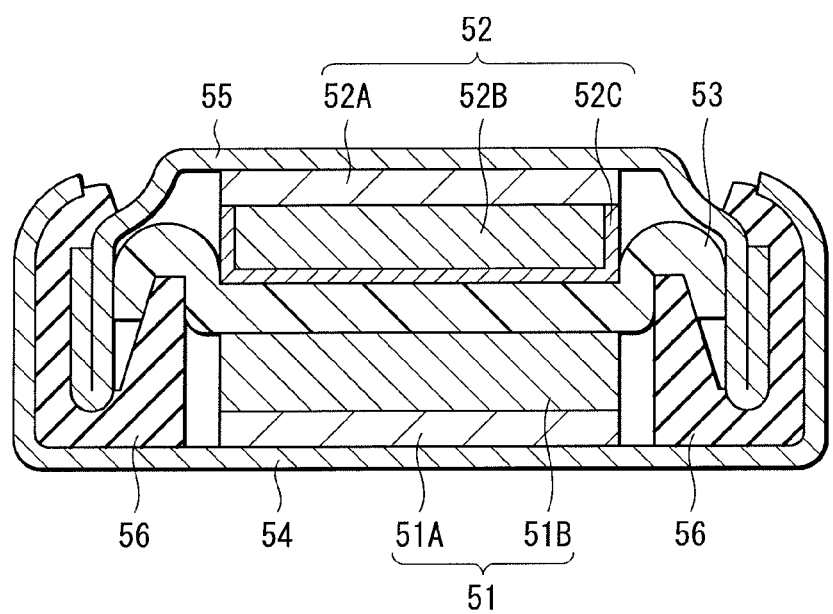
FIG. 10 is a cross sectional view illustrating a structure of another modified example of the secondary battery according to the first embodiment of the present invention (still another first secondary battery).

FIG. 10 illustrates a cross sectional structure of still another first secondary battery. The secondary battery is a lithium ion secondary battery similar to the foregoing first secondary battery, in which a cathode 51 is attached to a package can 54, an anode 52 is contained in a package cup 55, the package can 54 and the package cup 55 are layered with a separator 53 impregnated with an electrolytic solution in between, and the resultant is subsequently caulked with a gasket 56. Such a battery structure using the package can 54 and the package cup 55 is called coin type structure.

The cathode 51 has a structure in which, for example, a cathode active material layer 51B is provided on a single face of a cathode current collector 51A. In the anode 52, an anode active material layer 52B and an anode coat 52C are provided in this order on a single face of an anode current collector 52A. The structures of the cathode current collector 51A, the cathode active material layer 51B, the anode current collector 52A, the anode active material layer 52B, the anode coat 52C, and the separator 53 are respectively similar to those of the cathode current collector 21A, the cathode active material layer 21B, the anode current collector 22A, the anode active material layer 22B, the anode coat 22C, and the separator 23 described above. The composition of the electrolytic solution impregnated in the separator 53 is similar to the composition of the electrolytic solution in the foregoing first secondary battery.

According to still another first secondary battery, the anode coat 52C containing the radical scavenger compound shown in Formula (1) is provided on the anode active material layer 52B. Thus, the cycle characteristics are able to be improved by action similar to that of the foregoing first secondary battery. Other effect of the secondary battery and the method of manufacturing the same are similar to those described for the foregoing first secondary battery and the method of manufacturing the same.

(Second Secondary Battery)

Figure 11:
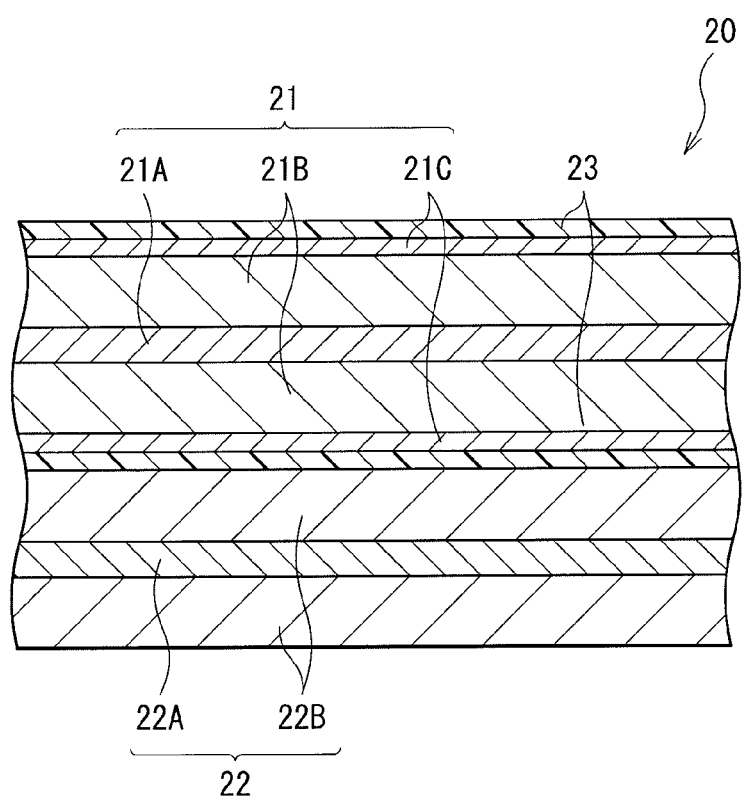
FIG. 11 is a cross sectional view illustrating a structure of a main section of the secondary battery according to the first embodiment of the present invention (second secondary battery).

FIG. 11 illustrates a structure of a second secondary battery, and illustrates a cross sectional structure corresponding to FIG. 2. The second secondary battery has a structure similar to that of the foregoing first secondary battery, except that instead of the anode 22, the cathode 21 contains the radical scavenger compound shown in Formula (1).

In the cathode 21, for example, the cathode active material layer 21B and a cathode coat 21C are provided in this order on both faces of the cathode current collector 21A. However, the cathode coat 21C may be provided only on a single face of the cathode current collector 21A.

The cathode coat 21C is formed on the cathode active material layer 21B after the cathode active material layer 21B is formed on the cathode current collector 21A. The structure of the cathode coat 21C is similar to that of the structure of the anode coat 22C in the foregoing first secondary battery. In other words, the cathode coat 21C contains the radical scavenger compound shown in Formula (1), since thereby chemical stability of the cathode 21 is improved. Thereby, lithium ions are effectively inserted and extracted in the cathode 21, and decomposition reaction of the electrolyte is inhibited.

In the anode 22, for example, the anode active material layer 22B is provided on both faces of the anode current collector 22A.

The secondary battery is manufactured by a procedure similar to that of the foregoing first secondary battery, except that the cathode 21 is formed by forming the cathode active material layer 21B and the cathode coat 21C in this order on both faces of the cathode current collector 21A, and the anode 22 is formed by forming the anode active material layer 22B on both faces of the anode current collector 22A.

According to the second secondary battery and the method of manufacturing the same, since the cathode coat 21C containing the radical scavenger compound shown in Formula (1) is provided on the cathode active material layer 21B, chemical stability of the cathode 21 is improved. Thus, the cycle characteristics are able to be improved. In this case, in particular, since resistance component of the anode 22 is decreased, resistance characteristics are able to be improved as well. Other effect of the secondary battery and the method of manufacturing the same is similar to that described for the foregoing first secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type.

Figure 12:
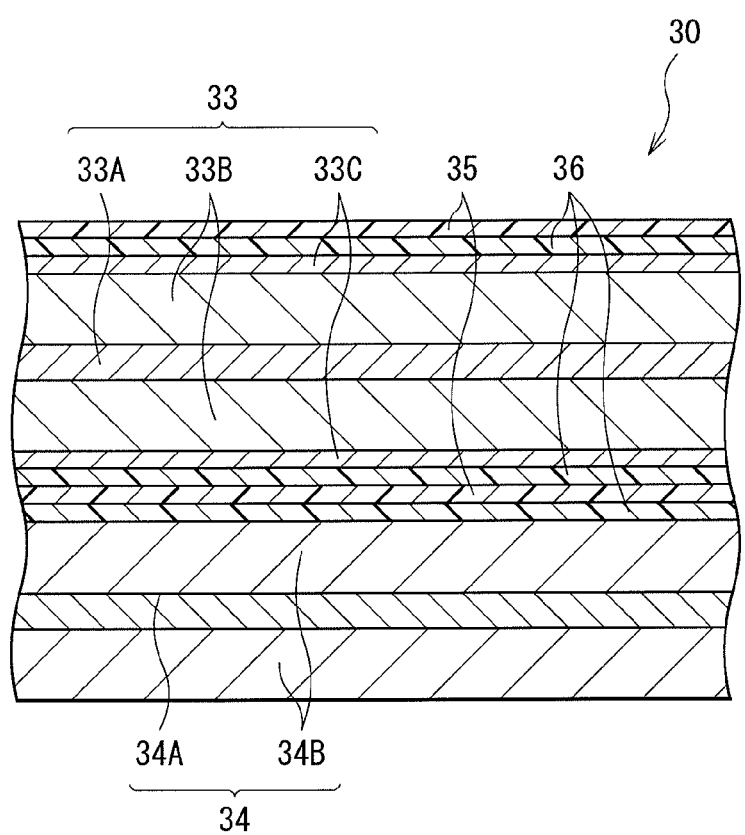
FIG. 12 is a cross sectional view illustrating a structure of a modified example of the secondary battery according to the first embodiment of the present invention (another second secondary battery).

FIG. 12 illustrates a structure of another second secondary battery, and illustrates a cross sectional structure corresponding to FIG. 9. The secondary battery has a structure similar to that of the foregoing another first secondary battery, except that, for example, instead of the anode 34, the cathode 33 contains the radical scavenger compound shown in Formula (1).

The cathode 33 has a structure similar to that of the cathode 21 in the foregoing second secondary battery. In the cathode 33, for example, the cathode active material layer 33B and a cathode coat 33C are provided in this order on both faces of the cathode current collector 33A. The anode 34 has a structure similar to that of the anode 22 in the foregoing second secondary battery. In the anode 34, for example, the anode active material layer 34B is provided on both faces of the anode current collector 34A.

The secondary battery is manufactured by a procedure similar to that of the foregoing another first secondary battery, except that the cathode 33 is formed by forming the cathode active material layer 33B and the cathode coat 33C in this order on both faces of the cathode current collector 33A, and the anode 34 is formed by forming the anode active material layer 34B on one face of the anode current collector 34A.

According to such another second secondary battery and the method of manufacturing the same, since the cathode coat 33C containing the radical scavenger compound shown in Formula (1) is provided on the cathode active material layer 33B, the cycle characteristics are able to be improved by action similar to that of the foregoing second secondary battery. Other effect of the secondary battery and the method of manufacturing the same is similar to that described for the foregoing second secondary battery and the method of manufacturing the same.

Figure 13:
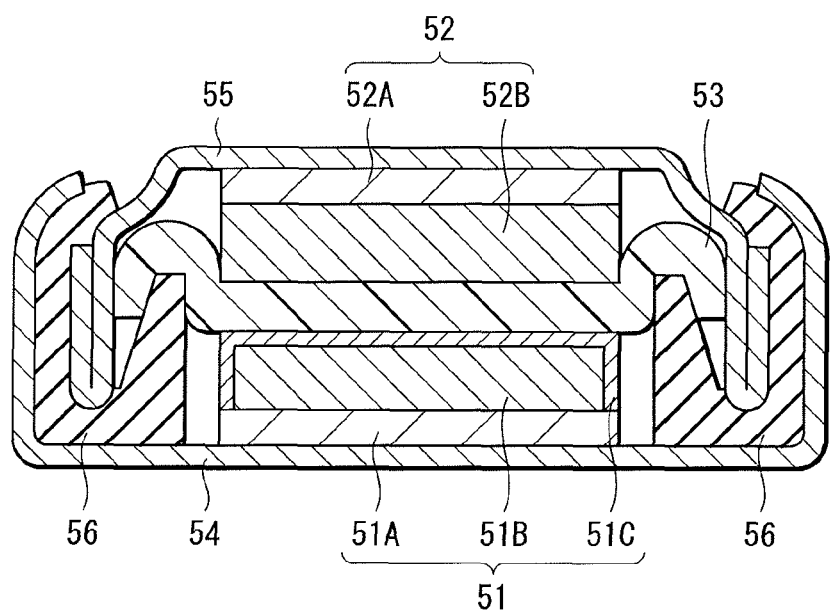
FIG. 13 is a cross sectional view illustrating a structure of another modified example of the secondary battery according to the first embodiment of the present invention (still another second secondary battery).

FIG. 13 illustrates a structure of still another second secondary battery, and illustrates a cross sectional structure corresponding to FIG. 10. The secondary battery has a structure similar to that of the foregoing still another first secondary battery, except that, for example, instead of the anode 52, the cathode 51 contains the radical scavenger compound shown in Formula (1).

The cathode 51 has a structure similar to that of the cathode 21 in the foregoing second secondary battery. In the cathode 51, for example, the cathode active material layer 51B and a cathode coat 51C are provided in this order on one face of the cathode current collector 51A. The anode 52 has a structure similar to that of the anode 22 in the foregoing second secondary battery. In the anode 52, for example, the anode active material layer 52B is provided on one face of the anode current collector 52A.

The secondary battery is manufactured by a procedure similar to that of the foregoing still another first secondary battery, except that the cathode 51 is formed by forming the cathode active material layer 51B and the cathode coat 51C in this order on one face of the cathode current collector 51A, and the anode 52 is formed by forming the anode active material layer 52B on one face of the anode current collector 52A.

According to such still another second secondary battery and the method of manufacturing the same, since the cathode coat 51C containing the radical scavenger compound shown in Formula (1) is provided on the cathode active material layer 51B, the cycle characteristics are able to be improved by action similar to that of the foregoing second secondary battery. Other effect of the secondary battery and the method of manufacturing the same is similar to that described for the foregoing second secondary battery and the method of manufacturing the same.

The description has been hereinbefore given of the case that the cathode coat containing the radical scavenger compound is provided on the cathode active material layer. However, the radical scavenger compound may be contained in any section of the cathode, as long as the cathode contains the radical scavenger compound.

Figure 14:
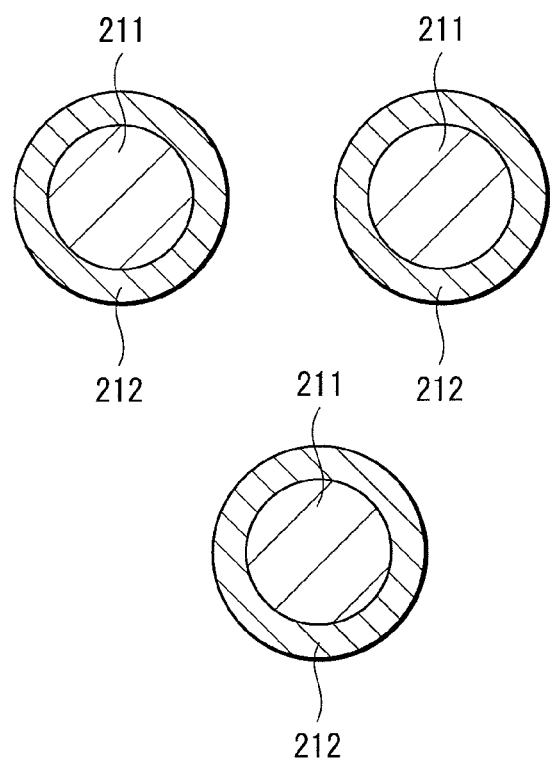
FIG. 14 is a cross sectional view illustrating a structure of a main section of the secondary battery according to the first embodiment of the present invention (second secondary battery).

For example, as illustrated in FIG. 14, in the case where the cathode active material is composed of a plurality of particles (cathode active material particles 211), instead of forming the cathode coat on the cathode active material layer, a particle coating film 212 containing the radical scavenger compound may be provided to coat the surface of the cathode active material particles 211. In this case, all of the surface of the cathode active material particles 211 may be coated with the particle coating film 212, or part of the surface of the cathode active material particles 211 may be coated with the particle coating film 212. In this case, since chemical stability of the cathode is improved, the cycle characteristics are able to be improved.

The cathode including the particle coating film 212 is formed by using a solution containing the radical scavenger compound by the following procedure. Specifically, first, after the cathode active material particles 211 are dipped in the solution containing the radical scavenger compound, the resultant is pulled out from the solution and dried. Thereby, the particle coating film 212 containing the radical scavenger compound is formed on the surface of the cathode active material particles 211. Subsequently, the cathode active material particles 211 on which the particle coating film 212 is formed, a cathode electrical conductor, and a cathode binder are mixed to prepare a cathode mixture, which is dispersed in a solvent to form a paste cathode mixture slurry. Finally, the cathode current collector is coated with the cathode mixture slurry, and the resultant is dried. Thereafter, the resultant is compression-molded to form the cathode active material layer.

(Third Secondary Battery)

Figure 15:
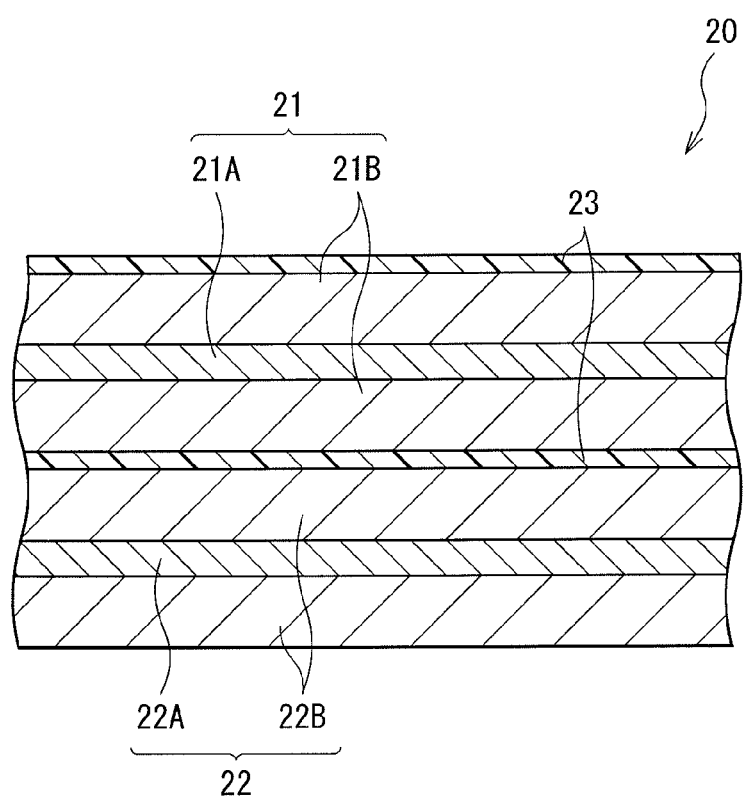
FIG. 15 is a cross sectional view illustrating a structure of a modified example of the secondary battery according to the first embodiment of the present invention (third secondary battery).

FIG. 15 illustrates a structure of a third secondary battery, and illustrates a cross sectional structure corresponding to FIG. 2. The third secondary battery has a structure similar to that of the foregoing first secondary battery, except that, for example, instead of the anode 22, the electrolyte contains the radical scavenger compound shown in Formula (1).

In the cathode 21, for example, the cathode active material layer 21B is provided on both faces of the cathode current collector 21A. In the anode 22, for example, the anode active material layer 22B is provided on both faces of the anode current collector 22A.

The electrolyte contains the radical scavenger compound shown in Formula (1) together with a solvent and an electrolyte salt. The radical scavenger compound is dissolved or dispersed in the solvent.

The secondary battery is manufactured by a procedure similar to that of the foregoing first secondary battery, except that the cathode 21 is formed by forming the cathode active material layer 21B on both faces of the cathode current collector 21A, the anode 22 is formed by forming the anode active material layer 22B on both faces of the anode current collector 22A, and the electrolyte is prepared by dissolving the electrolyte salt in the solvent in which the radical scavenger compound is dispersed.

According to the third secondary battery and the method of manufacturing the same, since the electrolyte contains the radical scavenger compound shown in Formula (1), chemical stability of the electrolyte is improved. Thereby, at the time of charge and discharge, decomposition reaction of the electrolyte is inhibited. Thus, the cycle characteristics are able to be improved. Other effect of the secondary battery and the method of manufacturing the same is similar to that described for the foregoing first secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type.

Figure 16:
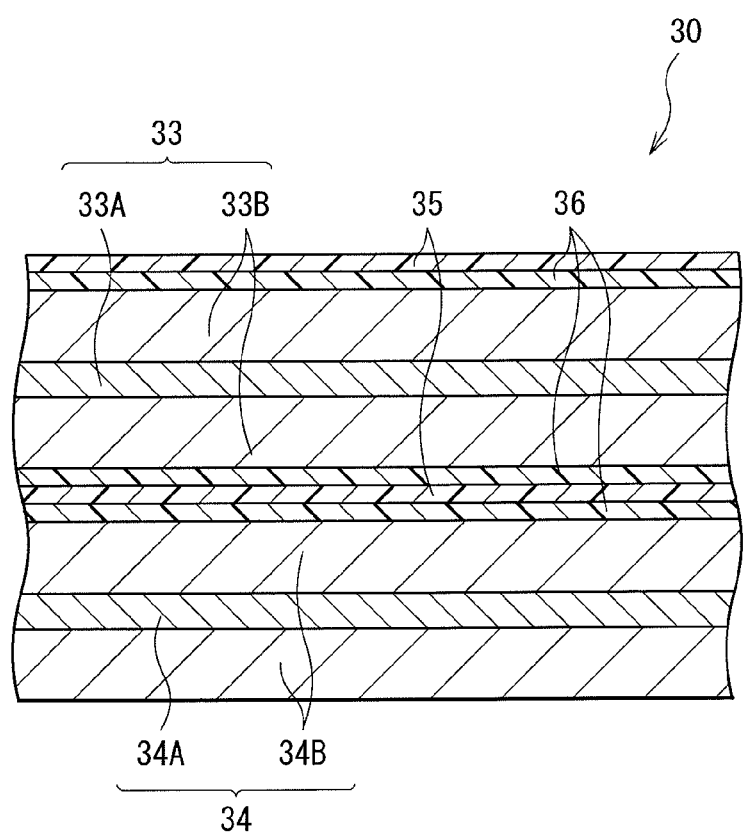
FIG. 16 is a cross sectional view illustrating a structure of another modified example of the secondary battery according to the first embodiment of the present invention (another third secondary battery).

FIG. 16 illustrates a structure of another third secondary battery, and illustrates a cross sectional structure corresponding to FIG. 9. The secondary battery has a structure similar to that of the foregoing another first secondary battery, except that instead of the anode 34, the electrolyte (electrolyte layer 36) contains the radical scavenger compound shown in Formula (1).

The cathode 33 has a structure similar to that of the cathode 21 in the foregoing third secondary battery. In the cathode 33, for example, the cathode active material layer 33B is provided on both faces of the cathode current collector 33A. The anode 34 has a structure similar to that of the anode 22 in the foregoing third secondary battery. In the anode 34, for example, the anode active material layer 34B is provided on both faces of the anode current collector 34A.

The electrolyte has a composition similar to that of the electrolyte in the foregoing third secondary battery. For example, the electrolyte contains the radical scavenger compound shown in Formula (1) together with a solvent, an electrolyte salt, and a polymer compound.

The secondary battery is manufactured by a procedure similar to that of the foregoing another first secondary battery, except that the cathode 33 is formed by forming the cathode active material layer 33B on both faces of the cathode current collector 33A, the anode 34 is formed by forming the anode active material layer 34B on both faces of the anode current collector 34A, and the electrolytic solution is prepared by dissolving the electrolyte salt in the solvent in which the radical scavenger compound is dispersed.

According to such another third secondary battery and the method of manufacturing the same, since the electrolyte contains the radical scavenger compound shown in Formula (1), the cycle characteristics are able to be improved by action similar to that of the foregoing third secondary battery. Other effect of the secondary battery and the method of manufacturing the same is similar to that described for the foregoing third secondary battery and the method of manufacturing the same.

Figure 17:
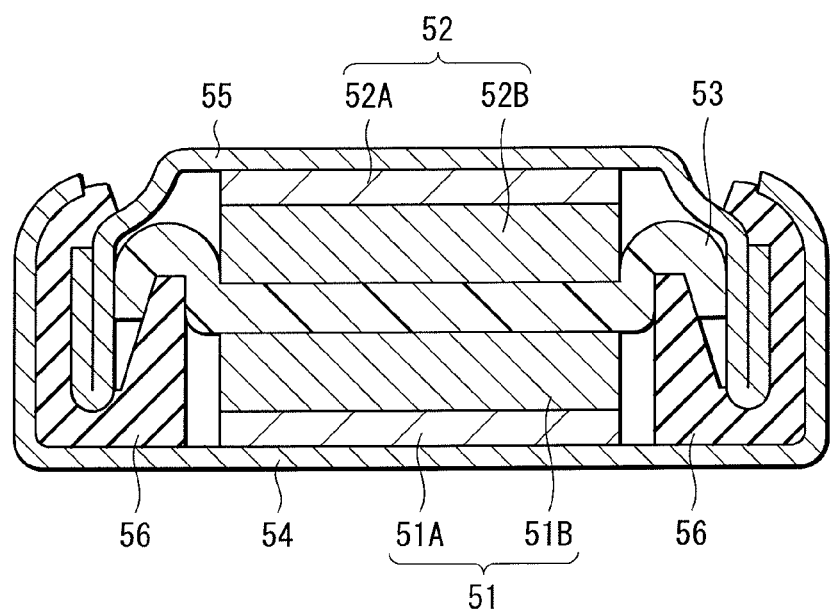
FIG. 17 is a cross sectional view illustrating a structure of another modified example of the secondary battery according to the first embodiment of the present invention (still another third secondary battery).

FIG. 17 illustrates a structure of still another third secondary battery, and illustrates a cross sectional structure corresponding to FIG. 10. The secondary battery has a structure similar to that of the foregoing still another first secondary battery, except that, for example, instead of the anode 52, the electrolyte contains the radical scavenger compound shown in Formula (1).

The cathode 51 has a structure similar to that of the cathode 21 in the foregoing third secondary battery. In the cathode 51, for example, the cathode active material layer 51B is provided on one face of the cathode current collector 51A. The anode 52 has a structure similar to that of the anode 22 in the foregoing third secondary battery. In the anode 52, for example, the anode active material layer 52B is provided on one face of the anode current collector 52A.

The electrolyte has a composition similar to that of the electrolyte in the foregoing third secondary battery. For example, the electrolyte contains the radical scavenger compound shown in Formula (1) together with a solvent, an electrolyte salt, and a polymer compound.

The secondary battery is manufactured by a procedure similar to that of the foregoing still another first secondary battery, except that the cathode 51 is formed by forming the cathode active material layer 51B on both faces of the cathode current collector 51A, the anode 52 is formed by forming the anode active material layer 52B on both faces of the anode current collector 52A, and the electrolytic solution is prepared by dissolving the electrolyte salt in the solvent in which the radical scavenger compound is dispersed.

According to such still another third secondary battery and the method of manufacturing the same, since the electrolyte contains the radical scavenger compound shown in Formula (1), the cycle characteristics are able to be improved by action similar to that of the foregoing third secondary battery. Other effect of the secondary battery and the method of manufacturing the same is similar to that described for the foregoing third secondary battery and the method of manufacturing the same.

In the foregoing first secondary battery to the third secondary battery, one of the cathode 21, the anode 22, and the electrolyte contains the radical scavenger compound. However, the present invention is not limited thereto, but two or more out of the cathode 21, the anode 22, and the electrolyte containing the radical scavenger compound may be used by combination. The same is applied to the foregoing another first secondary battery to another third secondary battery and the foregoing still another first secondary battery to still another third secondary battery.

Further, in the foregoing first secondary battery to the third secondary battery, one of the cathode 21, the anode 22, and the electrolyte contains the radical scavenger compound. However, the present invention is not limited thereto, but other element may contain the radical scavenger compound. Examples of such other element include the separator 23. In the case where the separator 23 contains the radical scavenger compound, for example, the radical scavenger compound is introduced into the separator 23 as a coat in the same manner as in the case that the cathode 21 and the anode 22 contain the radical scavenger compound. Specifically, for example, the coat containing the radical scavenger compound is provided on both faces of the separator 23. The same is applied to the foregoing another first secondary battery to another third secondary battery and the foregoing still another first secondary battery to still another third secondary battery.

Second Embodiment

In a secondary battery according to a second embodiment of the present invention, at least one of the cathode, the anode, and the electrolyte contains a nitrile compound shown in Formula (2). In other words, the secondary battery of this embodiment has a structure similar to that of the secondary battery of the first embodiment, except that the nitrile compound shown in Formula (2) is used instead of the radical scavenger compound shown in Formula (1). In this case, only one of the nitrile compounds shown in Formula (2) may be contained, or two or more thereof may be contained.

[Chemical formula 24]

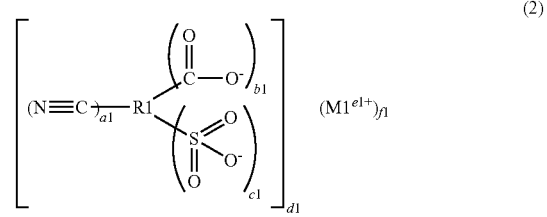

(R1 is a group with (a1+b1+c1) valency composed of an element selected from the group consisting of hydrogen, oxygen, and halogen elements and carbon, and M1 is a metal element. a1, d1, f1, and e1 are an integer equal to or more than 1. b1 and c1 are an integer equal to or more than 0. (b1+c1)≥1 is satisfied.)

The introduction form of the nitrile compounds shown in Formula (2) to the cathode, the anode, or the electrolyte is similar to the introduction form of the radical scavenger compound shown in the foregoing Formula (1).

At least one of the cathode, the anode, and the electrolyte contains the nitrile compound shown in Formula (2) for the following reason. That is, chemical stability of a component containing the nitrile compound shown in Formula (2) is thereby improved. More specifically, in the case where the cathode or the anode contains the nitrile compound, a coat or a particle coating film containing the nitrile compound functions as a protective film, and thus the cathode or the anode is stabilized chemically. Thereby, at the time of charge and discharge, the electrode reactant is easily inserted or extracted in the cathode or the anode, and decomposition reaction of the electrolyte is inhibited. Meanwhile, in the case where the electrolyte contains the nitrile compound, the nitrile compound functions as a stabilizer, and thus the electrolyte is stabilized chemically. Thereby, decomposition reaction of the electrolyte is inhibited.

At least one of the cathode, the anode, and the electrolyte contains the nitrile compound. Thus, a component containing the nitrile compound may be one of the cathode, the anode, and the electrolyte, may be given two thereof, or may be all thereof.

Out of the cathode, the anode, and the electrolyte, the number of components containing the nitrile compound is preferably large as much as possible, since thereby higher effect is able to be obtained. In the case where only one of the cathode, the anode, and the electrolyte contains the nitrile compound, the preferable component containing the nitrile compound is the electrolyte, the more preferable component containing the nitrile compound is the cathode, and the most preferable component containing the nitrile compound is the anode (electrolyte<cathode<anode) for the following reason.

That is, higher effect is able to be obtained in the electrodes (the cathode and the anode) than in the electrolyte, and higher effect is able to be obtained in the anode than in the cathode out of the electrodes. Further, in the case where given two of the cathode, the anode, and the electrolyte contain the nitrile compound, the preferable components containing the nitrile compound are the cathode and the anode, since higher effect is able to be obtained in the electrode than in the electrolyte.

The nitrile compound shown in Formula (2) is a compound that has one or more nitrile groups (—C≡N) and one or more sulfonic ion groups (—SO$_3^-$) or one or more carboxylic ion groups (—COO$^-$), and structures a metal salt. a1, d1, f1, and e1 in Formula (2) may be identical with each other or different from each other. The same is applied to b1 and c1 in Formula (2). d1 and f1 in Formula (2) are determined by the number of sulfonic ion groups and carboxylic ion groups (b1 and c1), valency of the metal element (M1) and the like.

The entire structure of R1 in Formula (2) is voluntary, as long as R1 is composed of an element selected from the group consisting of hydrogen, oxygen, and halogen elements and carbon. For example, R1 may contain carbon and have a straight chain skeleton or may have a branched chain skeleton, or may have a cyclic skeleton. Oxygen may be contained as an element of these skeletons, or an unsaturated double bond or a triple bond (—C≡C—) may be included. It is needless to say that these skeletons exist by mixture. The number of carbon structuring such a skeleton is preferably from 1 to 10 both inclusive. In the case where the number of carbon is larger than 10, there is a possibility that internal resistance of the secondary battery is increased. Further, a halogen element may be introduced to the carbon structuring the skeleton of R1. In this case, halogen element type is not particularly limited, but specially fluorine (F), chlorine (Cl), or bromine (Br) is preferable, and in particular, fluorine is preferable for the following reason. That is, thereby higher effect is obtained than iodine (I), and in particular, high effect is obtained with the use of fluorine.

Examples of R1 include a chain carbon hydride group such as an alkylene group and an alkenylene group; a chain organic group having ether bond (—O—); a cyclic carbon hydride group having a circular structure such as a cyclohexane ring, a benzene ring, and a naphthalene ring; a group obtained by halogenating part or all of hydrogen included in the foregoing groups. Specially, a straight chain carbon hydride group, a straight chain organic group having ether bond (—O—), or a group having a benzene ring or a naphthalene ring is preferable, since such a group is able to be more easily synthesized than a nitrile compound having R1 with other structure, and higher effect is thereby obtained. In particular, carbon structuring the skeleton preferably structures single bond with an adjacent element, and a straight chain saturated carbon hydride group is preferable.

The number (a1) of nitrile groups in Formula (2) is voluntary as long as 1 or more nitrile groups in Formula (2) are introduced to R1. Further, the number of sulfonic ion groups and carboxylic ion groups in Formula (2) is voluntary as long as the sulfonic ion groups and the carboxylic ion groups are introduced to R1, and the total number of sulfonic ion groups and carboxylic ion groups satisfies (b1+c1)≥1. For example, one or more sulfonic ion groups or one or more carboxylic ion groups may be singly introduced to R1, or both the sulfonic ion group and the carboxylic ion group may be introduced to R1, In this case, it is preferable that the sulfonic ion group is singly introduced to R1, since the sulfonic ion group is easily synthesized and higher effect is able to be thereby obtained.

M1 in Formula (2) is voluntary as long as M1 is a metal element that structures ion bond with the sulfonic ion group and the carboxylic ion group. Thus, in the case where the nitrile compound has a plurality of sulfonic ion groups or a plurality of carboxylic ion groups, the number of M1 may be one or a plural. Examples of M1 include an alkali metal element such as lithium (Li), sodium (Na) and potassium (K), an alkali earth metal element such as beryllium (Be), magnesium (Mg), and calcium (Ca), Group 3 elements to Group 11 elements in the long period periodic table as a transition element, Group 12 element in the long period periodic table such as zinc (Zn), and Group 13 element in the long period periodic table such as aluminum (Al) and gallium (Ga). Specially, as M1, at least one of the alkali metal elements and the alkali earth metal elements is preferable, since thereby high effect is able to be obtained. In particular, M1 in Formula (2) is preferably a metal element similar to an electrode reactant. Specifically, in the case where the electrode reactant is lithium ions, M1 is preferably lithium, since thereby higher effect is able to be obtained.

Examples of the nitrile compound shown in Formula (2) include compounds expressed by Formula (2-1) to Formula (2-68). In other words, the compounds shown in Formula (2-1) to Formula (2-30) are a lithium salt having a nitrile group and a sulfonic ion group. Specifically, the compounds shown in Formula (2-1) to Formula (2-9) are an example of a compound having an alkylene group as a chain carbon hydride group (Formula (2-1) to Formula (2-7)), having a group obtained by halogenating a chain carbon hydride group (Formula (2-8)), or having a chain organic group having an ether bond (Formula (2-9)) as R1. The compound shown in Formula (2-10) is an example of a compound having a group containing cyclohexane ring as R1. The compounds shown in Formula (2-11) to Formula (2-22) are an example of a compound having a group including a benzene ring as R1. The compounds shown in Formula (2-23) to Formula (2-30) are an example of a compound having a group including a naphthalene ring as R1.

Further, the compounds shown in Formula (2-31) to Formula (2-60) are a lithium salt having a nitrile group and a carboxylic ion group. Specifically, the compounds shown in Formula (2-31) to Formula (2-39) are an example of a compound having an alkylene group as a chain carbon hydride group (Formula (2-31) to Formula (2-37)), having a group obtained by halogenating a chain carbon hydride group (Formula (2-38)), or having a chain organic group having an ether bond (Formula (2-39)) as R1. The compound shown in Formula (2-40) is an example of a compound having a group containing a cyclohexane ring as R1. The compounds shown in Formula (2-41) to Formula (2-52) are an example of a compound having a group including a benzene ring as R1. The compounds shown in Formula (2-53) to Formula (2-60) are an example of a compound having a group including a naphthalene ring as R1.

Further, the compounds shown in Formula (2-61) to Formula (2-68) are a lithium salt having a nitrile group, a sulfonic ion group, and a carboxylic ion group; a sodium salt having a nitrile group and a sulfonic ion group/a carboxylic ion group; a magnesium salt; or an aluminum salt.

[Chemical formula 25]

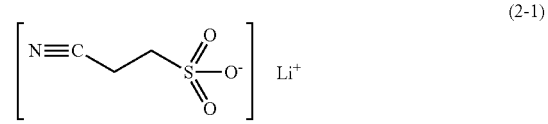

(2-1)

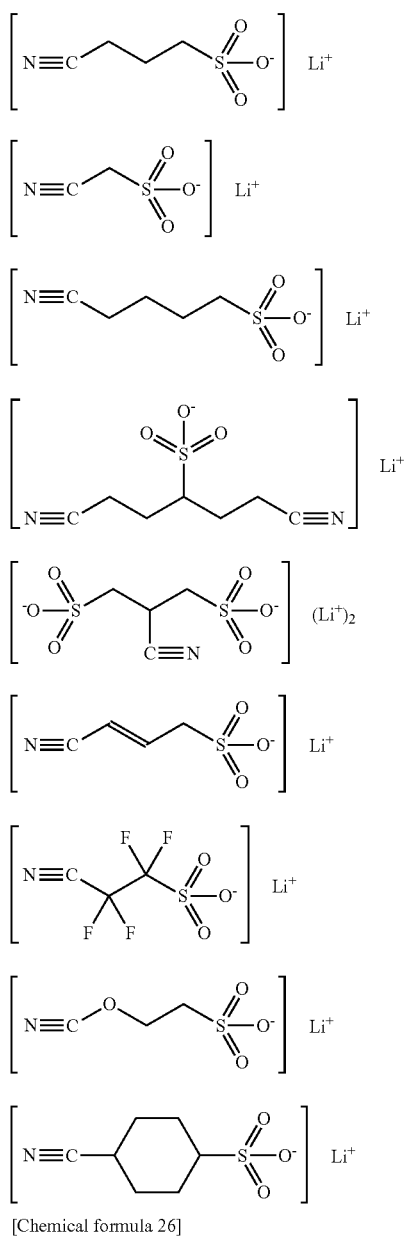
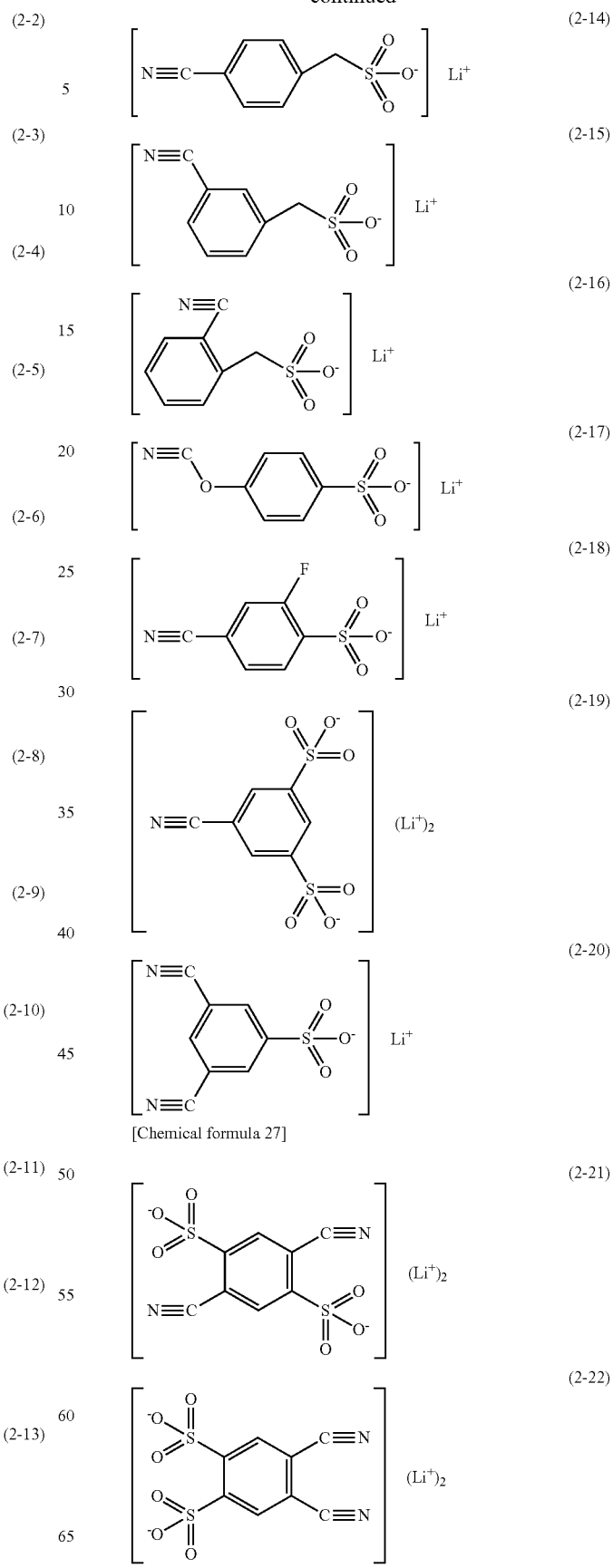

(2-23) 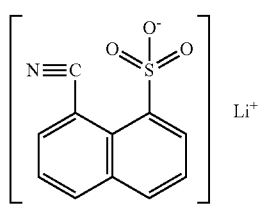 Li⁺
(2-24) 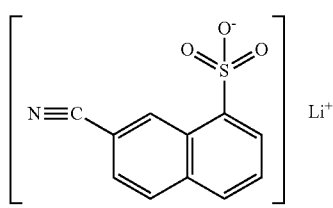 Li⁺
(2-25) 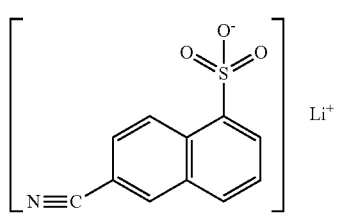 Li⁺
(2-26) 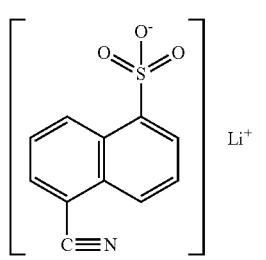 Li⁺
(2-27) 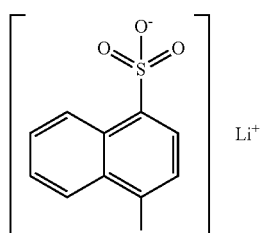 Li⁺
(2-28) 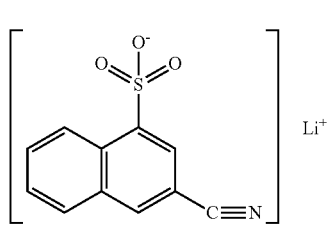 Li⁺
(2-29) 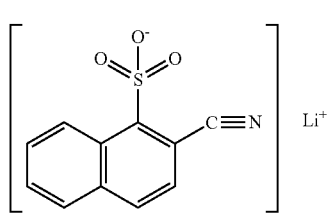 Li⁺
(2-30) 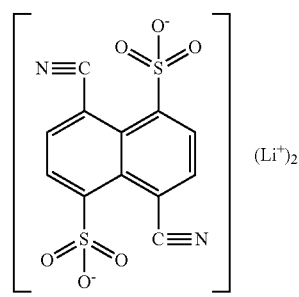 (Li⁺)₂
[Chemical formula 28]
(2-31) 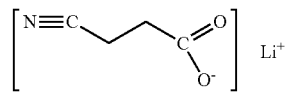 Li⁺
(2-32) 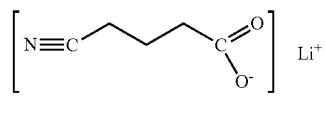 Li⁺
(2-33) 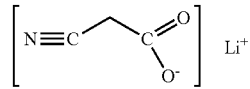 Li⁺
(2-34) Li⁺
(2-35) 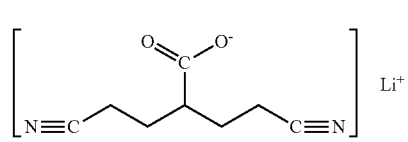 Li⁺
(2-36) 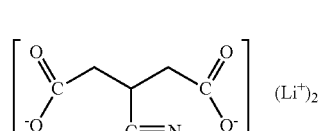 (Li⁺)₂
(2-37) 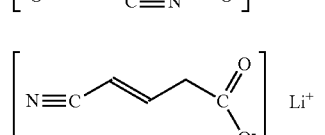 Li⁺
(2-38) 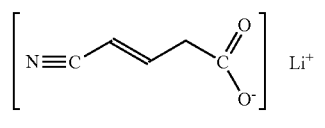 Li⁺
(2-39) 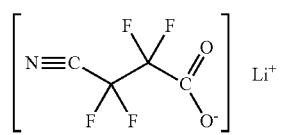 Li⁺
(2-40) 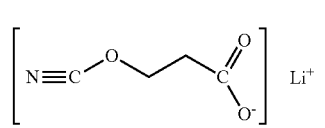 Li⁺

[Chemical formula 29]
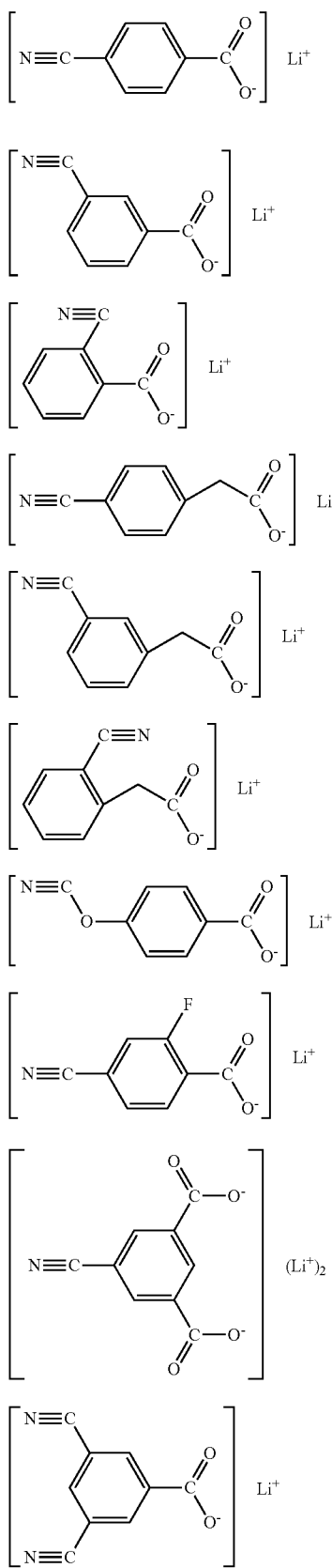
[Chemical formula 30]
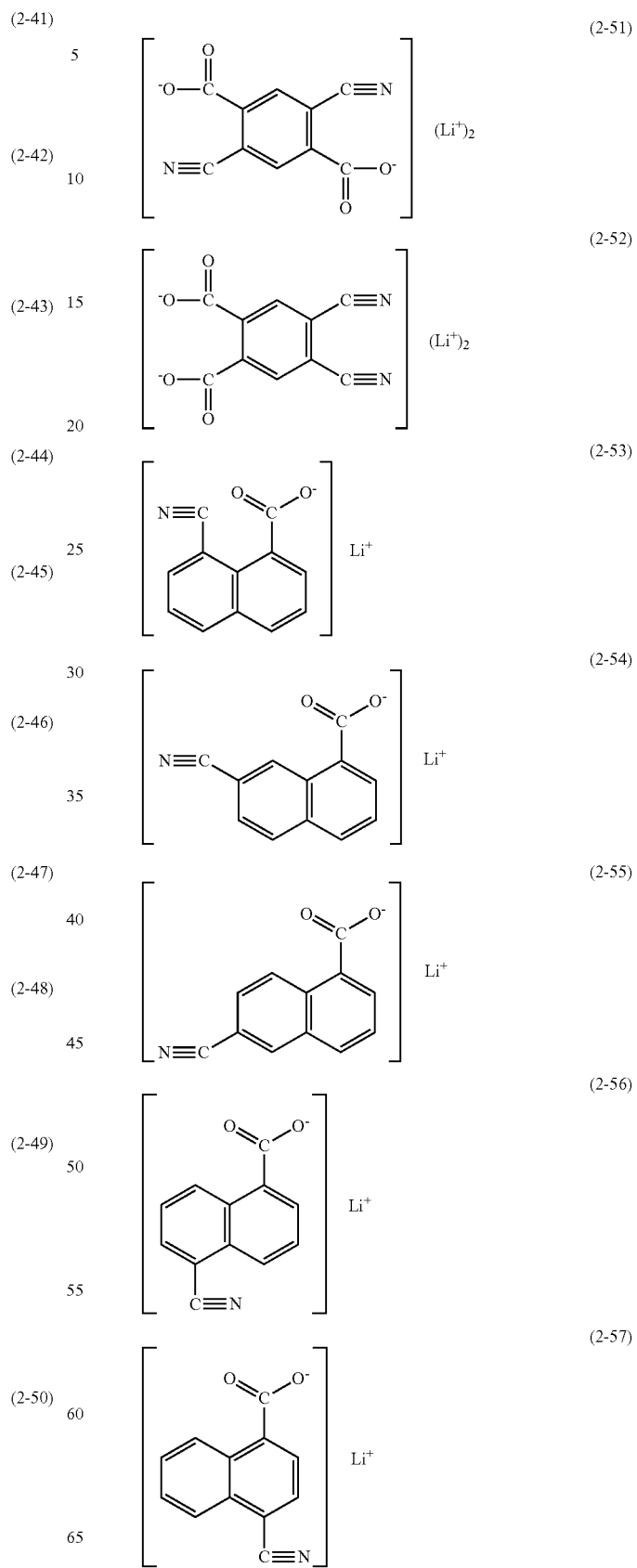

-continued

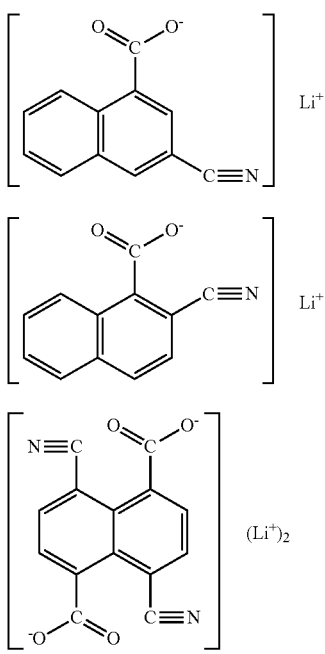

[Chemical formula 31]

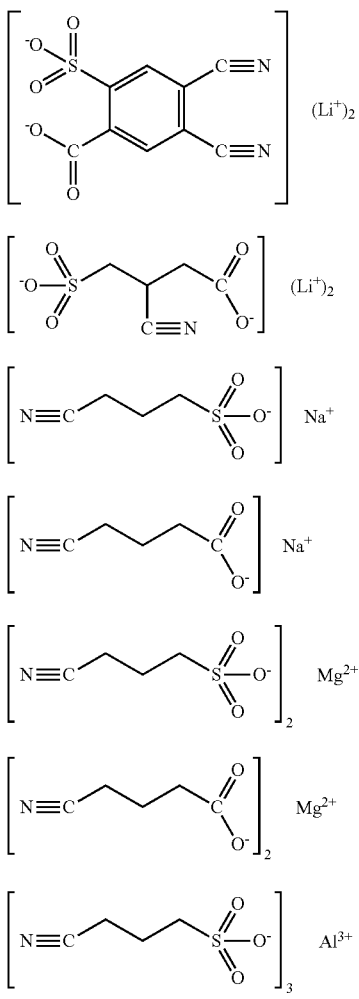

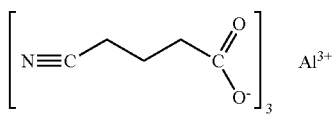

As the nitrile compound shown in Formula (2), specially, the compound shown in Formula (2-1) or the compound shown in Formula (2-2) is preferable, since the compound shown in Formula (2-1) or the compound shown in Formula (2-2) is easily synthesized and higher effect is able to be thereby obtained. Specific examples of the nitrile compound shown in Formula (2) are not limited to the compound having the structure shown in Formula (2-1) to Formula (2-68), as long as the structure shown in Formula (2) is included.

The secondary battery is manufactured by forming or preparing at least one of the cathode, the anode, and the electrolyte to contain the nitrile compound. Specifically, the secondary battery is similar to the secondary battery in the first embodiment, except that the nitrile compound shown in Formula (2) is used instead of the radical scavenger compound shown in Formula (1).

According to the secondary battery and a manufacturing method thereof, at least one of the cathode, the anode, and the electrolyte contains the nitrile compound shown in Formula (2). Thus, compared to a case that the nitrile compound shown in Formula (2) is not contained or a case that other compound (for example, lithium methanesulfonate or acetonitrile) not corresponding to the nitrile compound shown in Formula (2) is contained, chemical stability of at least one of the cathode, the anode, and the electrolyte containing the nitrile compound shown in Formula (2) is improved. Thus, at the time of charge and discharge, the electrode reactant is hardly reacted with the cathode or the anode, and decomposition reaction of the electrolyte is inhibited. Therefore, the cycle characteristics are able to be improved. In other words, in the secondary battery of this embodiment, the battery characteristics are able to be improved. Accordingly, the secondary battery of this embodiment is able to be suitably used, for example, as a power source for an electronic device such as a portable electronic device, an electric power tool, and a power source supply system.

In this case, in the case where a solution containing the nitrile compound shown in Formula (2) is used for forming at least one of the cathode and the anode to contain the nitrile compound, the cathode and the anode containing the nitrile compound shown in Formula (2) is able to be formed compared to a case of using a method necessitating special environmental conditions such as reduced pressure environment.

In particular, in the case where the nitrile compound shown in Formula (2) is the compound shown in Formula (2-1) or the compound shown in Formula (2-2), decomposition reaction of the electrolyte is inhibited, and thus the cycle characteristics are able to be more improved.

Next, a description will be given in detail of the secondary battery according to this embodiment taking a specific example.

The secondary battery herein described as a specific example in this embodiment is, for example, a lithium ion secondary battery in which the capacity of the anode is expressed based on insertion and extraction of lithium ions as an electrode reactant.

(Fourth Secondary Battery)

A fourth secondary battery has a structure similar to that of the first secondary battery of the foregoing first embodiment, except that the nitrile compound shown in Formula (2) is contained in the anode 22, and the nitrile compound shown in Formula (2) is used instead of the radical scavenger compound shown in Formula (1).

In other words, in the cathode 22, for example, the anode active material layer 22B and the anode coat 22C are provided in this order on both faces of the anode current collector 22A. The structures of the anode current collector 22A and the anode active material layer 22B have structures similar to those of the anode current collector 22A and the anode active material layer 22B of the first secondary battery.

The anode coat 22C is formed on the anode active material layer 22B after the anode active material layer 22B is formed on the anode current collector 22A. The anode coat 22C contains one or more nitrile compounds shown in Formula (2) described above. The anode coat 22C containing the nitrile compound shown in Formula (2) is provided on the anode active material layer 22B for the following reason. That is, thereby chemical stability of the anode 22 is improved, and accordingly chemical stability of the electrolyte (electrolytic solution) adjacent to the anode 22 is also improved. Thereby, at the time of charge and discharge, lithium ions are effectively inserted and extracted in the anode 22, decomposition reaction of the electrolyte is inhibited, and thus the cycle characteristics are improved.

In particular, the anode coat 22C preferably contains the nitrile compound shown in the foregoing Formula (2) and one or more alkali metal salts or one or more alkali earth metal salts (except for those corresponding to the nitrile compound shown in Formula (2)). Thereby, coat resistance is inhibited, and thus the cycle characteristics are more improved.

Examples of alkali metal salts and alkali earth metal salts include those similar to the alkali metal salts and the alkali earth metal salts contained in the anode coat 22C of the foregoing first secondary battery.

Examples of methods of forming the anode coat 22C include a method similar to the method of forming the anode coat 22C of the foregoing first secondary battery.

In the fourth secondary battery, when charged, for example, lithium ions are extracted from the cathode 21 and inserted in the anode 22 through the electrolytic solution impregnated in the separator 23. Meanwhile, when discharged, for example, lithium ions are extracted from the anode 22 and inserted in the cathode 21 through the electrolytic solution impregnated in the separator 23.

The fourth secondary battery is manufactured by a procedure similar to that of the foregoing first secondary battery, except that the nitrile compound shown in Formula (2) is used instead of the radical scavenger compound shown in Formula (1).

According to the fourth secondary battery and the method of manufacturing the same, since the anode coat 22C containing the nitrile compound shown in Formula (2) is provided on the anode active material layer 22B, chemical stability of the anode 22 is improved. Thereby, at the time of charge and discharge, lithium ions are easily inserted and extracted in the anode 22, decomposition reaction of the electrolyte is inhibited, and thus the cycle characteristics are able to be improved. In other words, in the fourth secondary battery, the battery characteristics are able to be improved.

In this case, the anode coat 22C is formed by using a solution containing the nitrile compound shown in the foregoing Formula (2). Specifically, the anode coat 22C is formed by using an easy treatment such as dipping treatment and coating treatment. Thus, the favorable anode coat 22C is able to be stably and easily formed compared to a case that a method necessitating special environmental conditions such as reduced pressure environment is used.

In particular, in the case where the anode 22 contains silicon or the like advantageous for realizing high capacity (material that is able to insert and extract lithium ions and that has at least one of metal elements and metalloid elements), the cycle characteristics are improved and thus higher effect is able to be obtained than in the case that other anode material such as a carbon material is contained.

Other effect of the fourth secondary battery and the method of manufacturing the same is similar to that described for the foregoing first secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type. Specifically, the secondary battery may be laminated film type or coin type. In other words, the secondary battery may have a structure similar to that of another first secondary battery or still another first secondary battery, except that the nitrile compound shown in Formula (2) is used instead of the radical scavenger compound shown in Formula (1), and may be manufactured in the same manner as that of another first secondary battery or still another first secondary battery.

In the case where the battery structure is laminated film type, the anode coat 34C containing the nitrile compound shown in Formula (2) is provided on the anode active material layer 34B. In the case where the battery structure is coin type, the anode coat 52C containing the nitrile compound shown in Formula (2) is provided on the anode active material layer 52B. In these cases, the cycle characteristics are able to be improved by action similar to that of the foregoing fourth secondary battery. Other effects of these secondary batteries and the methods of manufacturing the same are similar to those described for the foregoing fourth secondary battery and the method of manufacturing the same.

Further, the description has been hereinbefore given of the case that the anode coat provided on the anode active material layer contains the nitrile compound shown in Formula (2). However, the nitrile compound may be contained in any section of the anode, as long as the anode contains nitrile compound shown in Formula (2). For example, in the case where the anode active material is composed of a plurality of particles, that is, in the case where the anode active material has the anode active material particles, instead of forming the anode coat on the anode active material layer, a particle coating film containing the nitrile compound shown in Formula (2) may be provided to coat the surface of the anode active material particles. In this case, all of the surface of the anode active material particles may be coated with the particle coating film, or part of the surface of the anode active material particles may be coated with the particle coating film. In this case, since chemical stability of the anode is improved, the cycle characteristics are improved as well. Such an anode is able to be formed by using a solution containing the nitrile compound shown in Formula (2). Specifically, first, after the anode active material particles made of the foregoing anode material is dispersed in the solution containing the nitrile compound shown in Formula (2), the anode active material particles are pulled out from the solution and dried. Thereby, the particle coating film containing the nitrile compound shown in Formula (2) is formed on the surface of the anode active material particles. Subsequently, the anode active material particles, an anode electrical conductor, and an anode binder are mixed to prepare an anode mixture, which is dispersed in a solvent to form a paste anode mixture slurry. The anode current collector is coated with the anode mixture slurry, and the resultant is dried. Thereafter, the resultant is compression-molded to form the anode active material layer. Thereby, the anode is able to be formed.

(Fifth Secondary Battery)

A fifth secondary battery has a structure similar to that of the foregoing fourth secondary battery, except that, for example, instead of the anode 22, the cathode 21 contains the nitrile compound shown in Formula (2). Thus, the fifth secondary battery has a structure similar to that of the foregoing second secondary battery except that the nitrile compound shown in Formula (2) is used instead of the radical scavenger compound shown in Formula (1), and is manufactured by a procedure similar to that of the foregoing second secondary battery.

In other words, the cathode coat 21C provided on the cathode active material layer 21B contains the nitrile compound shown in Formula (2), since thereby chemical stability of the cathode 21 is improved. Thereby, at the time of charge and discharge, lithium ions are effectively inserted and extracted in the cathode 21, decomposition reaction of the electrolyte is inhibited, and thus the cycle characteristics are improved.

According to the fifth secondary battery and the method of manufacturing the same, since the cathode coat 21C containing the nitrile compound shown in Formula (2) is provided on the cathode active material layer 21B, chemical stability of the cathode 21 is improved. Thus, the cycle characteristics are able to be improved. In this case, in particular, since resistance component of the anode 22 is lowered, the resistance characteristics are able to be improved as well. Other effect of the secondary battery and the method of manufacturing the same is similar to that described for the foregoing fourth secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type. Specifically, the secondary battery may be laminated film type or coin type. In other words, the secondary battery may have a structure similar to that of another second secondary battery or still another second secondary battery in the first embodiment, except that the nitrile compound shown in Formula (2) is used instead of the radical scavenger compound shown in Formula (1), and may be manufactured in the same manner as that of another second secondary battery or still another second secondary battery in the first embodiment.

In the case where the battery structure is laminated film type, the cathode coat 33C containing the nitrile compound shown in Formula (2) is provided on the cathode active material layer 33B. In the case where the battery structure is coin type, the cathode coat 51C containing the nitrile compound shown in Formula (2) is provided on the cathode active material layer 51B. In these cases, the cycle characteristics are able to be improved by action similar to that of the foregoing fifth secondary battery. Other effects of these secondary batteries and the methods of manufacturing the same are similar to those described for the foregoing fifth secondary battery and the method of manufacturing the same.

Further, the description has been hereinbefore given of the case that the cathode coat containing the nitrile compound shown in Formula (2) is provided on the cathode active material layer. However, the nitrile compound may be contained in any section of the cathode, as long as the cathode contains the nitrile compound.

For example, as described in the first embodiment with reference to FIG. 14, in the case where the cathode active material is composed of a plurality of particles (cathode active material particles 211), instead of forming the cathode coat on the cathode active material layer, the particle coating film 212 containing the nitrile compound may be provided to coat the surface of the cathode active material particles 211. In this case, all of the surface of the cathode active material particles 211 may be coated with the particle coating film 212, or part of the surface of the cathode active material particles 211 may be coated with the particle coating film 212. In this case, since chemical stability of the cathode is improved, the cycle characteristics are able to be improved.

The cathode including the particle coating film 212 is formed by, for example, a method similar to that of forming the cathode including the particle coating film 212 in the first embodiment, except that a solution containing the nitrile compound shown in Formula (2) is used instead of the solution containing the radical scavenger compound shown in Formula (1).

(Sixth Secondary Battery)

A sixth secondary battery has a structure similar to that of the foregoing fourth secondary battery, except that, for example, instead of the anode 22, the electrolyte contains the nitrile compound shown in Formula (2). Thus, the sixth secondary battery has a structure similar to that of the third secondary battery in the first embodiment except that the nitrile compound shown in Formula (2) is used instead of the radical scavenger compound shown in Formula (1), and is manufactured by a procedure similar to that of the third secondary battery in the first embodiment.

In other words, in the sixth secondary battery, the electrolyte contains the nitrile compound shown in Formula (2) together with a solvent and an electrolyte salt. The nitrile compound is dissolved or dispersed in the solvent.

According to the sixth secondary battery and the method of manufacturing the same, since the electrolyte contains the nitrile compound shown in Formula (2), chemical stability of the electrolyte is improved. Thereby, at the time of charge and discharge, decomposition reaction of the electrolyte is inhibited. Thus, the cycle characteristics are able to be improved. Other effect of the secondary battery and the method of manufacturing the same is similar to that described for the foregoing fourth secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type. Specifically, the secondary battery may be laminated film type or coin type. In other words, the secondary battery may have a structure similar to that of another third secondary battery or still another third secondary battery in the first embodiment, except that the nitrile compound shown in Formula (2) is used instead of the radical scavenger compound shown in Formula (1), and may be manufactured in the same manner as that of another third secondary battery or still another third secondary battery in the first embodiment. In the case where such a battery structure is used, since the electrolyte contains the nitrile compound shown in Formula (2), the secondary battery acts in the same manner as the sixth secondary battery, and the cycle characteristics are able to be improved. Other effects of the secondary battery and the method of manufacturing the same are similar to those described for the foregoing sixth secondary battery and the method of manufacturing the same.

Further, in the foregoing fourth secondary battery to the sixth secondary battery, one of the cathode 21, the anode 22, and the electrolyte contains the nitrile compound shown in Formula (2). However, the present invention is not limited thereto, but two or more out of the cathode 21, the anode 22, and the electrolyte containing the nitrile compound shown in Formula (2) may be used by combination. The same is applied to the case that battery structure has laminated film type or coin type.

Further, in the foregoing fourth secondary battery to the sixth secondary battery, at least one of the cathode 21, the anode 22, and the electrolyte contains the nitrile compound shown in Formula (2). However, the present invention is not limited thereto, but other component may contain the nitrile compound. Examples of such other component include the separator 23. In the case where the separator 23 contains the nitrile compound, for example, the nitrile compound shown in Formula (2) is introduced into the separator 23 as a coat in the same manner as in the case that the cathode 21 and the anode 22 contain the nitrile compound. Specifically, for example, the coat containing the nitrile compound is provided on both faces of the separator 23. The same is applied to the case that the battery structure of the secondary battery has laminated film type or coin type.

Third Embodiment

A secondary battery according to a third embodiment of the present invention includes a cathode, an anode, and an electrolyte, and at least one of the cathode and the anode contains one or more compounds out of compound shown in Formula (3). In other words, the secondary battery of this embodiment has a structure similar to that of the secondary battery in the first embodiment, except that the compound shown in Formula (3) is used instead of the radical scavenger compound shown in Formula (1), and the component containing the compound is at least one of the cathode and the anode.

[Chemical formula 32]

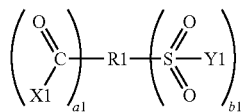

(3)

(R1 is a group with (a1+b1) valency including at least one of a benzene ring and a cyclohexane ring in the range from 2 to 5 in total. X1 and Y1 are a halogen group, a hydroxyl group, or a group expressed by —OM1. a1 and b1 are an integer equal to or more than 0. M1 is an alkali metal, an alkali earth metal, or an alkylsilyl group. a1 and b1 satisfy (a1+b1)≥1.)

The introduction form of the compound shown in Formula (3) to the cathode or the anode is similar to the introduction form of the radical scavenger compound shown in Formula (1) in the first embodiment.

In the secondary battery, the compound shown in Formula (3) has a benzene ring/a cyclohexane ring, a carbonyl group (—C(=O)—X1)/a sulfonyl group (—S(=O)$_2$—Y1). Thus, chemical stability of the cathode and the anode containing the compound is thereby improved. X1 and Y1 in Formula (3) may be identical with each other or different from each other. The same is applied to a1 and b1 in Formula (3).

The entire structure of R1 in Formula (3) is voluntary, as long as R1 includes at least one ring of a benzene ring and a cyclohexane ring in the range from 2 to 5 in total. For example, the foregoing plurality of rings may be linked with other atom group in between or may be linked through single bond. Otherwise, each ring is condensed and bonded with each other. Further, the plurality of rings may be linked in a state of a straight chain, may be linked in a branched state, or may be linked in a state of a ring as a whole. It is needless to say that the foregoing linkage aspects exist by mixture. Further, in R1, the benzene ring and the cyclohexane ring may have a substituted group such as a halogen group and an alkyl group. The total number of rings is from 2 to 5 both inclusive for the following reason. That is, in the case where the total number of rings is 1, the compound shown in Formula (3) is easily eluded in the electrolyte. Meanwhile. in the case where the total number of rings is 6 or more, electric resistance of the electrode containing the compound shown in Formula (3) is easily increased. In other words, in the case where the total number of rings is in the foregoing range, the compound shown in Formula (3) is hardly eluded in the electrolyte, and increase of electric resistance is inhibited, and accordingly high effect is able to be obtained.

Further, the type and the number of the sulfonyl group and the carbonyl group in Formula (3) are voluntary as long as the sulfonyl group and the carbonyl group in Formula (3) are introduced to R1, and the total number of the sulfonyl groups and the carbonyl groups satisfies (a1+b1)≥1. Specially, the sulfonyl group and the carbonyl group are preferably introduced straightly to a ring in R1 (benzene ring and a cyclohexane ring), since thereby high effect is able to be obtained. Further, the total number of the sulfonyl groups and the carbonyl groups (a1+b1) is preferably 2 or more, and is more preferably 2, since higher effect is able to be obtained than in a case that the total number of the sulfonyl groups and the carbonyl groups (a1+b1) is 1. In this case, in particular, the number of the sulfonyl groups is preferably 2 or more (b1≥2), and is more preferably 2 (b1=2), since thereby higher effect is obtained than in a case that the number of the carbonyl groups is 2 or more.

Further, the type of the halogen group described for X1 and Y1 in the sulfonyl group and the carbonyl group is not particularly limited. However, specially, a fluorine group (—F), a chlorine group (—Cl), or a bromine group (—Br) is preferable, and the fluorine group is particularly preferable, since thereby higher effect is able to be obtained than an iodine group (—I) and particularly higher effect is able to be obtained with the use of the fluorine group. Further, the group expressed by —OM1 described for X1 and Y1 represents a group in which M1 is ion-bonded or covalently-bonded with oxygen in the relevant group. The alkyl silyl group described for M1 is a group expressed by —Si(R)$_3$ (R is a hydrogen group or an alkyl group. At least one of 3 Rs is the alkyl group). In this case, 3 Rs may be identical with each other or may be different from each other. As X1 and Y1, a group expressed by —OM1 in which M1 is an alkali metal or an alkali earth metal is preferable. In particular, —OLi in which M1 is lithium (Li) is preferable, since thereby high effect is able to be obtained.

The compound shown in Formula (3) is preferably a compound expressed by Formula (3A) or Formula (3B), since thereby such a compound is easily synthesized and high effect is obtained. X2 and Y2 in Formula (3A) may be identical with each other or different from each other. The same is applied to a2 and b2 in Formula (3A), X3 and Y3 in Formula (3B), and a3 and b3 in Formula (3B).

[Chemical formula 33]

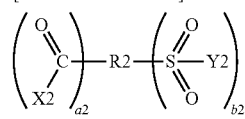

(3A)

(R2 is a group with (a2+b2) valency that includes at least one ring of a benzene ring and a cyclohexane ring in the range from 2 to 5 in total, and adjacent rings are singly bonded. X2 and Y2 are a halogen group, a hydroxyl group, or a group expressed by —OM2. a2 and b2 are an integer equal to or more than 0. M2 is an alkali metal, an alkali earth metal, or an alkylsilyl group. a2 and b2 satisfy (a2+b2)≥1.)

[Chemical formula 34]

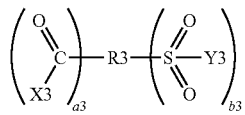

(3B)

(R3 is a group with (a3+b3) valency that includes at least one ring of a benzene ring and a cyclohexane ring in the range from 2 to 5 in total, and adjacent rings are condensed. X3 and Y3 are a halogen group, a hydroxyl group, or a group expressed by —OM3. a3 and b3 are an integer equal to or more than 0. M3 is an alkali metal, an alkali earth metal, or an alkylsilyl group. a3 and b3 satisfy (a3+b3)≥1.)

The entire structure of R2 in Formula (3A) is voluntary, as long as R2 includes at least one ring of a benzene ring and a cyclohexane ring in the range from 2 to 5 in total, and adjacent rings are singly bonded. Further, the benzene ring and the cyclohexane ring in R2 may have a substituted group such as a halogen group and an alkyl group. The total number of rings in R2 is from 2 to 5 both inclusive for a reason similar to that of R1 in Formula (3). Specially, in R2, regarding adjacent rings, it is preferable that each 1-position carbon atom is bonded with each other, or a 1-position carbon atom and a 4-position carbon atom are bonded with each other, since such a compound is able to be easily synthesized and high effect is thereby obtained.

Further, the position to which the sulfonyl group (—S(=O)$_2$—Y2) and the carbonyl group (—C(=O)—X2) described in Formula (3A) are introduced and the number (a2, b2, and a2+b2) are similar to those of the sulfonyl group and the carbonyl group shown in Formula (3). Further, the type of the halogen group described for X2 and Y2 in the sulfonyl group and the carbonyl group shown in Formula (3A) and the type of the group expressed by —OM2 are similar to the halogen group and —OM1 in Formula (3). The same is applied to the sulfonyl group (—S(=O)$_2$—Y3) and the carbonyl group (—C(=O)—X3) in Formula (3B) and X3 and Y3 included therein.

The entire structure of R3 in Formula (3B) is voluntary, as long as R3 includes at least one ring of a benzene ring and a cyclohexane ring in the range from 2 to 5 in total, and adjacent rings are condensed. Further, the benzene ring and the cyclohexane ring in R3 may have a substituted group such as a halogen group and an alkyl group. The total number of rings in R3 is from 2 to 5 both inclusive for a reason similar to that of R1 in Formula (3). Specially, in R3, for example, as anthracene, it is preferable that each ring is condensed so that center of each ring is arranged in line, since such a compound is easily synthesized and high effect is obtained.

Examples of the compounds shown in Formula (3A) include compounds shown in Formula (3A-1) to Formula (3A-84). In other words, R2 in Formula (3A) is a group in which a benzene ring is linked in Formula (3A-1) to Formula (3A-32), a group in which a cyclohexane ring is linked in Formula (3A-33) to Formula (3A-54), and a group in which a benzene ring and a cyclohexane ring are linked in Formula (3A-55) to Formula (3A-84). More specifically, the compounds shown in Formula (3A-1) to Formula (3A-9) are an example of a compound in which two or more sulfonyl groups are included, R2 has two to five rings, and each 1-position carbon atom is bonded with each other or a 1-position carbon atom and a 4-position carbon atom are bonded with each other regarding adjacent rings in R2. Further, the compounds shown in Formula (3A-10) to Formula (3A-13) are an example of a compound in which type of a sulfonyl group is a magnesium base (Formula (3A-10)), a sulfonate group (Formula (3A-11)), a sulfonatefluoro group representing the halogenated group (Formula (3A-12)), or a sulfonate trimethylsilyl ester group (Formula (3A-13)). Examples similar to the compounds shown in Formula (3A-1) to Formula (3A-13) are shown in Formula (3A-33) to Formula (3A-40) and Formula (3A-55) to Formula (3A-66). Further, the compounds shown in Formula (3A-14) to Formula (3A-26) are an example obtained by substituting the sulfonyl group with a carbonyl group in the compounds shown in Formula (3A-1) to Formula (3A-13). The compounds shown in Formula (3A-27) to Formula (3A-32) are an example that one of a carbonyl group and a sulfonyl group is included or an example that both thereof are included. Examples similar to the compounds shown in Formula (3A-14) to Formula (3A-32) are shown in Formula (3A-41) to Formula (3A-54) and Formula (3A-67) to Formula (3A-84). The compound is not limited to the compounds shown in Formula (3A-1) to Formula (3A-84), as long as the structure shown in Formula (3A) is included. For example, all hydrogen bonded with a ring may be substituted with a sulfonyl group and a carbonyl group, one ring may have a plurality of sulfonyl groups and a plurality of carbonyl groups, or a benzene ring and a cyclohexane ring are not necessarily linked alternately. Of the compounds shown in Formula (3A), the compounds shown in Formula (3A-1), Formula (3A-14), or Formula (3A-27) are preferable, and the compound shown in Formula (3A-1) is particularly preferable, since higher effect is able to be obtained.

[Chemical formula 35]

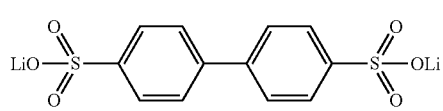
(3A-1)

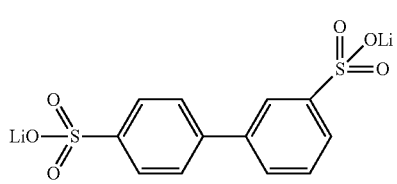
(3A-2)

-continued
(3A-3)
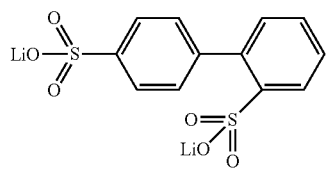
(3A-4)
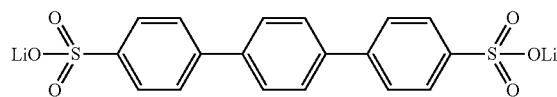
(3A-5)
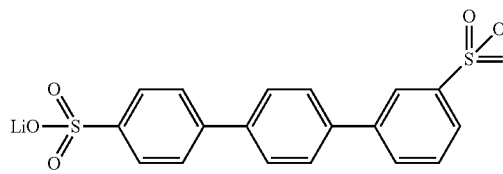
(3A-6)
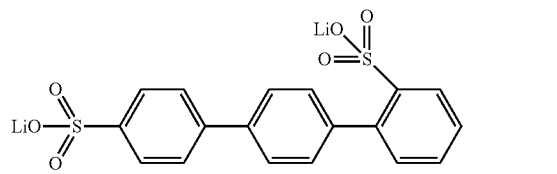
(3A-7)
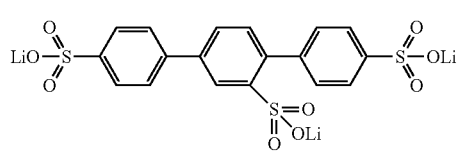
(3A-8)
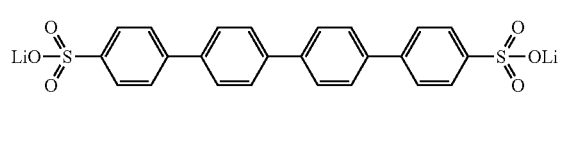
(3A-9)
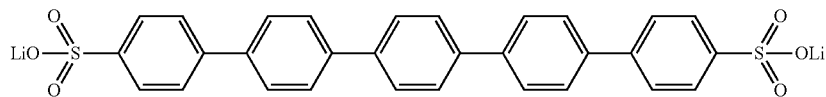
[Chemical formula 36]
(3A-10)
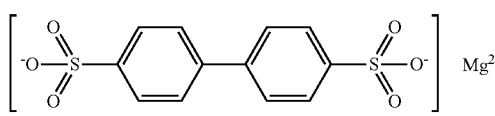
(3A-11)
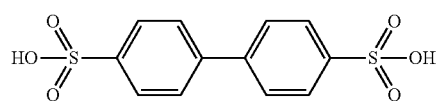
(3A-12)
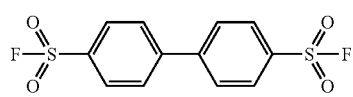
(3A-13)
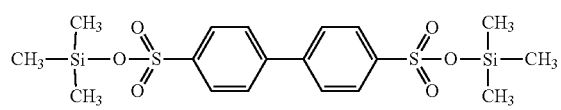
[Chemical formula 37]
(3A-14)
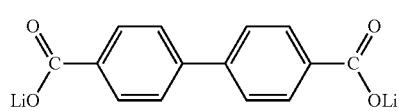
(3A-15)
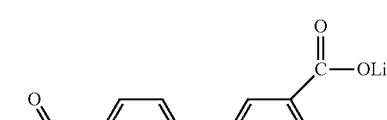
(3A-16)
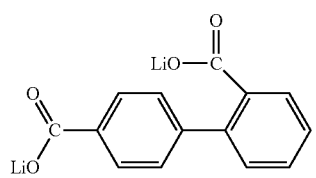
(3A-17)
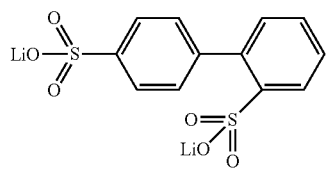
(3A-18)
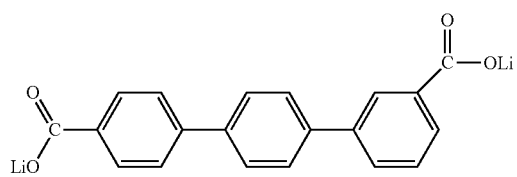
(3A-19)
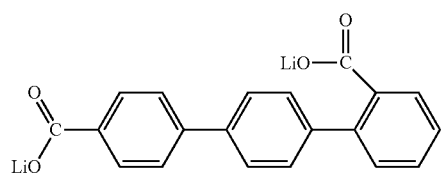

-continued

[Chemical formula 38]

[Chemical formula 39]

[Chemical formula 40]

-continued
(3A-37)
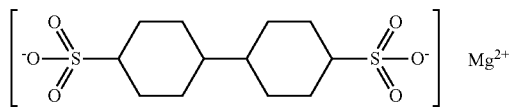
(3A-38)
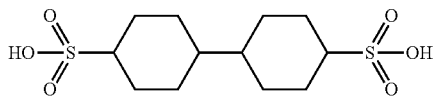
(3A-39)
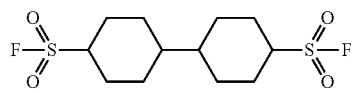
(3A-40)
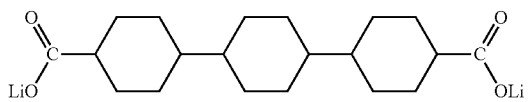
[Chemical formula 41]
(3A-41)
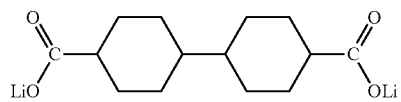
(3A-42)
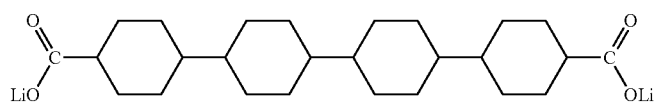
(3A-43)
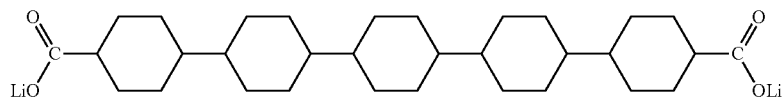
(3A-44)
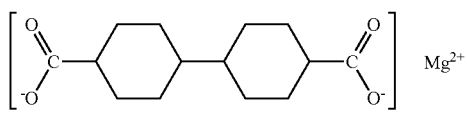
(3A-45)
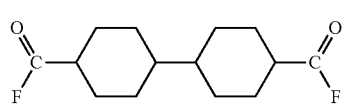
(3A-46)
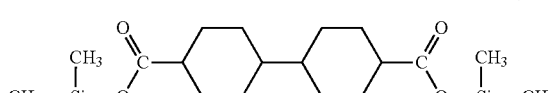
(3A-47)
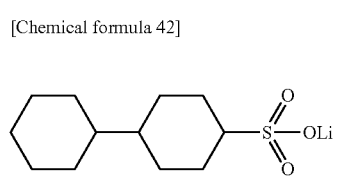
(3A-48)
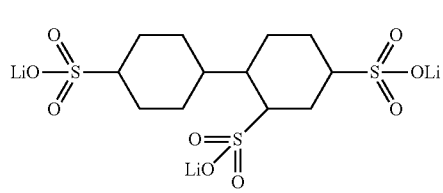
[Chemical formula 42]
(3A-49)
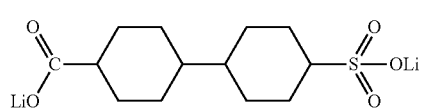
(3A-50)
(3A-51)
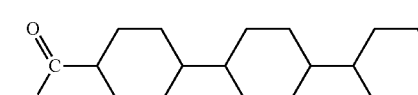
(3A-52)
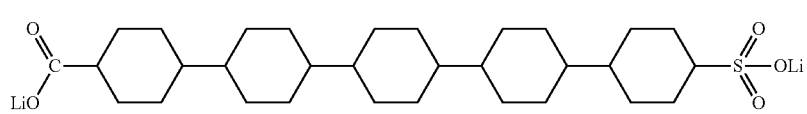
(3A-53)
(3A-54)

-continued

[Chemical formula 43]

(3A-55) (3A-56) (3A-57) (3A-58) (3A-59) (3A-60) (3A-61) (3A-62) (3A-63) (3A-64) (3A-65) (3A-66)

[Chemical formula 44]

(3A-67) (3A-68) (3A-69) (3A-70)

-continued

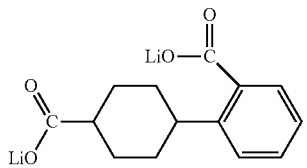
(3A-71)

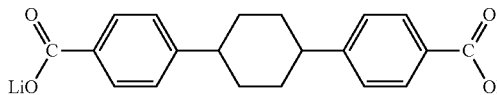
(3A-72)

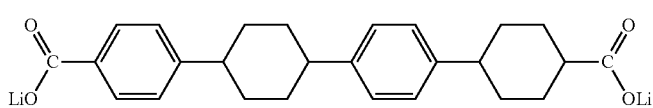
(3A-73)

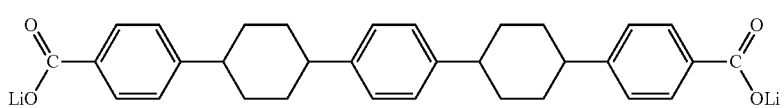
(3A-74)

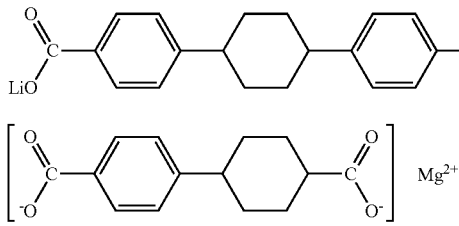
(3A-75)

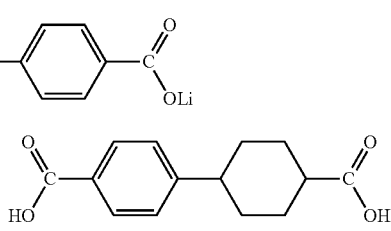
(3A-76)

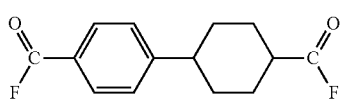
(3A-77)

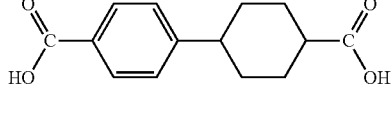
(3A-78)

[Chemical formula 45]

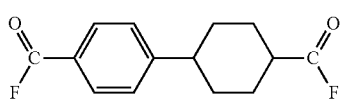
(3A-79)

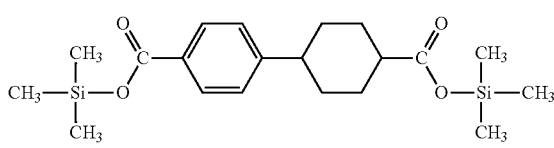
(3A-80)

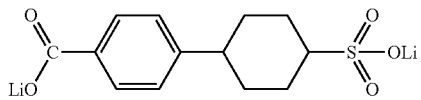
(3A-81)

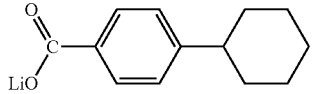
(3A-82)

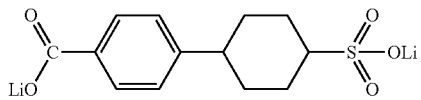
(3A-83)

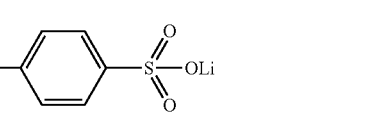
(3A-84)

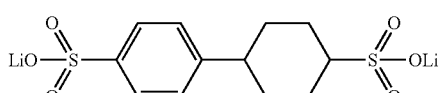

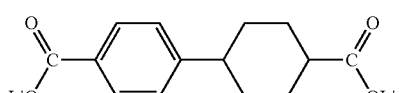

Examples of the compounds shown in Formula (3B) include compounds shown in Formula (3B-1) to Formula (3B-74). In other words, R3 is a group in which a benzene ring is condensed in Formula (3B-1) to Formula (3B-30), a group in which a cyclohexane ring is condensed in Formula (3B-31) to Formula (3B-52), and a group in which a benzene ring and a cyclohexane ring are condensed in Formula (3B-53) to Formula (3B-74). More specifically, the compounds shown in Formula (3B-1) to Formula (3B-10) are an example of a compound in which two or more sulfonyl groups are included, R3 has two to five rings, and each center of each ring in R3 is arranged in line to be condensed or an example of a compound in which type of a sulfonyl group is a magnesium base, a sulfonate group, a sulfonatefluoro group representing the halogenated group, or a sulfonate trimethylsilyl ester group. Examples similar to the compounds shown in Formula (3B-1) to Formula (3B-10) are shown in Formula (3B-31) to Formula (3B-38) and Formula (3B-53) to Formula (3B-60). Further, the compounds shown in Formula (3B-11) to Formula (3B-20) are an example obtained by substituting the sulfonyl group with a carbonyl group in the compounds shown in Formula (3B-1) to Formula (3B-10). The compounds shown in Formula (3B-21) to Formula (3B-30) are an example that one of a carbonyl group and a sulfonyl group is included or an example that both thereof are included. Examples similar to the compounds shown in Formula (3B-11) to Formula (3B-20) and Formula (3B-21) to Formula (3B-30) are shown in Formula (3B-39) to Formula (3B-46), Formula (3B-47) to Formula (3B-52), Formula (3B-61) to Formula (3B-68), and (3B-69) to Formula (3B-74). The compound is not limited to the compounds shown in Formula (3B-1) to Formula (3B-74), as long as the structure shown in Formula (3B) is included.
[Chemical formula 46]
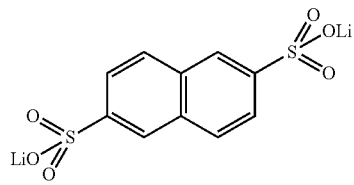
(3B-1)
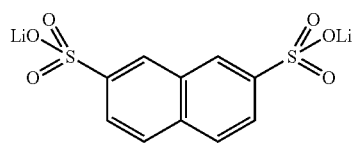
(3B-2)
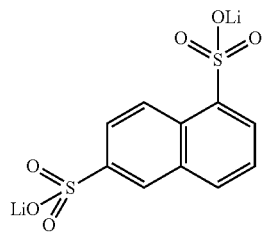
(3B-3)
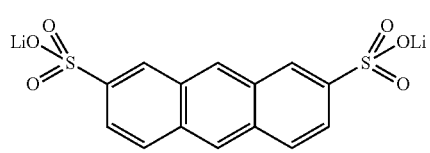
(3B-4)
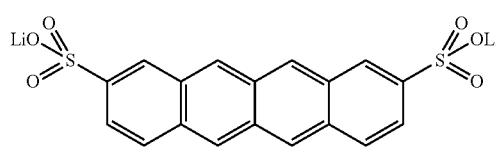
(3B-5)
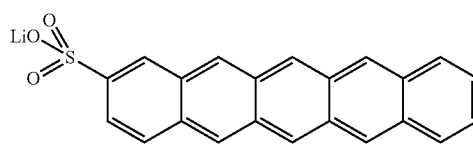
(3B-6)
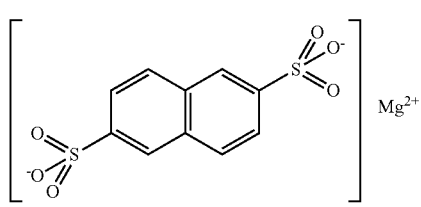
(3B-7)
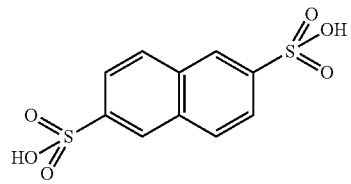
(3B-8)
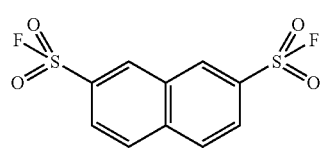
(3B-9)
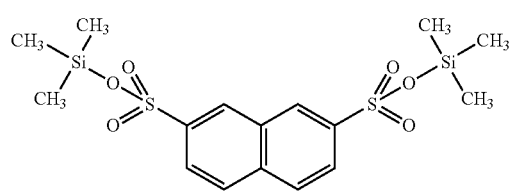
(3B-10)
[Chemical formula 47]
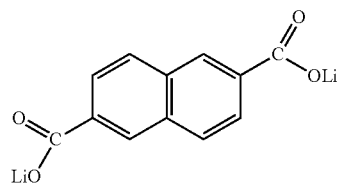
(3B-11)
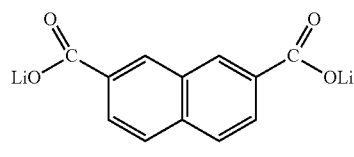
(3B-12)
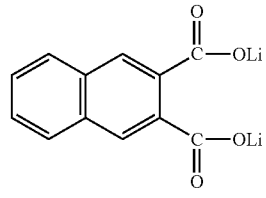
(3B-13)
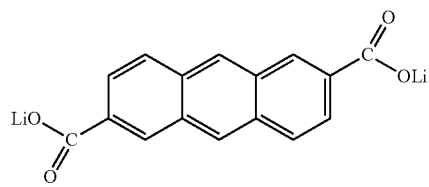
(3B-14)
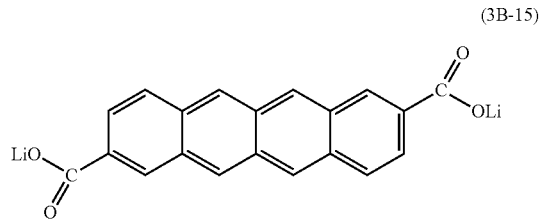
(3B-15)

(3B-16)
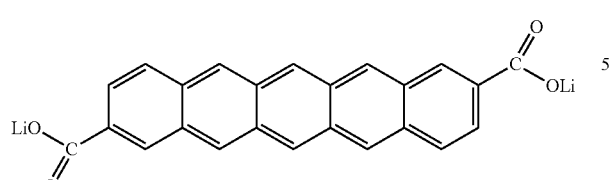
(3B-17)
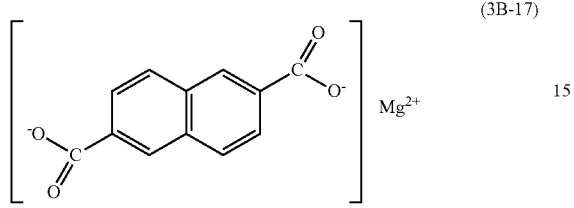
(3B-18)
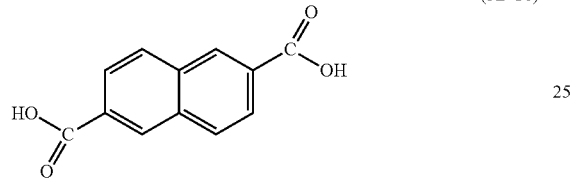
(3B-19)
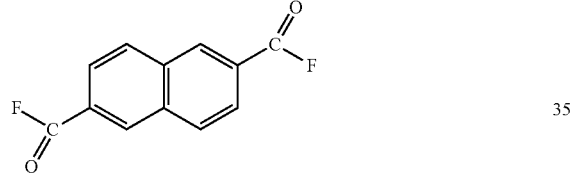
(3B-20)
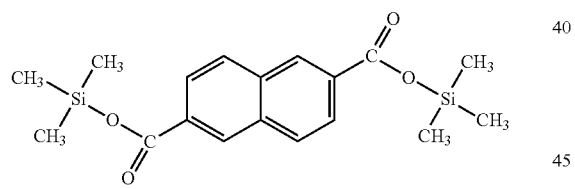
[Chemical formula 48]
(3B-21)
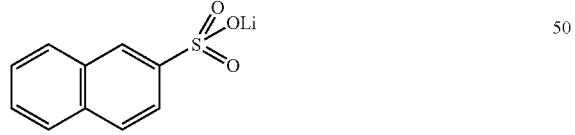
(3B-22)
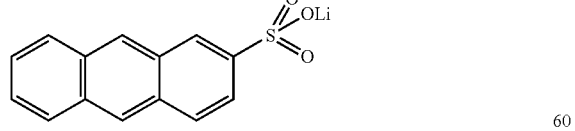
(3B-23)
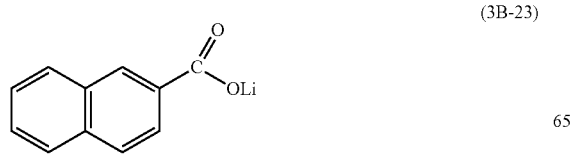
(3B-24)
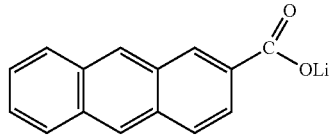
(3B-25)
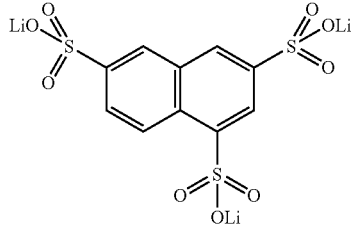
(3B-26)
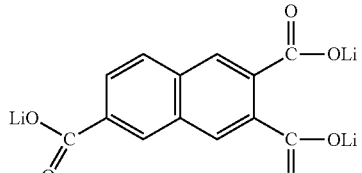
(3B-27)
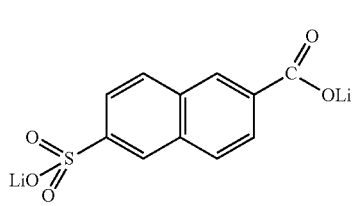
(3B-28)
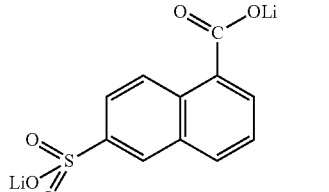
(3B-29)
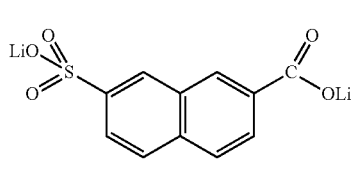
(3B-30)
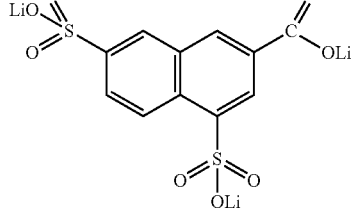
[Chemical formula 49]
(3B-31)
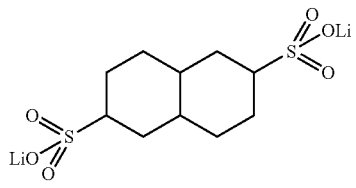

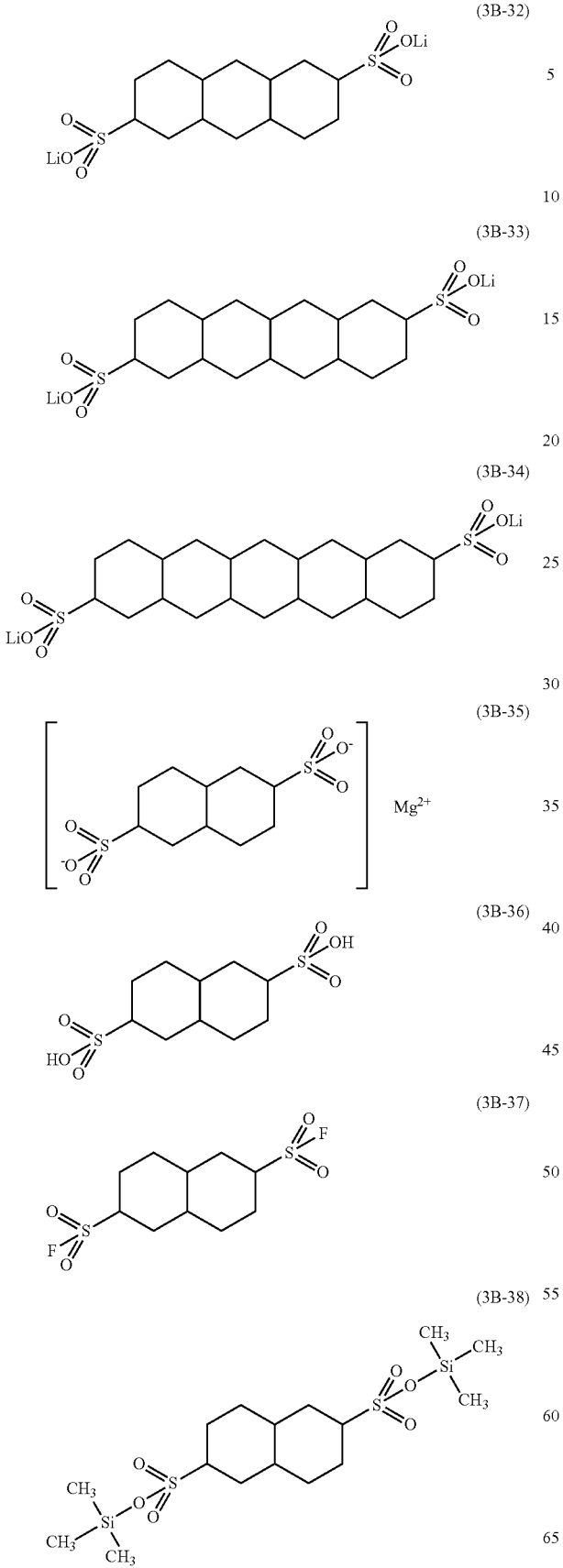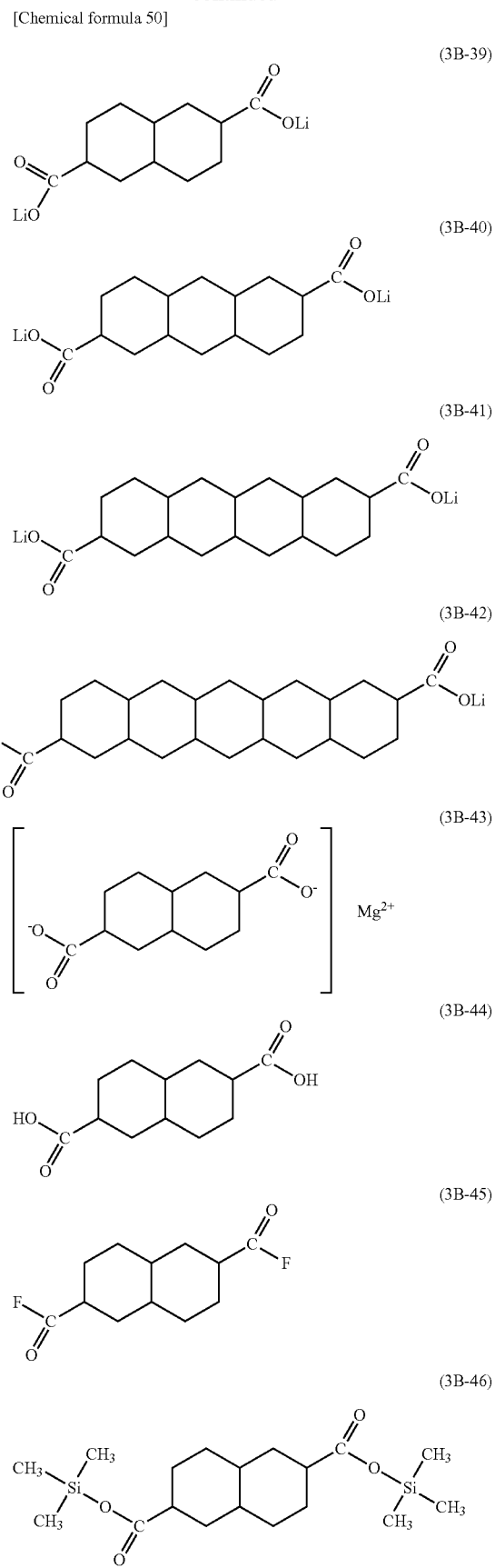

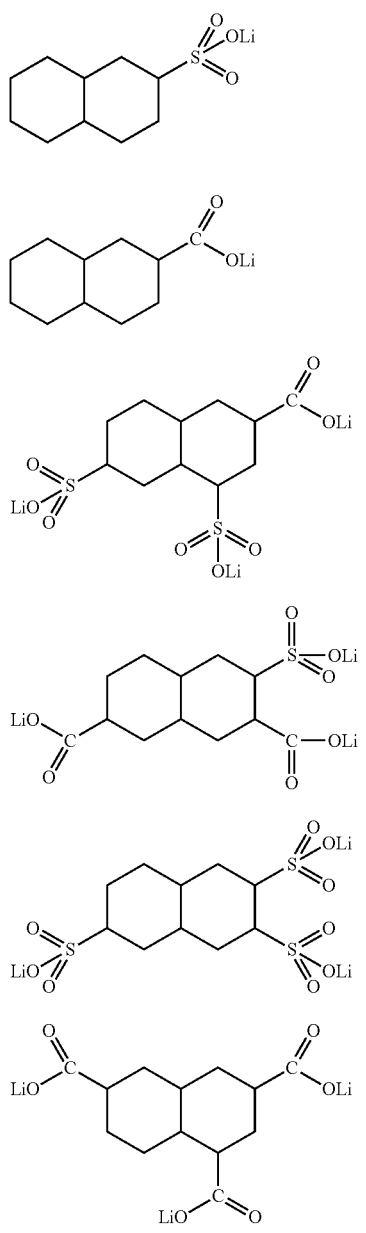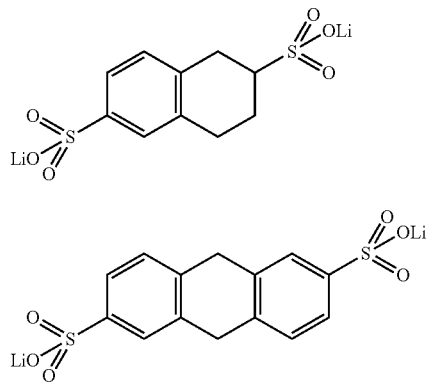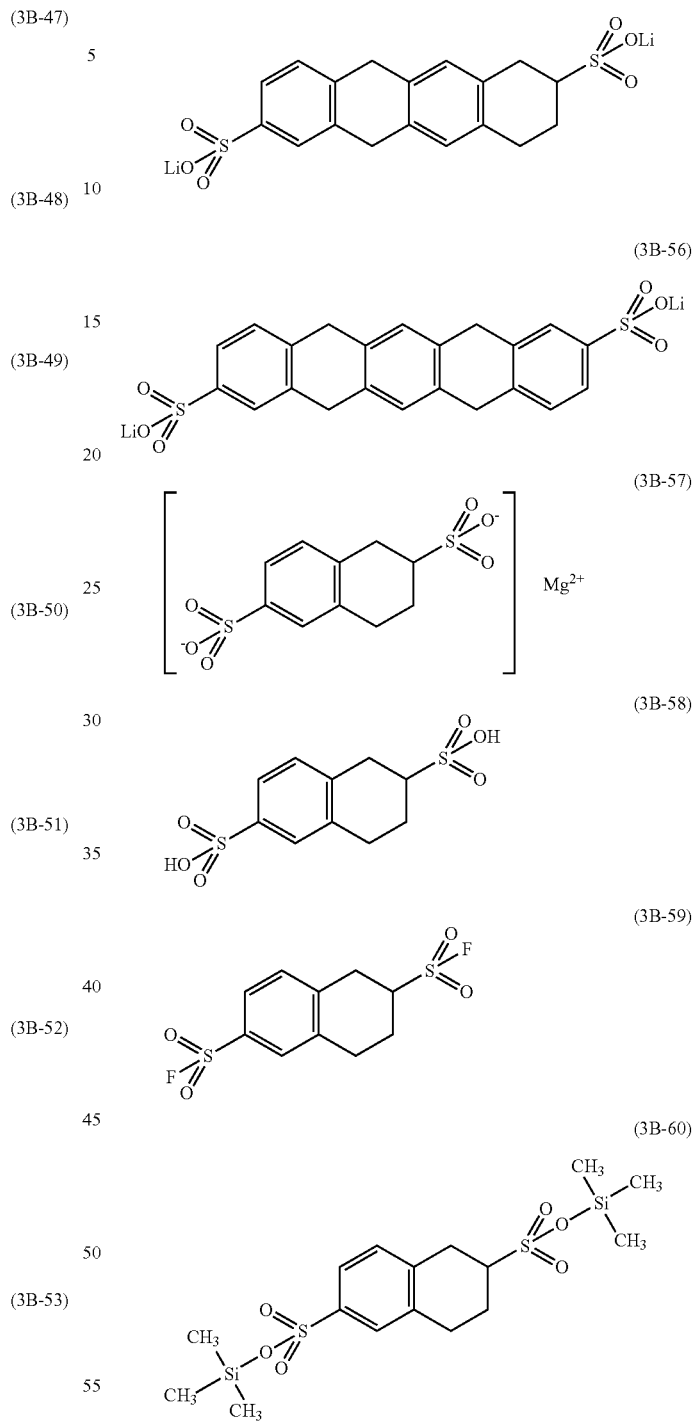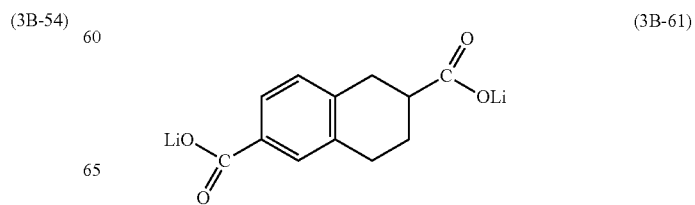

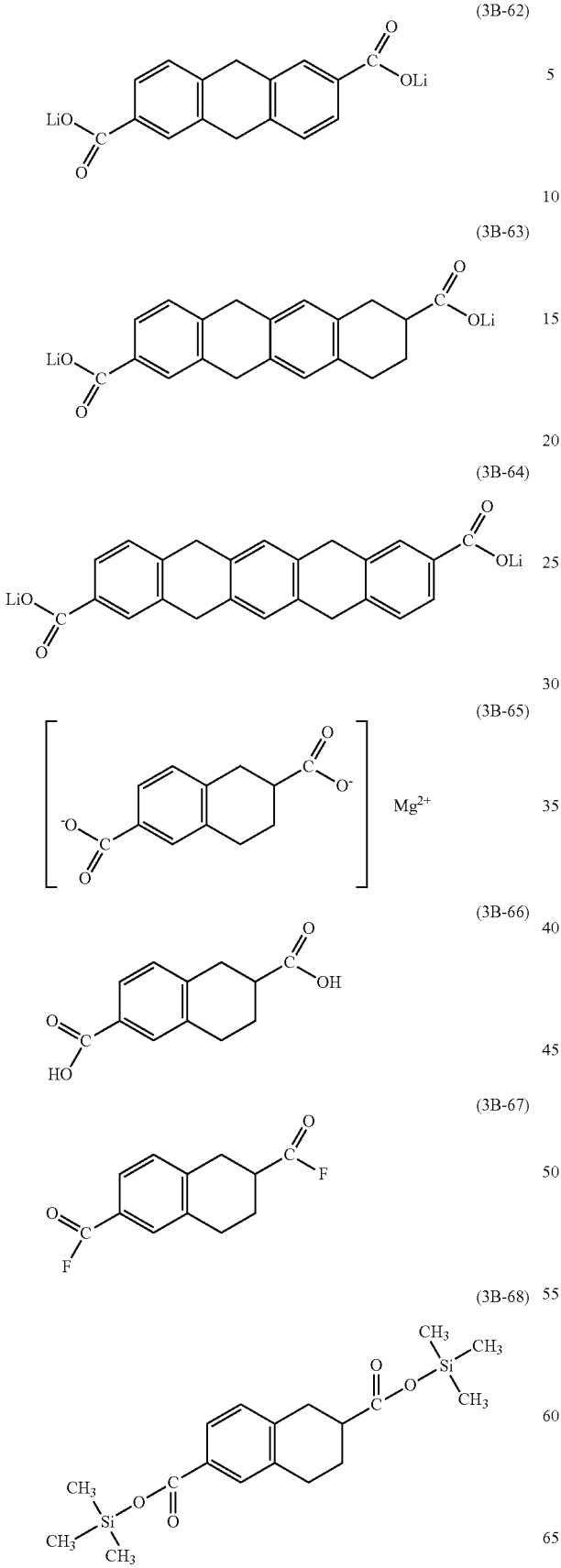

Specific examples of the compound shown in Formula (3) are not limited to the compounds having the structure shown in Formula (3A) or Formula (3B), as long as the structure shown in Formula (3) is included.

The secondary battery is able to be manufactured, for example, by using a solution containing the foregoing compound shown in Formula (3) and forming at least one of the cathode and the anode to contain the compound.

According to the secondary battery and the method of manufacturing the same, since at least one of the cathode and the anode contains the compound shown in Formula (3), chemical stability of at least one of the anode and the cathode is improved, compared to a case that the compound shown in Formula (3) is not contained, a case that other compound (for example, benzenesulfonic lithium shown in Formula (15)) not corresponding to the compound shown in Formula (3), or a case that the electrolyte contains the compound shown in Formula (3). Thus, at the time of charge and discharge, the cathode and the anode are hardly reacted with an electrolyte. Accordingly, the battery characteristics such as the cycle characteristics, the swollenness characteristics, and the reaction resistance characteristics are able to be improved. Therefore, the secondary battery is able to be suitably used, for example, as a power source for an electronic device such as a portable electronic device, an electric power tool, and a power source supply system. In this case, in the case where a solution containing the compound shown in Formula (3) is used and at least one of the cathode and the anode is formed to contain the compound, the cathode and the anode are able to be easily formed compared to a case that a method necessitating special environmental conditions such as reduced pressure environment is used.

[Chemical formula 55]

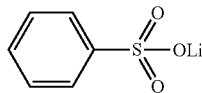

(15)

In particular, in the case where the compound shown in Formula (3) is the compound shown in Formula (3A), decomposition reaction of the electrolyte is more inhibited, and thus the battery characteristics are able to be more improved. In this case, in the case where the compound shown in Formula (3) is the compound shown in Formula (3A-1), higher effect is able to be obtained.

The electrode containing the compound shown in Formula (3) is preferably both the cathode and the anode. However, if one thereof is selected, the anode is more preferable than the cathode, since thereby higher battery characteristics are able to be obtained than a case that only the cathode contains the compound shown in Formula (3).

Next, a description will be given in detail of the secondary battery according to this embodiment taking a specific example.

The secondary battery as the specific example described in this embodiment is, for example, a lithium ion secondary battery in which the capacity of the anode is expressed based on insertion and extraction of lithium ions as an electrode reactant.

(Seventh Secondary Battery)

A seventh secondary battery has a structure similar to that of the first secondary battery in the foregoing first embodiment, except that the compound shown in Formula (3) is contained in the anode 22, and the compound shown in Formula (3) is used instead of the radical scavenger compound shown in Formula (1).

In other words, in the anode 22, for example, the anode active material layer 22B and the anode coat 22C are provided on both faces of the anode current collector 22A having a pair of faces. The structures of the anode current collector 22A and the anode active material layer 22B have structures similar to the anode current collector 22A and the anode active material layer 22B of the first secondary battery.

The anode coat 22C is formed on the anode active material layer 22B after the anode active material layer 22B is formed on the anode current collector 22A. The anode coat 22C contains one or more out of the compounds shown in the foregoing Formula (3). The anode coat 22C containing the compound shown in Formula (3) is provided on the anode active material layer 22B for the following reason. That is, thereby chemical stability of the anode 22 is improved, and accordingly chemical stability of the electrolyte (electrolytic solution) adjacent to the anode 22 is also improved. Thereby, at the time of charge and discharge, lithium ions are effectively inserted and extracted in the anode 22, decomposition reaction of the electrolyte is inhibited, and thus out of the battery characteristics, the cycle characteristics are particularly improved.

In particular, the anode coat 22C preferably contains the compound shown in the foregoing Formula (3) and one or more alkali metal salts or one or more alkali earth metal salts (except for those corresponding to the compound shown in Formula (3)). Thereby, coat resistance is inhibited, and thus cycle characteristics are more improved. Examples of the alkali metal salts and the alkali earth metal salts include those similar to the alkali metal salts and the alkali earth metal salts contained in the anode coat 22C of the foregoing first secondary battery.

Examples of methods of forming the anode coat 22C include a method similar to the method of forming the anode coat 22C of the foregoing first secondary battery.

The seventh secondary battery is manufactured by a procedure similar to that of the foregoing first secondary battery, except that the nitrile compound shown in Formula (2) is used instead of the radical scavenger compound shown in Formula (1).

In the seventh secondary battery, when charged, for example, lithium ions are extracted from the cathode 21 and inserted in the anode 22 through the electrolytic solution impregnated in the separator 23. Meanwhile, when discharged, for example, lithium ions are extracted from the anode 22 and inserted in the cathode 21 through the electrolytic solution impregnated in the separator 23.

According to the cylindrical type seventh secondary battery and the method of manufacturing the same, since the anode coat 22C of the anode 22 contains the compound shown in Formula (3), chemical stability of the anode 22 is improved. Thereby, lithium ions are easily inserted and extracted in the anode 22, decomposition reaction of the electrolytic solution is inhibited, and thus the battery characteristics such as the cycle characteristics are able to be improved. In this case, the anode coat 22C is formed by using a solution containing the compound shown in the foregoing Formula (3). Specifically, the anode coat 22C is formed by using a simple treatment such as dipping treatment and coating treatment. Thus, the favorable anode coat 22C is able to be stably and easily formed compared to a case that a method necessitating special environmental conditions such as reduced pressure environment is used.

In particular, in the case where the anode 22 contains silicon or the like advantageous to realizing high capacity (material that is able to insert and extract lithium ions and that has at least one of metal elements and metalloid elements), the cycle characteristics are improved and thus higher effect is able to be obtained than in the case that other anode material such as a carbon material is contained.

Other effect of the seventh secondary battery and the method of manufacturing the same is similar to that described for the foregoing first secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type. Specifically, the secondary battery may be laminated film type or coin type. In other words, the secondary battery may have a structure similar to that of another first secondary battery or still another first secondary battery in the first embodiment, except that the compound shown in Formula (3) is used instead of the radical scavenger compound shown in Formula (1), and may be manufactured in the same manner as that of another first secondary battery or still another first secondary battery in the first embodiment.

In the case where the battery structure is laminated film type, the anode coat 34C containing the compound shown in Formula (3) is provided on the anode active material layer 34B. In the case where the battery structure is coin type, the anode coat 52C containing the compound shown in Formula (3) is provided on the anode active material layer 52B. In these cases, the battery characteristics such as the cycle characteristics are also able to be improved by action similar to that of the foregoing seventh secondary battery. Other effects of these secondary batteries and the methods of manufacturing the same are similar to those described for the foregoing seventh secondary battery and the methods of manufacturing the same.

In the foregoing seventh secondary battery, the description has been hereinbefore given of the case that the anode coat provided on the anode active material layer contains the compound shown in Formula (3). However, the compound may be contained in any section of the anode, as long as the anode contains the compound shown in Formula (3). For example, in the case where the anode active material is composed of a plurality of particles, that is, in the case where the anode active material has the anode active material particles, instead of forming the anode coat on the anode active material layer, a particle coating film containing the compound shown in Formula (3) may be provided to coat the surface of the cathode active material particles. In this case, all of the surface of the anode active material particles may be coated with the particle coating film, or part of the surface of the anode active material particles may be coated with the particle coating film. In this case, since chemical stability of the anode is thereby improved as well, the battery characteristics are improved. Such an anode is able to be also formed by using a solution containing the compound shown in Formula (3). Specifically, first, after the anode active material particles made of the foregoing anode material are dispersed in the solution containing the compound shown in Formula (3), the anode active material particles are pulled out from the solution and dried. Thereby, the particle coating film containing the compound shown in Formula (3) is formed on the surface of the anode active material particles. Subsequently, the anode active material particles, an anode electrical conductor, and an anode binder are mixed to prepare an anode mixture, which is dispersed in a solvent to form a paste anode mixture slurry. The anode current collector is coated with the anode mixture slurry, and the resultant is dried. Thereafter, the resultant is compression-molded to form the anode active material layer. Thereby, the anode is able to be formed.

(Eighth Secondary Battery)

An eighth secondary battery has a structure similar to that of the foregoing seventh secondary battery, except that instead of the anode 22, the cathode 21 contains the compound shown in Formula (3). Thus, the eighth secondary battery has a structure similar to that of the foregoing second secondary battery except that the compound shown in Formula (3) is used instead of the radical scavenger compound shown in Formula (1), and is manufactured by a procedure similar to that of the foregoing second secondary battery.

In other words, the cathode coat 21C provided on the cathode active material layer 21B contains one or more out of the compounds shown in Formula (3), since chemical stability of the cathode 21 is thereby improved. Thereby, at the time of charge and discharge, lithium is favorably inserted and extracted in the cathode 21, decomposition reaction of the electrolyte is inhibited, and thus the battery characteristics are improved. In this case, out of the battery characteristics, resistance component of the anode 22 is particularly lowered, the reactive resistance characteristics are improved, and the swollenness characteristics are improved.

According to the eighth secondary battery and the method of manufacturing the same, since the cathode coat 21C containing the compound shown in Formula (3) is provided for the cathode 21, chemical stability of the cathode 21 is improved. Thus, decomposition reaction of the electrolytic solution is inhibited, and increase of reaction resistance of the anode 22 is inhibited. Thus, the battery characteristics such as the swollenness characteristics and the reaction resistance characteristics are able to be improved. In this case, the cathode coat 21C is formed by using a solution containing the compound shown in the foregoing Formula (3). Specifically, the cathode coat 21C is formed by using a simple treatment such as dipping treatment and coating treatment. Thus, the favorable cathode coat 21C is able to be easily formed compared to a case that a method necessitating special environmental conditions such as reduced pressure environment is used.

Other effect of the eighth secondary battery and the method of manufacturing the same is similar to that described for the seventh secondary battery and the method of manufacturing the same.

The description has been hereinbefore given of the case that the battery structure of the secondary battery is cylindrical type. However, the battery structure of the secondary battery is not limited thereto, but the battery structure of the secondary battery may be a structure other than the cylindrical type. Specifically, the secondary battery may be laminated film type or coin type. In other words, the secondary battery may have a structure similar to that of another second secondary battery or still another second secondary battery in the first embodiment, except that the compound shown in Formula (3) is used instead of the radical scavenger compound shown in Formula (1), and may be manufactured in the same manner as that of another second secondary battery or still another second secondary battery in the first embodiment.

In the case where the battery structure is laminated film type, the cathode coat 33C containing the compound shown in Formula (3) is provided on the cathode active material layer 33B. In the case where the battery structure is coin type, the cathode coat 51C containing the compound shown in Formula (3) is provided on the cathode active material layer 51B. In these cases, the battery characteristics such as the swollenness characteristics and the reaction resistance characteristics are able to be improved by action similar to that of the foregoing eighth secondary battery. Other effects of these secondary batteries and the methods of manufacturing the same are similar to those described for the foregoing seventh secondary battery and the method of manufacturing the same.

Further, the description has been hereinbefore given of the case that the cathode coat containing the compound shown in Formula (3) is provided on the cathode active material layer. However, the compound shown in Formula (3) may be contained in any section of the cathode, as long as the cathode contains the compound shown in Formula (3). For example, as described in the first embodiment with reference to FIG. 14, in the case where the cathode active material is composed of a plurality of particles (cathode active material particles 211), instead of forming the cathode coat on the cathode active material layer, the particle coating film 212 containing the compound shown in Formula (3) may be provided to coat the surface of the cathode active material particles 211. In this case, all of the surface of the cathode active material particles 211 may be coated with the particle coating film 212, or part of the surface of the cathode active material particles 211 may be coated with the particle coating film 212. In this case, chemical stability of the cathode is improved. Thus, decomposition reaction of the electrolytic solution is inhibited, and increase of reaction resistance of the anode 22 is inhibited. Thus, the battery characteristics, in particular, the swollenness characteristics and the reaction resistance characteristics are able to be improved.

The cathode including the particle coating film 212 is formed by, for example, a method similar to that of forming the cathode including the particle coating film 212 in the first embodiment, except that the solution containing the compound shown in Formula (3) is used instead of the solution containing the radical scavenger compound shown in Formula (1).

Further, in the foregoing seventh secondary battery and the foregoing eighth secondary battery, the description has been given of the case that one of the cathode and the anode contains the compound shown in Formula (3). However, as described above, both the cathode and the anode preferably contain the compound shown in Formula (3). Thereby, decomposition reaction of the electrolytic solution is more inhibited, and higher battery characteristics than those of the seventh secondary battery and the eighth secondary battery are able to be obtained. It is needless to say that in this case, the battery structure of the secondary battery is also voluntary.

APPLICATION EXAMPLES

Next, a description will be given of application examples of the secondary batteries described in the foregoing first embodiment to the foregoing third embodiment. The secondary batteries of the foregoing respective embodiments are applicable as a power source for various electronic devices.

Figure 18A:
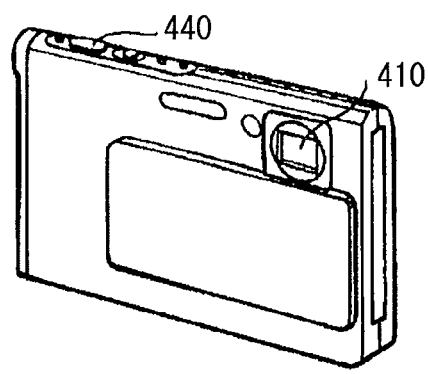
FIG. 18 is a perspective view illustrating an appearance of an application example of the secondary battery according to the first to the third embodiments of the present invention.
Figure 18B:
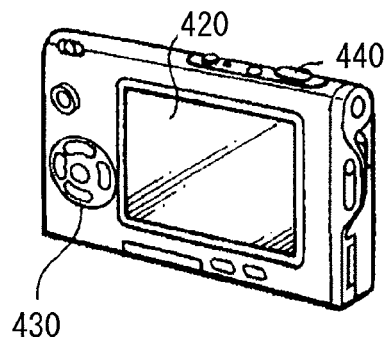

FIG. 18 illustrates an appearance of a digital still camera to which the secondary batteries of the foregoing respective embodiments are applied. The digital still camera has, for example, a light emitting section 410 for a flash, a display section 420, a menu switch 430, and a shutter button 440, and includes a secondary battery as a power source. The built-in secondary battery is composed of the secondary batteries according to the foregoing respective embodiments.

Figure 19:
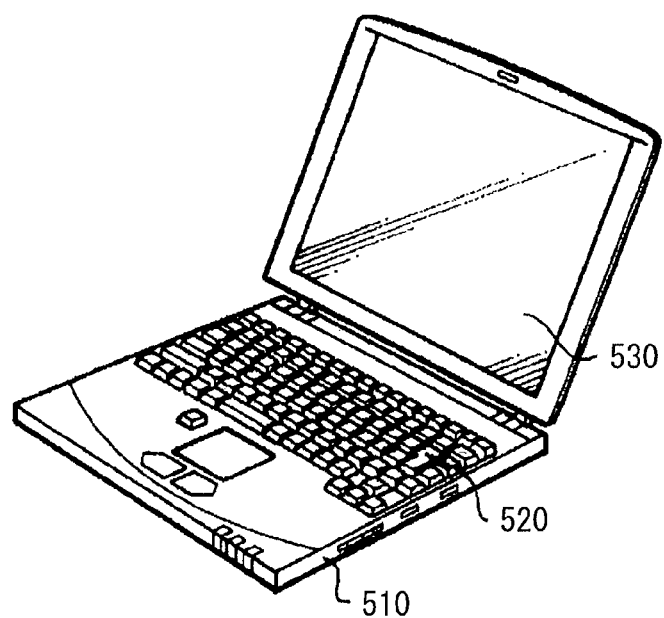
FIG. 19 is a perspective view illustrating an appearance of another application example of the secondary battery according to the first to the third embodiments of the present invention.

FIG. 19 illustrates an appearance of a notebook personal computer to which the secondary batteries of the foregoing respective embodiments are applied. The notebook personal computer has, for example, a main body 510, a keyboard 520 for operation of inputting characters and the like, and a display section 530 for displaying an image, and includes a secondary battery as a power source. The built-in secondary battery is composed of the secondary batteries according to the foregoing respective embodiments.

EXAMPLES

Examples of the present invention will be described in detail.

Examples 1-1 to 1-11

The coin type secondary battery illustrated in FIG. 10 was fabricated by the following procedure. At this time, the secondary battery was fabricated as a lithium ion secondary battery in which the capacity of the anode 52 was expressed based on insertion and extraction of lithium ions.

First, the cathode 51 was formed. First, lithium carbonate ($Li_2CO_3$) and cobalt carbonate ($CoCO_3$) were mixed at a molar ratio of 0.5:1. Thereafter, the mixture was fired in the air at 900 degrees C. for 5 hours. Thereby, lithium cobalt composite oxide ($LiCoO_2$) was obtained. Subsequently, 91 parts by mass of the lithium cobalt composite oxide as a cathode active material, 6 parts by mass of graphite as a cathode electrical conductor, and 3 parts by mass of polyvinylidene fluoride as a cathode binder were mixed to obtain a cathode mixture. Thereafter, the cathode mixture was dispersed in N-methyl-2-pyrrolidone to obtain a paste cathode mixture slurry. Subsequently, a face of the cathode current collector 51A made of a strip-shaped aluminum foil (thickness: 12 μm) was uniformly coated with the cathode mixture slurry by using a bar coater, which was dried to form the cathode active material layer 51B. Subsequently, the cathode active material layer 51B was compression-molded by using a roll pressing machine. Finally, the cathode current collector 51A on which the cathode active material layer 51B was formed was punched out into a pellet having a diameter of 15.5 mm.

Next, the anode 52 was formed. First, the anode current collector 52A made of a roughened electrolytic copper foil (thickness: 10 μm) was prepared. Thereafter, silicon as an anode active material was deposited on one face of the anode current collector 52A by using vapor-phase deposition method (electron beam evaporation method), and thereby the anode active material layer 52B containing a plurality of anode active material particles was formed to have a thickness of 5 μm. Subsequently, the radical scavenger compound shown in Formula (1) was dispersed in water as a solvent so that the content of the radical scavenger compound shown in Formula (1) became 3 wt %, and thereby an aqueous solution containing the radical scavenger compound was prepared. In this case, as the radical scavenger compound, the compound shown in Formula (1-1) was used in Examples 1-1 to 1-10, and the compound shown in Formula (1-2) was used in Example 1-11. Subsequently, the anode current collector 52A on which the anode active material layer 52B was formed was dipped in the aqueous solution for several seconds, pulled up, and was subsequently dried at 60 degrees C. in reduced pressure atmosphere. Thereby, the anode coat 52C containing the radical scavenger compound was formed on the anode active material layer 52B. Finally, the anode current collector 52A on which the anode coat 52C and the anode active material layer 52B were formed was punched out into a pellet having a diameter of 16 mm.

Next, an electrolytic solution was prepared. First, solvents were mixed to obtain the compositions illustrated in Table 1. In this case, as a solvent, ethylene carbonate (EC), propylene carbonate (PC), diethyl carbonate (DEC), bis carbonate (fluoromethyl) (DFDMC) as the chain ester carbonate having a halogen shown in Formula (4) as an element, 4-fluoro-1,3-dioxolane-2-one (FEC) or 4,5-difluoro-1,3-dioxolane-2-one (DFEC) as the cyclic ester carbonate having a halogen shown in Formula (5) as an element, or vinylene carbonate (VC) as the cyclic ester carbonate having an unsaturated carbon bond shown in Formula (6) was used. Thereafter, lithium hexafluorophosphate ($LiPF_6$) as an electrolyte salt was dissolved in the solvent. In this case, the content of the electrolyte salt to the solvent was 1 mol/kg.

Finally, the secondary battery was assembled by using the cathode 51, the anode 52, and the electrolytic solution. First, the cathode 51 and the anode 52 were layered with the separator 53 made of a microporous polypropylene film in between, and the resultant laminated body was subsequently contained in the package can 54. In this case, the cathode active material layer 51B and the anode active material layer 52B were opposed to each other with the separator 53 in between. Subsequently, the electrolytic solution was injected and impregnated in the separator 53. Finally, after the package cup 55 was laid on the package can 54 containing the cathode 51 and the anode 52, the package cup 55 and the package can 54 were caulked with a gasket 56, and thereby the coin type secondary battery was completed. In fabricating the secondary battery, lithium metal was prevented from being precipitated on the anode 52 at the time of full charge by adjusting the thickness of the cathode active material layer 51B so that the charge and discharge capacity of the anode 52 became larger than the charge and discharge capacity of the cathode 51.

Examples 1-12 to 1-14

A procedure similar to that of Examples 1-1, 1-3, and 1-5 was executed, except that the anode coat 52 was not formed.

For the secondary batteries of Examples 1-1 to 1-14, the cycle characteristics were examined. The results illustrated in Table 1 were obtained.

In examining the cycle characteristics, two cycles of charge and discharge were performed in the atmosphere at 23 degrees C. to measure discharge capacity. Subsequently, charge and discharge were performed in the same atmosphere until the total number of cycles became 100 to measure discharge capacity. Thereafter, discharge capacity retention ratio (%)=(discharge capacity at the 100th cycle/discharge capacity at the second cycle)*100 was calculated. At this time, the charge and discharge conditions of one cycle were as follows. That is, charge was performed at the constant current density of 1 mA/cm$^2$ until the battery voltage reached 4.2 V, and subsequently charge was performed at the constant voltage of 4.2 V until the current density reached 0.02 mA/cm$^2$. Thereafter, discharge was performed at the constant current density of 1 mA/cm$^2$ until the battery voltage reached 2.5 V. For the following examples, the foregoing procedure and the foregoing conditions in examining the foregoing cycle characteristics are similarly applied.

which the anode coat 52C containing the compound shown in Formula (1-1) or the compound shown in Formula (1-2) was formed, the discharge capacity retention ratio was higher than that of Examples 1-12 to 1-14 in which the anode coat 52C containing the compound shown in Formula (1-1) or the compound shown in Formula (1-2) was not formed.

More specifically, in Examples 1-1 to 1-10 in which the compound shown in Formula (1-1) was used as the radical scavenger compound, the discharge capacity retention ratio was higher than that of Examples 1-12 to 1-14 in which the compound shown in Formula (1-1) was not used as the radical scavenger compound not depending on the solvent composition. Further, in Example 1-11 in which the compound shown in Formula (1-2) was used as the radical scavenger compound, the discharge capacity retention ratio was higher than that of Examples 1-12 to 1-14 in which the compound shown in Formula (1-2) was not used as the radical scavenger compound, and the discharge capacity retention ratio equal to that of Example 1-7 in which the compound shown in Formula (1-1) was used.

In this case, in Examples 1-2 to 1-10 in which PC or the like was added as a solvent, the discharge capacity retention ratio was higher than that of Example 1-1 in which PC or the like was not added as a solvent. More specifically, the discharge capacity retention ratio was higher in the case that FEC, DFEC, DFDMC, and VC were added as a solvent, and the discharge capacity retention ratio was still higher in the case that FEC, DFEC, and DFDMC were added as a solvent. In particular, in the case where FEC, DFEC, and DFDMC were added, if DFEC or DFDMC in which the number of halogens was 2 was used, the discharge capacity retention ratio was higher than that of a case in which the number of halogens was 1. Further, the foregoing tendency that the discharge capacity retention ratio was increased by adding the foregoing solvents was more significant as the addition amount of each solvent was increased.

Accordingly, it was confirmed that in the secondary battery of the present invention, in the case where silicon was used as

TABLE 1

Battery structure: coin type
Cathode active material: LiCoO$_2$; anode active material: Si (electron beam evaporation method)

| | Anode coat | Electrolytic solution | | | | | | Discharge capacity retention ratio (%) |
| --- | --- | --- | --- | --- | --- | --- | --- | --- | --- |
| | | Solvent (weight ratio) | | | | | | Electrolyte salt (mol/kg) | |
| | | EC | PC | DEC | FEC | DFEC | DFDMC | VC | |
| Example 1-1 | Formula (1-1) | 30 | — | 70 | — | — | — | — | LiPF$_6$: 1 | 59 |
| Example 1-2 | | 10 | 20 | 70 | — | — | — | — | | 60 |
| Example 1-3 | | — | — | 70 | 30 | — | — | — | | 84 |
| Example 1-4 | | 10 | 10 | 70 | 10 | — | — | — | | 83 |
| Example 1-5 | | 10 | — | 70 | — | 20 | — | — | | 90 |
| Example 1-6 | | 10 | 10 | 70 | — | 10 | — | — | | 88 |
| Example 1-7 | | 5 | 20 | 50 | 15 | 10 | — | — | | 90 |
| Example 1-8 | | — | — | 65 | 30 | — | 5 | — | | 88 |
| Example 1-9 | | 10 | 19 | 70 | — | — | — | 1 | | 61 |
| Example 1-10 | | 10 | 10 | 70 | — | — | — | 10 | | 62 |
| Example 1-11 | Formula (1-2) | 5 | 20 | 50 | 15 | 10 | — | — | | 90 |
| Example 1-12 | — | 30 | — | 70 | — | — | — | — | LiPF$_6$: 1 | 25 |
| Example 1-13 | | — | — | 70 | 30 | — | — | — | | 62 |
| Example 1-14 | | 10 | — | 70 | — | 20 | — | — | | 63 |

As illustrated in Table 1, in the case where silicon was used as an anode active material and the anode active material layer 52B was formed using vapor-phase deposition method (electron beam evaporation method), in Examples 1-1 to 1-11 in an anode active material and the anode active material layer 52B was formed by using vapor-phase deposition method (electron beam evaporation method), the cycle characteristics were improved by providing the anode coat 52C containing the radical scavenger compound shown in Formula (1) on the anode active material layer 52B. It was also confirmed that in this case, the cycle characteristics were more improved by using the chain ester carbonate having a halogen shown in Formula (4) as an element, the cyclic ester carbonate having a halogen shown in Formula (5) as an element, or the cyclic ester carbonate having an unsaturated carbon bond shown in Formula (6).

Examples 2-1 to 2-7

A procedure was executed in the same manner as that of Examples 1-1 and 1-3, except that the solvent composition and the electrolyte salt type were changed as illustrated in Table 2. In this case, propene sultone (PRS) as sultone, succinic anhydride (SCAH) as an acid anhydride, or anhydro-2-sulfobenzoic acid (SBAH) was used as a solvent, and the content thereof was 1 wt %. Further, as an electrolyte salt, lithium tetrafluoroborate ($LiBF_4$), the compound shown in Formula (9-6) as the compound shown in Formula (9), the compound shown in Formula (10-2) as the compound shown in Formula (10), or the compound shown in Formula (13-2) as the compound shown in Formula (13) was used. The content of $LiPF_6$ in the solvent was 0.9 mol/kg to the solvent, and the content of $LiBF_4$ or the like in the solvent was 0.1 mol/kg to the solvent.

Example 2-8

A procedure was executed in the same manner as that of Example 2-1, except that the anode coat 52C was not formed.

For the secondary batteries of Examples 2-1 to 2-8, the cycle characteristics were examined. The results shown in Table 2 were obtained.

anode coat 52C containing the compound shown in Formula (1-1) was formed, the discharge capacity retention ratio was higher than that of Examples 2-8 in which the anode coat 52C containing the compound shown in Formula (1-1) was not formed.

In this case, in Examples 2-1 to 2-3 in which PRS or the like was added as a solvent or in Examples 2-4 to 2-7 in which $LiBF_4$ or the like was added as an electrolyte salt, the discharge capacity retention ratio was higher than that of Examples 1-1 and 1-3 in which PRS or the like and $LiBF_4$ or the like were not added.

Accordingly, it was confirmed that in the secondary battery of the present invention in which silicon was used as an anode active material and the anode active material layer 52B was formed by using vapor-phase deposition method (electron beam evaporation method), the cycle characteristics were improved even if the solvent composition and the electrolyte salt type were changed. It was also confirmed that in this case, the characteristics were more improved by using sultone or acid anhydride as a solvent of the electrolytic solution, or by using $LiBF_4$, the compound shown in Formula (9), the compound shown in Formula (10), or the compound shown in Formula (13) as an electrolyte salt.

Example 3-1

A procedure was executed in the same manner as that of Example 1-3, except that sulfopropionic magnesium (SPHMg) as an alkali earth metal salt was contained in the anode coat 52C. In forming the anode coat 52C, SPHMg was dissolved in an aqueous solution containing the compound shown in Formula (1-1) so that the content of SPHMg became 3 wt %.

TABLE 2

Battery structure: coin type
Cathode active material: $LiCoO_2$; anode active material: Si
(electron beam evaporation method)

| | | Electrolytic solution | | | | Discharge |
| | Anode | Solvent (weight ratio) | | | Others | Electrolyte salt | capacity retention |
| | Anode coat | EC | DEC | FEC | (wt %) | (mol/kg) | ratio (%) |
|---|---|---|---|---|---|---|---|
| Example 1-1 | Formula (1-1) | 30 | 70 | — | — | $LiPF_6$: 1 | 59 |
| Example 1-3 | | — | 70 | 30 | — | | 84 |
| Example 2-1 | | — | 70 | 30 | PRS: 1 | | 86 |
| Example 2-2 | | — | 70 | 30 | SCAH: 1 | | 88 |
| Example 2-3 | | — | 70 | 30 | SBAH: 1 | | 87 |
| Example 2-4 | | — | 70 | 30 | — | $LiPF_6$: 0.9   $LiBF_4$: 0.1 | 86 |
| Example 2-5 | | 30 | 70 | — | — | $LiPF_6$: 0.9   Formula (9-6): 0.1 | 65 |
| Example 2-6 | | 30 | 70 | — | — | $LiPF_6$: 0.9   Formula (10-2): 0.1 | 65 |
| Example 2-7 | | — | 70 | 30 | — | $LiPF_6$: 0.9   Formula (13-2): 0.1 | 86 |
| Example 1-12 | — | 30 | 70 | — | — | $LiPF_6$: 1 | 25 |
| Example 1-13 | | — | 70 | 30 | — | | 62 |
| Example 2-8 | | 30 | 70 | — | PRS: 1 | | 23 |

As illustrated in Table 2, in the case where PRS or the like was added as a solvent or $LiBF_4$ or the like was added as an electrolyte salt, results similar to the results of Table 1 were obtained. In other words, in Examples 2-1 to 2-7 in which the Examples 3-2 to 3-4

A procedure was executed in the same manner as that of Example 1-3, except that in forming the anode active material layer 52B, after a plurality of anode active material particles were formed, an oxide-containing film and a metal material were formed as illustrated in Table 3. In forming the oxide-containing film, the anode current collector 52A on which the anode active material particles were formed was dipped in a solution obtained by dissolving boron as an anion scavenger into hydrofluosilic acid for 3 hours, an oxide of silicon ($SiO_2$) was precipitated on the surface of the anode active material particles, and the resultant was subsequently washed with water and dried under reduced pressure. Further, in forming the metal material, a current was applied while supplying air to a plating bath, and thereby a cobalt plating film was deposited on the surface of the anode current collector 52A. In this case, a cobalt plating solution (Japan Pure Chemical Co., Ltd. make) was used as a plating solution, the current density was from 2 $A/dm^2$ to 5 $A/dm^2$ both inclusive, and the plating rate was 10 nm/sec.

Examples 3-5 to 3-7

A procedure was executed in the same manner as that of Examples 3-2 to 3-4, except that the anode coat 52C was not formed.

For the secondary batteries of Examples 3-1 to 3-7, the cycle characteristics were examined. The results shown in Table 3 were obtained.

in the case of forming both the oxide-containing film and the metal material, the discharge capacity retention ratio was still higher than that of the case of forming only one of the oxide-containing film and the metal material.

Accordingly, it was confirmed that in the secondary battery of the present invention in which silicon was used as an anode active material and the anode active material layer 52B was formed by using vapor-phase deposition method (electron beam evaporation method), the cycle characteristics were improved even if the alkali earth metal salt was contained in the anode coat 52C or the oxide-containing film or the metal material was formed. It was also confirmed that in this case, the characteristics were more improved.

Example 4-1

A procedure was executed in the same manner as that of Example 1-1, except that the cathode coat 51C was formed on the cathode active material layer 51B instead of forming the anode coat 52C. In forming the cathode coat 51C, the aqueous solution used at the time of forming the anode coat 52C was prepared, the cathode current collector 51A on which the cathode active material layer 51B was formed was dipped in the aqueous solution for several seconds, taken out, and was subsequently dried at 60 degrees C. in reduced pressure atmosphere.

TABLE 3

Battery structure: coin type
Cathode active material: $LiCoO_2$; anode active material: Si
(electron beam evaporation method)

| | Anode | | | Electric solution | | Discharge |
|---|---|---|---|---|---|---|
| | Oxide-containing film | Metal material | Anode coat | Solvent (weight ratio) | Electrolyte salt | capacity retention ratio (%) |
| | | | | DEC | FEC | (mol/kg) | |
| Example 1-3 | — | — | Formula (1-1) | 70 | 30 | $LiPF_6$: 1 | 84 |
| Example 3-1 | — | — | Formula (1-1) + SPHMg | 70 | 30 | | 88 |
| Example 3-2 | $SiO_2$ | — | Formula (1-1) | 70 | 30 | | 92 |
| Example 3-3 | — | Co | | 70 | 30 | | 91 |
| Example 3-4 | $SiO_2$ | Co | | 70 | 30 | | 94 |
| Example 1-13 | — | — | — | 70 | 30 | $LiPF_6$: 1 | 62 |
| Example 3-5 | $SiO_2$ | — | | 70 | 30 | | 90 |
| Example 3-6 | — | Co | | 70 | 30 | | 90 |
| Example 3-7 | $SiO_2$ | Co | | 70 | 30 | | 92 |

As illustrated in Table 3, even if the alkali earth metal salt was contained in the anode coat 52C or even if the oxide-containing film or the metal material was formed before the anode coat 52C was formed, results similar to those of Table 1 were obtained. In other words, in Examples 3-1 to 3-4 in which the anode coat 52C containing the compound shown in Formula (1-1) was formed, the discharge capacity retention ratio was higher than that of Examples 3-5 to 3-7 in which the anode coat 52C containing the compound shown in Formula (1-1) was not formed.

In this case, in Example 3-1 in which SPHMg was added to the anode coat 52C, the discharge capacity retention ratio was higher than that of Example 1-3 in which SPHMg was not added to the anode coat 52C. Further, in Examples 3-2 to 3-4 in which the oxide-containing film and the metal material were formed, the discharge capacity retention ratio was higher than that of Example 1-3 in which the oxide-containing film and the metal material were not formed. In particular, Example 4-2

A procedure was executed in the same manner as that of Example 1-7, except that the cathode coat 51C was formed on the cathode active material layer 51B in addition to forming the anode coat 52C. A procedure of forming the cathode coat 51C was similar to that of Example 4-1.

Example 4-3

A procedure was executed in the same manner as that of Example 1-1, except that the compound shown in Formula (1-1) was dispersed in the electrolytic solution instead of forming the anode coat 52C. In preparing the electrolytic solution, the compound shown in Formula (1-1) was dissolved until the compound was saturated in the solvent.

Example 4-4

A procedure was executed in the same manner as that of Example 4-3, except that instead of the compound shown in Formula (1-1), edaravone was dispersed in the electrolytic solution. Edaravone is a compound obtained by substituting a sulfonic lithium salt group with a hydrogen group out of the compounds shown in Formula (1-1).

For the secondary batteries of Examples 4-1 to 4-4, the cycle characteristics were examined. The results shown in Table 4 were obtained.

TABLE 4

Battery structure: coin type
Cathode active material: $LiCoO_2$; anode active material: Si
(electron beam evaporation method)

| | Anode Anode coat | Cathode Cathode coat | Solvent (weight ratio) | | | | | Electrolyte salt (mol/kg) | Others | Discharge capacity retention ratio (%) |
|---|---|---|---|---|---|---|---|---|---|---|
| | | | EC | PC | DEC | FEC | DFEC | | | |
| Example 1-1 | Formula | — | 30 | — | 70 | — | — | $LiPF_6$: 1 | — | 59 |
| Example 1-3 | (1-1) | | — | — | 70 | 30 | — | | — | 84 |
| Example 1-7 | | | 5 | 20 | 50 | 15 | 10 | | — | 90 |
| Example 4-1 | — | Formula | 30 | — | 70 | — | — | | — | 26 |
| Example 4-2 | Formula (1-1) | (1-1) | 5 | 20 | 50 | 15 | 10 | | — | 91 |
| Example 4-3 | — | — | 30 | — | 70 | — | — | | Formula (1-1) | 35 |
| Example 1-12 | — | — | 30 | — | 70 | — | — | $LiPF_6$: 1 | — | 25 |
| Example 1-13 | | | — | — | 70 | 30 | — | | — | 62 |
| Example 4-4 | | | 30 | — | 70 | — | — | | Edaravone | 10 |

As illustrated in Table 4, in Examples 4-1 and 4-2 in which the cathode coat 51C containing the compound shown in Formula (1-1) was formed, the discharge capacity retention ratio was higher than that of Examples 1-12 and 1-13 in which the cathode coat 51C containing the compound shown in Formula (1-1) was not formed.

Further, in Example 4-3 in which the compound shown in Formula (1-1) was dispersed in the electrolytic solution, the discharge capacity retention ratio was higher than that of Example 1-12 in which the compound shown in Formula (1-1) was not dispersed in the electrolytic solution. In particular, in Example 4-4 in which edaravone was dispersed in the electrolytic solution, the discharge capacity retention ratio was lower than that of Example 1-12 in which edaravone was not dispersed in the electrolytic solution. The results showed the following. That is, in the case where edaravone to which a sulfonic metal base was not introduced was used as an additive added to the electrolytic solution, the discharge capacity retention ratio was not able to be improved, and the discharge capacity retention ratio was lowered. Meanwhile, in the case where the compound obtained by introducing a sulfonic metal base to edaravone (compound shown in Formula (1-1)) was used, the discharge capacity retention ratio was able to be largely improved.

Accordingly, it was confirmed that in the secondary battery of the present invention in which silicon was used as an anode active material and the anode active material layer 52B was formed by using vapor-phase deposition method (electron beam evaporation method), the cycle characteristics were improved by providing the cathode coat 51C containing the radical scavenger compound shown in Formula (1) on the cathode active material layer 51B or containing the radical scavenger compound shown in Formula (1) in the electrolytic solution.

Examples 5-1 to 5-14

A procedure was executed in the same manner as that of Examples 1-1 to 1-14, except that the anode active material layer 52B was formed by sintering method instead of vapor-phase deposition method (electron beam evaporation method) to have a thickness of 10 μm. In forming the anode active material layer 52B, first, an anode mixture in which 95 parts by mass of silicon as an anode active material (median diameter: 1 μm) and 5 parts by mass of polyimide as an anode binder were mixed was dispersed in N-methyl-2-pyrrolidone to obtain a paste anode mixture slurry. One face of the anode current collector 52A made of an electrolytic copper foil (thickness: 18 μm) was uniformly coated with the anode mixture slurry by using a bar coater, which was dried. Thereafter, the resultant was compression-molded by a roll pressing machine. Finally, the resultant was heated for 12 hours at 400 degrees C. in the vacuum atmosphere.

For the secondary batteries of Examples 5-1 to 5-14, the cycle characteristics were examined. The results shown in Table 5 were obtained.

TABLE 5

Battery structure: coin type
Cathode active material: LiCoO$_2$; anode active material: Si (sintering method)

| | Anode Anode coat | Electrolytic solution | | | | | | | Discharge capacity retention ratio (%) |
|---|---|---|---|---|---|---|---|---|---|
| | | Solvent (weight ratio) | | | | | | Electrolyte salt (mol/kg) | |
| | | EC | PC | DEC | FEC | DFEC | DFDMC | VC | | |
| Example 5-1 | Formula (1-1) | 30 | — | 70 | — | — | — | — | LiPF$_6$: 1 | 49 |
| Example 5-2 | | 10 | 20 | 70 | — | — | — | — | | 50 |
| Example 5-3 | | — | — | 70 | 30 | — | — | — | | 84 |
| Example 5-4 | | 10 | 10 | 70 | 10 | — | — | — | | 83 |
| Example 5-5 | | 10 | — | 70 | — | 20 | — | — | | 87 |
| Example 5-6 | | 10 | 10 | 70 | — | 10 | — | — | | 86 |
| Example 5-7 | | 5 | 20 | 50 | 15 | 10 | — | — | | 88 |
| Example 5-8 | | — | — | 65 | 30 | — | 5 | — | | 86 |
| Example 5-9 | | 10 | 19 | 70 | — | — | — | 1 | | 51 |
| Example 5-10 | | 10 | 10 | 70 | — | — | — | 10 | | 53 |
| Example 5-11 | Formula (1-2) | 5 | 20 | 50 | 15 | 10 | — | — | | 87 |
| Example 5-12 | — | 30 | — | 70 | — | — | — | — | LiPF$_6$: 1 | 21 |
| Example 5-13 | | — | — | 70 | 30 | — | — | — | | 80 |
| Example 5-14 | | 10 | — | 70 | — | 20 | — | — | | 81 |

As illustrated in Table 5, in the case where silicon was used as an anode active material and the anode active material layer 52B was formed by using sintering method, the results similar to the results of Table 1 were obtained as well. In other words, in Examples 5-1 to 5-11 in which the anode coat 52C containing the compound shown in Formula (1-1) or the compound shown in Formula (1-2) was formed, the discharge capacity retention ratio was higher than that of Examples 5-12 to 5-14 in which the anode coat 52C was not formed. Further, in Examples 5-2 to 5-10 in which PC or the like was added as a solvent, the discharge capacity retention ratio was higher than that of Example 5-1.

Accordingly, in the secondary battery of the present invention, it was confirmed that in the case where silicon was used as an anode active material and the anode active material layer 52B was formed by using sintering method, the cycle characteristics were improved by providing the anode coat 52C containing the radical scavenger compound shown in Formula (1) on the anode active material layer 52B.

Examples 6-1 to 6-8

A procedure was executed in the same manner as that of Examples 2-1 to 2-8, except that the anode active material layer 52B was formed by using sintering method as in Examples 5-1 to 5-14.

The cycle characteristics of the secondary batteries of Examples 6-1 to 6-8 were examined. The results shown in Table 6 were obtained.

TABLE 6

Battery structure: coin type
Cathode active material: LiCoO$_2$; anode active material: Si (sintering method)

| | Anode Anode coat | Electrolytic solution | | | | | | Discharge capacity retention ratio (%) |
|---|---|---|---|---|---|---|---|---|
| | | Solvent (weight ratio) | | | Others (wt %) | Electrolyte salt (mol/kg) | | |
| | | EC | DEC | FEC | | | | |
| Example 5-1 | Formula (1-1) | 30 | 70 | — | — | LiPF$_6$: 1 | | 49 |
| Example 5-3 | | — | 70 | 30 | — | | | 84 |
| Example 6-1 | | — | 70 | 30 | PRS: 1 | | | 85 |
| Example 6-2 | | — | 70 | 30 | SCAH: 1 | | | 86 |
| Example 6-3 | | — | 70 | 30 | SBAH: 1 | | | 86 |
| Example 6-4 | | — | 70 | 30 | — | LiPF$_6$: 0.9 | LiBF$_4$: 0.1 | 85 |
| Example 6-5 | | 30 | 70 | — | — | LiPF$_6$: 0.9 | Formula (9-6): 0.1 | 59 |
| Example 6-6 | | 30 | 70 | — | — | LiPF$_6$: 0.9 | Formula (10-2): 0.1 | 60 |
| Example 6-7 | | — | 70 | 30 | — | LiPF$_6$: 0.9 | Formula (13-2): 0.1 | 86 |
| Example 5-12 | — | 30 | 70 | — | — | LiPF$_6$: 1 | | 21 |
| Example 5-13 | | — | 70 | 30 | — | | | 80 |
| Example 6-8 | | 30 | 70 | — | PRS: 1 | | | 21 |

As illustrated in Table 6, in the case where the anode active material layer 52B was formed by sintering method, results similar to the results of Table 2 were obtained. In other words, in Examples 6-1 to 6-7 in which the anode coat 52C containing the compound shown in Formula (1-1) was formed, the discharge capacity retention ratio was higher than that of Example 6-8 in which the anode coat 52C containing the compound shown in Formula (1-1) was not formed. Further, in Examples 6-1 to 6-7 in which PRS or the like was added as a solvent or $LiBF_4$ or the like was added as an electrolyte salt, the discharge capacity retention ratio was higher than that of Examples 5-1 and 5-3 in which PRS or the like or $LiBF_4$ or the like was not added.

Accordingly, it was confirmed that in the secondary battery of the present invention in which silicon was used as an anode active material and the anode active material layer 52B was formed by using sintering method, the cycle characteristics were more improved by using sultone or acid anhydride as a solvent of the electrolytic solution, or by using $LiBF_4$, the compound shown in Formula (9), the compound shown in Formula (10), or the compound shown in Formula (13) as an electrolyte salt.

Example 7

A procedure was executed in the same manner as that of Example 3-1, except that the anode active material layer 52B was formed by sintering method in the same manner as that of Examples 5-1 to 5-14.

The cycle characteristics of the secondary battery of Example 7 were examined. The results shown in Table 7 were obtained.

TABLE 7

Battery structure: coin type
Cathode active material: $LiCoO_2$;
anode active material: Si (sintering method)

| | | Electrolytic solution | | | Discharge capacity retention ratio (%) |
|---|---|---|---|---|---|
| | Anode | Solvent (weight ratio) | | Electrolyte salt | |
| | Anode coat | DEC | FEC | (mol/kg) | |
| Example 5-3 | Formula (1-1) | 70 | 30 | $LiPF_6$: 1 | 84 |
| Example 7 | Formula (1-1) + SPHMg | 70 | 30 | | 88 |

As illustrated in Table 7, in the case where the anode active material layer 52B was formed by sintering method, results similar to the results of Table 3 were obtained. In other words, in the case where the anode coat 52C containing the compound shown in Formula (1-1) was formed, in Example 7 in which the alkali earth metal salt was contained in the anode coat 52C, the discharge capacity retention ratio was higher than that of Example 5-3 in which the alkali earth metal salt was not contained in the anode coat 52C.

Accordingly, it was confirmed that in the secondary battery of the present invention in which silicon was used as an anode active material and the anode active material layer 52B was formed by using sintering method, even if the alkali earth metal salt was contained in the anode coat 52C, the cycle characteristics were improved, and in this case, the characteristics were more improved.

Example 8-1

A procedure was executed in the same manner as that of Examples 1-1 to 1-10, except that an SnCoC-containing material was used instead of silicon as an anode active material, the anode active material layer 52B was formed by coating method instead of vapor-phase deposition method, and the solvent composition was changed as illustrated in Table 8.

Figure 20:
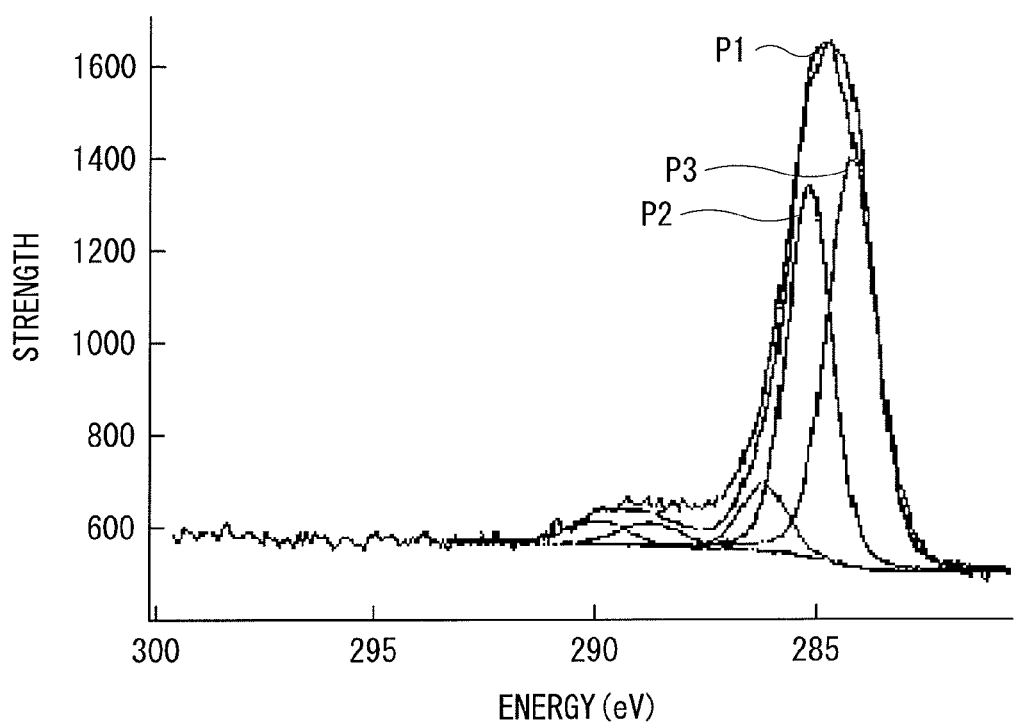
FIG. 20 is a diagram illustrating an analytical result of an SnCoC-containing material by X-ray Photoelectron Spectroscopy.

In forming the anode active material, first, tin powder and cobalt powder were alloyed to obtain tin-cobalt alloy powder. Thereafter, the resultant was added with carbon powder and dry-mixed. Subsequently, 20 g of the foregoing mixture and about 400 g of a corundum being 9 mm in diameter were set in a reaction container of a planetary ball mill (Ito Seisakusho Co., Ltd. make). Subsequently, inside of the reaction container was substituted with argon (Ar) atmosphere. Thereafter, 10 minute operation at 250 rpm and 10 minute break were repeated until the total operation time reached 50 hours. Finally, after the reaction container was cooled down to room temperature, the synthesized anode active material powder was taken out. Thereafter, the resultant was screened through a 280 mesh sieve to remove coarse grain. The composition of the obtained SnCoC-containing material was analyzed. The tin content was 48 wt %, the cobalt content was 23 wt %, the carbon content was 20 wt %, and the ratio of cobalt to the total of tin and cobalt (Co/(Sn+Co)) was 32 wt %. In analyzing the composition of the SnCoC-containing material, carbon sulfur analysis equipment was used for the carbon content, and Inductively Coupled Plasma (ICP) emission analysis was used for the tin content and the cobalt content. Further, the obtained SnCoC-containing material was analyzed by X-ray diffraction method. A diffraction peak having a half bandwidth with the diffraction angle $2\theta$ of 1.0 degree or more was observed in the range of $2\theta=20$ to 50 degrees. Further, when the SnCoC-containing material was analyzed by XPS, as illustrated in FIG. 20, peak P1 was obtained. When the peak P1 was analyzed, peak P2 of the surface contamination carbon and peak P3 of C1s in the SnCoC-containing material existing on the lower energy side were obtained. Peak P3 was obtained in a region lower than 284.8 eV. In other words, it was confirmed that carbon in the SnCoC-containing material was bonded with other element.

In forming the anode active material layer 52B, first, 80 parts by mass of the SnCoC-containing material powder as an anode active material, 11 parts by mass of graphite and 1 part by mass of acetylene black as an anode electrical conductor, and 8 parts by mass of polyvinylidene fluoride as an anode binder were mixed to obtain an anode mixture. Thereafter, the anode mixture was dispersed in N-methyl-2-pyrrolidone to obtain a paste anode mixture slurry. Subsequently, one face of the anode current collector 52A made of an electrolytic copper foil (thickness: 10 μm) was uniformly coated with the anode mixture slurry and the resultant was dried. Finally, the resultant was compression-molded by using a rolling press machine.

As a solvent, dimethyl carbonate (DMC) was used together with EC, PC, and FEC.

Example 8-2

A procedure was executed in the same manner as that of Example 8-1, except that the anode coat 52 was not formed.

For the secondary batteries of Examples 8-1 and 8-2, the cycle characteristics were examined. The results illustrated in Table 8 were obtained.

TABLE 8

Battery structure: coin type
Cathode active material: LiCoO$_2$; anode active material:
SnCoC-containing material (coating method)

| | Anode Anode coat | Electrolytic solution | | | | Discharge capacity retention ratio (%) |
|---|---|---|---|---|---|---|
| | | Solvent (weight ratio) | | | Electrolyte salt (mol/kg) | |
| | | EC | PC | DMC | FEC | |
| Example 8-1 | Formula (1-1) | 20 | 10 | 69 | 1 | LiPF$_6$: 1 | 90 |
| Example 8-2 | — | 20 | 10 | 69 | 1 | LiPF$_6$: 1 | 89 |

As illustrated in Table 8, in the case where the SnCoC-containing material was used as an anode active material, and the anode active material layer 52B was formed by using coating method, results similar to the results of Table 1 were obtained. In other words, in Example 8-1 in which the anode coat 52C containing the compound shown in Formula (1-1) was formed, the discharge capacity retention ratio was higher than that of Example 8-2 in which the anode coat 52C containing the compound shown in Formula (1-1) was not formed.

Accordingly, it was confirmed that in the secondary battery of the present invention, in the case where the SnCoC-containing material was used as an anode active material, and the anode active material layer 52B was formed by using coating method, if the anode coat 52C containing the radical scavenger compound shown in Formula (1) was formed on the anode active material layer 52B, the cycle characteristics were improved.

Example 9-1

A procedure was executed in the same manner as that of Example 8-1, except that artificial graphite was used instead of the SnCoC-containing material as an anode active material, and the anode active material layer 52B was formed by using coating method so that the thickness became 70 μm. In forming the anode 52, first, 97 parts by mass of artificial graphite powder as an anode active material and 3 parts by mass of polyvinylidene fluoride as an anode binder were mixed to obtain an anode mixture. Thereafter, the anode mixture was dispersed in N-methyl-2-pyrrolidone to obtain a paste anode mixture slurry. Subsequently, one face of the anode current collector 52A made of an electrolytic copper foil (thickness: 15 μm) was uniformly coated with the anode mixture slurry by using a bar coater, which was dried to form the anode active material layer 52B. Subsequently, the anode active material layer 52B was compression-molded by using a roll pressing machine. Subsequently, the compound shown in Formula (1-1) was dispersed in water so that the content of the compound shown in Formula (1-1) became 3 wt %, and thereby an aqueous solution containing the compound was prepared. Thereafter, perfluorobutanesulfonic lithium as a surfactant was added so that the content thereof became 0.5 wt %. Finally, the anode current collector 52A on which the anode active material layer 52B was formed was dipped in the aqueous solution for several seconds, was taken out, and was subsequently dried at 60 degrees C. in reduced pressure atmosphere. Thereby, the anode coat 52C containing the compound shown in Formula (1-1) was formed on the anode active material layer 52B.

Example 9-2

A procedure was executed in the same manner as that of Example 9-1, except that the anode coat 52C was not formed.

For the secondary batteries of Examples 9-1 and 9-2, the cycle characteristics were examined. The results illustrated in Table 9 were obtained.

TABLE 9

Battery structure: coin type
Cathode active material: LiCoO$_2$;
anode active material: Artificial graphite

| | Anode Anode coat | Electrolytic solution | | | | Discharge capacity retention ratio (%) |
|---|---|---|---|---|---|---|
| | | Solvent (weight ratio) | | | Electrolyte salt (mol/kg) | |
| | | EC | PC | DMC | FEC | |
| Example 9-1 | Formula (1-1) | 20 | 10 | 69 | 1 | LiPF$_6$: 1 | 93 |
| Example 9-2 | — | 20 | 10 | 69 | 1 | LiPF$_6$: 1 | 92 |

As illustrated in Table 9, in the case where the artificial graphite was used as an anode active material, and the anode active material layer 52B was formed by using coating method, results similar to the results of Table 1 were obtained. In other words, in Example 9-1 in which the anode coat 52C containing the compound shown in Formula (1-1) was formed, the discharge capacity retention ratio was higher than that of Example 9-2 in which the anode coat 52C containing the compound shown in Formula (1-1) was not formed.

Accordingly, it was confirmed that in the secondary battery of the present invention, in the case where the artificial graphite was used as an anode active material, and the anode active material layer 52B was formed by using coating method, if the anode coat 52C containing the radical scavenger compound shown in Formula (1) was provided on the anode active material layer 52B, the cycle characteristics were improved.

Example 10-1

A procedure was executed in the same manner as that of Example 1-3, except that LiCo$_{0.98}$Al$_{0.01}$Mg$_{0.01}$O$_2$ was used instead of LiCoO$_2$ as a cathode active material, and the cathode coat 51C was formed on the cathode active material layer 51B instead of forming the anode coat 52C on the anode active material layer 52B. A procedure of forming the cathode coat 51C was similar to that of Example 4-1.

Example 10-2

A procedure was executed in the same manner as that of Example 10-1, except that the particle coating film 212 was formed on the surface of the particulate cathode active material (cathode active material particles 211), instead of forming the cathode coat 51C on the cathode active material layer 51B. In forming the cathode 51, first, 100 parts by mass of LiCo$_{0.98}$Al$_{0.01}$Mg$_{0.01}$O$_2$ as a cathode active material and 1 part by mass of the compound shown in Formula (1-1) were put into 100 cm$^3$ pure water, which was mixed while being stirred for 1 hour. Subsequently, moisture was removed from the mixture by using an evaporator, and the resultant was dried for 12 hours at 120 degrees C. in an oven. Thereby, the particle coating film 212 containing the compound shown in Formula (1-1) was formed to cover the surface of the cathode active material particle 211. Subsequently, 91 parts by mass of the cathode active material particle 211 (LiCo$_{0.98}$Al$_{0.01}$Mg$_{0.01}$O$_2$) on which the particle coating film 212 was formed, 6 parts by mass of graphite as a cathode electrical conductor, 3 parts by mass of polyvinylidene fluoride as a cathode binder were mixed to obtain a cathode mixture. Thereafter, the cathode mixture was dispersed in N-methyl-2-pyrrolidone to obtain a paste cathode mixture slurry. Subsequently, one face of the cathode current collector 51A made of a strip-shaped aluminum foil (thickness: 12 μm) was uniformly coated with the cathode mixture slurry by using a bar coater, which was dried to form the cathode active material layer 51B. Finally, the cathode active material layer 51B was compression-molded by using a roll pressing machine.

Example 10-3

A procedure was executed in the same manner as that of Examples 10-1 and 10-2, except that the cathode coat 51C or the particle coating film 212 was not formed.

For the secondary batteries of Examples 10-1 and 10-3, the cycle characteristics and the resistance characteristics were examined. The results illustrated in Table 10 were obtained.

In examining the reaction resistance characteristics, first, 100 cycles of charge and discharge were performed under the conditions similar to those in examining the cycle characteristics. Thereafter, complex impedance of the secondary battery in frequency band from $10^{-2}$ Hz to $10^6$ Hz was measured by using AC impedance method in the atmosphere of 23 degrees C. Subsequently, the complex impedance was expressed by Cole-Cole plot in which the horizontal axis indicates impedance real part (Z') and the vertical axis indicated impedance imaginary part (Z"). Finally, circular arc of the resistance component (anode 52) was approximated as a half circle to obtain reaction resistance as the maximum value.

was more advantageous than the particle coating film 212 to increase the discharge capacity retention ratio.

Further, in Examples 10-1 and 10-2 in which the cathode coat 51C or the particle coating film 212 was formed, the reaction resistance was lower than that of Example 10-3 in which the cathode coat 51C or the particle coating film 212 was not formed. The result showed that increase of resistance component in the anode 52 was inhibited. In other words, adhesion of decomposed matter to the anode 52 was inhibited by providing the cathode coat 51C or the particle coating film 212.

Accordingly, it was confirmed that in the secondary battery of the present invention, the cycle characteristics were improved and the reaction resistance characteristics were improved by providing the cathode coat 51C or the particle coating film 212 containing the radical scavenger compound shown in Formula (1).

Example 11-1

A procedure was executed in the same manner as that of Example 10-2, except that the laminated film type secondary battery illustrated in FIG. 7 and FIG. 8 was fabricated instead of forming the coin type secondary battery, and the solvent composition was changed as illustrated in Table 11.

In forming the laminated film type secondary battery, first, the cathode active material layer 33B (including the particle coating film 212) was formed on both faces of the cathode current collector 33A to form the cathode 33, and the anode active material layer 34B was formed on both faces of the anode current collector 34A to form the anode 34 by a procedure similar to that of forming the cathode 51 and the anode

TABLE 10

Battery structure: coin type
Cathode active material: $LiCo_{0.98}Al_{0.01}Mg_{0.01}O_2$;
anode active material: Si (electron beam evaporation method)

|  | Cathode | | Electrolytic solution | | | Discharge capacity | |
|---|---|---|---|---|---|---|---|
|  | Cathode coat | Particle coating film | Solvent (weight ratio) DEC | FEC | Electrolyte salt (mol/kg) | retention ratio (%) | Reaction resistance (Ω) |
| Example 10-1 | Formula (1-1) | — | 70 | 30 | $LiPF_6$: 1 | 66 | 14 |
| Example 10-2 | — | Formula (1-1) | 70 | 30 |  | 65 | 14 |
| Example 10-3 | — | — | 70 | 30 | $LiPF_6$: 1 | 62 | 23 |

As illustrated in Table 10, in the case where $LiCo_{0.98}Al_{0.01}Mg_{0.01}O_2$ was used as a cathode active material, and the cathode coat 51C or the particle coating film 212 containing the compound shown in Formula (1-1) was formed, results similar to the results of Table 4 were obtained. In other words, in Examples 10-1 and 10-2 in which the cathode coat 51C or the particle coating film 212 containing the compound shown in Formula (1-1) was formed, the discharge capacity retention ratio was higher than that of Example 10-3 in which the cathode coat 51C or the particle coating film 212 containing the compound shown in Formula (1-1) was not formed.

In this case, in Example 10-1 in which the cathode coat 51C was formed, the discharge capacity retention ratio was higher than that of Example 10-2 in which the particle coating film 212 was formed. The result showed that the cathode coat 51C 52. Subsequently, the cathode lead 31 made of aluminum was welded to one end of the cathode current collector 33A, and the anode lead 32 made of nickel was welded to one end of the anode current collector 34A. Subsequently, the cathode 33, the separator 35, the anode 34, and the separator 35 were layered in this order, and the resultant laminated body was spirally wound in the longitudinal direction. Thereafter, the end section of the wound body was fixed by the protective tape 37 made of an adhesive tape, and thereby a wound body as a precursor of the wound electrode body 30 was formed. In this case, as the separator 35, a 3-layer structure (thickness: 12 μm) in which a film having porous polypropylene as a main component was sandwiched between films having porous polypropylene as a main component was used. Subsequently, the wound body was sandwiched between the package members 40. Thereafter, outer edges other than an edge of one side of the package members were thermally fusion-bonded with each other. Thereby, the wound body was contained in the package members 40 in a pouched state. In this case, a 3-layer laminated film (total thickness: 100 μm) in which a nylon film (thickness: 30 μm), an aluminum foil (thickness: 40 μm), and a non-stretch polypropylene film (thickness 30 μm) were layered from the outside was used as the package members 40. Subsequently, an electrolytic solution was injected through the opening of the package member 40, the electrolytic solution was impregnated in the separator 35, and thereby the wound electrode body 30 was formed. In this case, EC and DEC were used as a solvent of the electrolytic solution. Finally, the opening of the package member 40 was sealed by thermal fusion bonding in the vacuum atmosphere, and thereby the laminated film type secondary battery was completed. In manufacturing the secondary battery, the thickness of the cathode active material layer 33B was adjusted so that the charge and discharge capacity of the anode 34 was larger than the charge and discharge capacity of the cathode 33, and thereby lithium metal was prevented from being precipitated on the anode 34 at the time of full charge.

Example 11-2

A procedure was executed in the same manner as that of Example 11-1, except that the particle coating film 212 was not formed.

The cycle characteristics and the swollenness characteristics of the secondary batteries of Examples 11-1 and 11-2 were examined. The results shown in Table 11 were obtained.

In examining the swollenness characteristics, to stabilize battery state, charge and discharge were performed 1 cycle in the atmosphere of 23 degrees C., and thereby the thickness of the secondary battery before storage was measured. Subsequently, the secondary battery in a state of being recharged in the same atmosphere was stored in a constant-temperature bath at 80 degrees C. for 8 hours to measure the thickness of the secondary battery after storage. Finally, swollenness ratio (%)=[(thickness after storage-thickness before storage)/thickness before storage]*100 was calculated. At this time, the charge and discharge condition was as follows. That is, charge was performed for 2.5 hours at the constant current density of 800 mA until the battery voltage reached 4.2 V, and discharge was performed at the discharge current of 400 mA until the battery voltage reached 3.0 Vcm$^2$.

Example 11-2 in which the particle coating film 212 containing the compound shown in Formula (1-1) was not formed.

In this case, in Example 11-1 in which the particle coating film 212 was formed, the swollenness was smaller than that of Example 11-2 in which the particle coating film 212 was not formed. The result showed that since decomposition reaction of the electrolytic solution was inhibited by the particle coating film 212, generation amount of the decomposition gas was kept low.

Accordingly, it was confirmed that in the secondary battery of the present invention, in the case where the battery structure was changed to the laminated film type, the cycle characteristics were improved and in addition, the swollenness characteristics were improved as well.

In the foregoing Table 1 to Table 11, as the radical scavenger compound shown in Formula (1), only the result in the case that the compound shown in Formula (1-1) or the like was used is shown, but results in the case that the compounds other than the compound shown in Formula (1-1) (for example, the compound shown in Formula (1-3) or the like) are not shown. However, since the compound shown in Formula (1-3) plays a function similar to that of the compound shown in Formula (1-1) or the like, similar result is able to be obtained as well if other compound is used or a plurality of the foregoing compounds are used by mixture.

The foregoing description for the radical scavenger compound shown in Formula (1) is similarly applied to the chain ester carbonate having a halogen shown in Formula (4) as an element, the cyclic ester carbonate having a halogen shown in Formula (5) as an element, the cyclic ester carbonate having an unsaturated carbon bond shown in Formula (6) to Formula (8), or the compounds shown in Formula (9) to Formula (14). In other words, in the case where a compound corresponding to the chain ester carbonate or the like having a halogen shown in the foregoing Formula (4) as an element is used as a solvent or an electrolyte salt, result similar to that of the case using the compounds practically used in Table 1 to Table 11 is obtained even if the foregoing corresponding compound is not a compound practically used in Table 1 to Table 11.

From the foregoing results of Table 1 to Table 11, in the secondary battery of the present invention, in the case where at least one of the cathode, the anode, and the electrolyte contained the radical scavenger compound shown in Formula (1), the cycle characteristics were able to be improved not

TABLE 11

Battery structure: laminated film type
Cathode active material: LiCo$_{0.98}$Al$_{0.01}$Mg$_{0.01}$O$_2$;
anode active material: Si (electron beam evaporation method)

|  | Cathode Particle coating film | Electrolytic solution | | | Discharge capacity retention ratio (%) | Swollenness (mm) |
|---|---|---|---|---|---|---|
|  |  | Solvent (weight ratio) | | Electrolyte salt (mol/kg) | | |
|  |  | EC | DEC | | | |
| Example 11-1 | Formula (1-1) | 50 | 50 | LiPF$_6$: 1 | 88 | 0.2 |
| Example 11-2 | — | 50 | 50 | LiPF$_6$: 1 | 85 | 0.4 |

As illustrated in Table 11, in the case where the battery structure was the laminated film type, results similar to the results of Table 10 were also obtained. In other words, in Example 11-1 in which the particle coating film 212 containing the compound shown in Formula (1-1) was formed, the discharge capacity retention ratio was higher than that of depending on the electrolyte composition, type of the anode active material and the cathode active material, the method of forming the cathode active material layer and the anode active material layer or the like. In this case, in particular, in the case where the anode contained the radical scavenger compound, the characteristics were able to be more improved.

Further, in the case where a high capacity material such as silicon and a tin-cobalt alloy was used as an anode active material, increase ratio of the discharge capacity retention ratio was higher than that of the case using a carbon material such as artificial graphite. Thus, in the case where the high capacity material such as silicon and a tin-cobalt alloy was used, higher effect was able to be obtained. It is regarded that the result showed that in the case where the high capacity material was used as an anode active material, electrolyte is more easily decomposed than the case of using the carbon material, and thus electrolyte decomposition inhibition effect was significantly demonstrated.

Examples 12-1 to 12-11

Next, the coin type secondary battery illustrated in FIG. 10 was fabricated by using the nitrile compound shown in Formula (2) instead of the radical scavenger compound shown in Formula (1) by the following procedure. At this time, the secondary battery was fabricated as a lithium ion secondary battery in which the capacity of the anode 52 was expressed based on insertion and extraction of lithium ions.

First, the cathode 51 was formed. First, lithium carbonate ($Li_2CO_3$) and cobalt carbonate ($CoCO_3$) were mixed at a molar ratio of 0.5:1. Thereafter, the mixture was fired in the air at 900 degrees C. for 5 hours. Thereby, lithium cobalt composite oxide ($LiCoO_2$) was obtained. Subsequently, 91 parts by mass of the lithium cobalt composite oxide as a cathode active material, 6 parts by mass of graphite as an electrical conductor, and 3 parts by mass of polyvinylidene fluoride as a binder were mixed to obtain a cathode mixture. Thereafter, the cathode mixture was dispersed in N-methyl-2-pyrrolidone to obtain a paste cathode mixture slurry. Subsequently, the cathode current collector 51A made of a strip-shaped aluminum foil (thickness: 12 μm) was uniformly coated with the cathode mixture slurry by a bar coater, which was dried. Thereafter, the resultant was compression-molded by a roll pressing machine to form the cathode active material layer 51B. Finally, the cathode current collector 51A on which the cathode active material layer 51B was formed was punched out into a pellet having a diameter of 15.5 mm.

Next, the anode 52 was formed. First, the anode current collector 52A made of a roughened electrolytic copper foil (thickness: 10 μm) was prepared. Thereafter, silicon as an anode active material was deposited on the anode current collector 52A to form a plurality of anode active material particles by electron beam evaporation method, and thereby the anode active material layer 52B was formed. The thickness of the anode active material layer 52B formed on the anode current collector 52A was 5 μm. Subsequently, as a solution containing the nitrile compound shown in Formula (2), 3 wt % aqueous solution thereof was prepared. In this case, 3 wt % aqueous solution of the compound shown in Formula (2-1) was used in Examples 12-1 to 12-10, and 3 wt % aqueous solution of the compound shown in Formula (2-2) was used in Example 12-11. Subsequently, the anode current collector 52A on which the anode active material layer 52B was formed was dipped in the solution for several seconds, was taken out, and was subsequently dried at 150 degrees C. in reduced pressure atmosphere. Thereby, the anode coat 52C was formed on the anode active material layer 52B. Finally, the anode current collector 52A on which the anode coat 52C and the anode active material layer 52B were formed was punched out into a pellet having a diameter of 16 mm.

Next, an electrolytic solution was prepared. Specifically, lithium hexafluorophosphate ($LiPF_6$) as an electrolyte salt was dissolved in a solvent obtained by mixing at least one of ethylene carbonate (EC), propylene carbonate (PC), 4-fluoro-1,3-dioxolane-2-one (FEC), 4,5-difluoro-1,3-dioxolane-2-one (DFEC), his carbonate (fluoromethyl) (DFDMC), and vinylene carbonate (VC) and diethyl carbonate (DEC) as a solvent to obtain the compositions illustrated in Table 12. In this case, the concentration of lithium hexafluorophosphate in the electrolytic solution was 1 mol/kg.

Finally, the secondary battery was assembled by using the cathode 51, the anode 52, and the electrolytic solution. First, the cathode 51, the anode 52, and the separator 53 made of a microporous polypropylene film were layered so that the cathode active material layer 51B and the anode active material layer 52B were opposed to each other with the separator 53 in between, and the resultant laminated body was subsequently contained in the package can 54. Thereafter, the electrolytic solution was injected therein. The package cup 55 was laid on the package can 54, the package cup 55 and the package can 54 were caulked with a gasket 56, and thereby the coin type secondary battery was completed.

Examples 12-12 to 12-14

A procedure similar to that of Examples 12-1, 12-3, and 12-5 was executed, except that the anode coat 52C was not formed.

Examples 12-15

A procedure similar to that of Example 12-3 was executed, except that methanesulfonic lithium ($CH_3SO_3Li$) was used instead of the compound shown in Formula (2-1).

For the secondary batteries of Examples 12-1 to 12-15, the cycle characteristics were examined. The results illustrated in Table 12 were obtained.

TABLE 12

Battery structure: coin type
Cathode active material: $LiCoO_2$;
anode active material: Si (electron beam evaporation method)

| | | Electrolytic solution | | | | | | | Discharge capacity |
|---|---|---|---|---|---|---|---|---|---|
| | Anode Anode | | | Solvent (weight ratio) | | | | Electrolyte salt | retention ratio |
| | coat | EC | PC | DEC | FEC | DFEC | DFDMC | VC | (mol/kg) | (%) |
| Example 12-1 | Formula | 30 | — | 70 | — | — | — | — | $LiPF_6$: 1 | 57 |
| Example 12-2 | (2-1) | 10 | 20 | 70 | — | — | — | — | | 58 |
| Example 12-3 | | — | — | 70 | 30 | — | — | — | | 84 |

TABLE 12-continued

Battery structure: coin type
Cathode active material: LiCoO$_2$;
anode active material: Si (electron beam evaporation method)

| | Anode Anode coat | Electrolytic solution | | | | | | | Electrolyte salt | Discharge capacity retention ratio (%) |
|---|---|---|---|---|---|---|---|---|---|---|
| | | Solvent (weight ratio) | | | | | | | | |
| | | EC | PC | DEC | FEC | DFEC | DFDMC | VC | (mol/kg) | |
| Example 12-4 | | 10 | 10 | 70 | 10 | — | — | — | — | 81 |
| Example 12-5 | | 10 | — | 70 | — | 20 | — | — | — | 90 |
| Example 12-6 | | 10 | 10 | 70 | — | 10 | — | — | — | 87 |
| Example 12-7 | | 5 | 20 | 50 | 15 | 10 | — | — | — | 89 |
| Example 12-8 | | — | — | 65 | 30 | — | 5 | — | — | 87 |
| Example 12-9 | | 10 | 19 | 70 | — | — | — | 1 | — | 59 |
| Example 12-10 | | 10 | 10 | 70 | — | — | — | 10 | — | 62 |
| Example 12-11 | Formula (2-2) | 30 | — | 70 | — | — | — | — | — | 58 |
| Example 12-12 | — | 30 | — | 70 | — | — | — | — | LiPF$_6$: 1 | 25 |
| Example 12-13 | | — | — | 70 | 30 | — | — | — | — | 62 |
| Example 12-14 | | 10 | — | 70 | — | 20 | — | — | — | 63 |
| Example 12-15 | CH$_3$SO$_3$Li | — | — | 70 | 30 | — | — | — | — | 62 |

As illustrated in Table 12, in the case where silicon was used as an anode active material and the anode active material layer 52B was formed by using vapor-phase deposition method (electron beam evaporation method), in Examples 12-1 to 12-11 in which the anode coat 52C containing the compound shown in Formula (2-1) or the compound shown in Formula (2-2) was formed, the discharge capacity retention ratio was higher than that of Examples 12-12 to 12-14 in which the anode coat 52C containing the compound shown in Formula (2-1) or the compound shown in Formula (2-2) was not formed. The result showed that in the case where the anode coat 52C was formed at the time of charge and discharge, lithium ions were easily inserted and extracted in the anode 52, and the electrolytic solution was hardly decomposed. In other words, it is regarded that chemical stability of the anode 52 was improved by forming the anode coat 52C.

More specifically, in Examples 12-1 to 12-10 in which the compound shown in Formula (2-1) was used as the nitrile compound, the discharge capacity retention ratio was higher than that of Examples 12-12 to 12-14 in which the compound shown in Formula (2-1) was not used as the nitrile compound not depending on the solvent composition. Further, in Example 12-11 in which the compound shown in Formula (2-2) was used as the nitrile compound, the discharge capacity retention ratio was higher than that of Example 12-12 in which the compound shown in Formula (12-12) was not used as the nitrile compound, and the discharge capacity retention ratio equal to that of Example 12-1 in which the compound shown in Formula (2-1) was used.

In this case, in Examples 12-2 to 12-10 in which PC or the like was added as a solvent, the discharge capacity retention ratio was higher than that of Example 12-1 in which PC or the like was not added as a solvent. More specifically, there was a tendency that the discharge capacity retention ratio was higher in the case where PC was added, and that the discharge capacity retention ratio was still higher in the case where VC, FEC, DFEC, or DFDMC was added as a solvent. Specially, the discharge capacity retention ratio was particularly higher in the case where FEC, DFEC, or DFDMC was added. In this case, if a solvent in which the number of fluorine was 2 (DFEC or DFDMC) was used, the discharge capacity retention ratio was still higher than that of a case in which the number of fluorine was 1. Further, there was a tendency that the discharge capacity retention ratio was increased as the content of the solvent containing fluorine such as FEC in the solvent was increased. The foregoing tendency was similar in the case of adding VC, and there was a tendency that the discharge capacity retention ratio was increased as the content in the solvent was increased.

Further, in Examples 12-15 in which the anode coat containing methanesulfonic lithium as a compound not containing a nitrile group was formed, it is needless to say that the discharge capacity retention ratio was lower than that of Example 12-3 in which the anode coat 52C containing the compound shown in Formula (2-1) was formed, and in addition, the discharge capacity retention ratio was equal to that of Example 12-13 in which the anode coat was not formed. In other words, it was found that the structure shown in Formula (2) having both the sulfonic ion group or the carbonic ion group and the nitrile group largely contributed to improvement of chemical stability of the anode 52.

Accordingly, it was confirmed that in the secondary battery of the present invention, in the case where silicon was used as an anode active material, and the anode active material layer 52B was formed by using vapor-phase deposition method (electron beam evaporation method), the cycle characteristics were improved by providing the anode coat 52C containing the nitrile compound shown in Formula (2) on the anode active material layer 52B. It was also confirmed that in this case, the cycle characteristics were more improved by using at least one of the chain ester carbonate having a halogen shown in Formula (4) and the cyclic ester carbonate having a halogen shown in Formula (5), or at least one of the cyclic ester carbonates having an unsaturated carbon bond shown in Formula (6) to Formula (8) was used.

Examples 13-1 to 13-7

A procedure was executed in the same manner as that of Examples 12-1 and 12-3, except that the electrolytic solution composition was changed as illustrated in Table 13. Specifically, in Examples 13-1 to 13-3, propene sultone (PRS) as sultone, succinic anhydride (SCAH) as an acid anhydride, or anhydro-2-sulfobenzoic acid (SBAH) as an acid anhydride was added as a solvent, and the content of PRS or the like in the solvent was 1 wt %. Further, lithium tetrafluoroborate (LiBF$_4$), the compound shown in Formula (9-6) as the compound shown in Formula (9), the compound shown in Formula (10-2) as the compound shown in Formula (10), or the compound shown in Formula (13-2) as the compound shown in Formula (13) was added as an electrolyte salt. The concentration of LiPF$_6$ in the electrolytic solution was 0.9 mol/kg, and the concentration of LiBF$_4$ or the like in the electrolytic solution was 0.1 mol/kg.

Example 13-8

A procedure was executed in the same manner as that of Example 13-1, except that the anode coat 52C was not formed and the solvent was mixed to obtain the composition illustrated in Table 13.

For the secondary batteries of Examples 13-1 to 13-8, the cycle characteristics were examined. The results shown in Table 13 were obtained.

TABLE 13

Battery structure: coin type
Cathode active material: LiCoO$_2$;
anode active material: Si (electron beam evaporation method)

| | Anode Anode coat | Solvent (weight ratio) | | | Others | Electrolyte salt | | Discharge capacity retention ratio |
|---|---|---|---|---|---|---|---|---|
| | | EC | DEC | FEC | (wt %) | (mol/kg) | | (%) |
| Example 12-1 | Formula (2-1) | 30 | 70 | — | — | LiPF$_6$: 1 | | 57 |
| Example 12-3 | | — | 70 | 30 | — | | | 84 |
| Example 13-1 | | — | 70 | 30 | PRS: 1 | | | 85 |
| Example 13-2 | | — | 70 | 30 | SCAH: 1 | | | 85 |
| Example 13-3 | | — | 70 | 30 | SBAH: 1 | | | 86 |
| Example 13-4 | | — | 70 | 30 | — | LiPF$_6$: 0.9 | LiBF$_4$: 0.1 | 85 |
| Example 13-5 | | 30 | 70 | — | — | LiPF$_6$: 0.9 | Formula (9-6): 0.1 | 62 |
| Example 13-6 | | 30 | 70 | — | — | LiPF$_6$: 0.9 | Formula (10-2): 0.1 | 63 |
| Example 13-7 | | — | 70 | 30 | — | LiPF$_6$: 0.9 | Formula (13-2): 0.1 | 85 |
| Example 12-12 | — | 30 | 70 | — | — | LiPF$_6$: 1 | | 25 |
| Example 12-13 | | — | 70 | 30 | — | | | 62 |
| Example 13-8 | | 30 | 70 | — | PRS: 1 | | | 23 |

As illustrated in Table 13, in the case where PRS or the like or LiBF$_4$ or the like was added to the electrolytic solution, results similar to the results of Table 12 were obtained. In other words, in Examples 13-1 to 13-7 in which the anode coat 52C containing the compound shown in Formula (2-1) was formed, the discharge capacity retention ratio was higher than that of Examples 12-12, 12-13, and 13-8 in which the anode coat 52C containing the compound shown in Formula (2-1) was not formed.

In this case, in Examples 13-1 to 13-7 in which PRS or the like or LiBF$_4$ or the like was added, the discharge capacity retention ratio was higher than that of Examples 12-1 and 12-3 in which PRS or the like or LiBF$_4$ or the like was not added. Meanwhile, in Example 13-8 in which PRS was added, the discharge capacity retention ratio was lower than that of Example 12-12 in which PRS was not contained.

Accordingly, it was confirmed that in the secondary battery of the present invention, in the case where in the anode 52, silicon was used as an anode active material, and the anode active material layer 52B was formed by using vapor-phase deposition method (electron beam evaporation method), the cycle characteristics were improved not depending on the electrolytic solution composition by providing the anode coat 52C containing the nitrile compound shown in Formula (2) on the anode active material layer 52B. It was also confirmed that in this case, the cycle characteristics were more improved by adding sultone or acid anhydride as a solvent to the electrolytic solution, or adding at least one of the compounds shown in Formula (9) to Formula (11) or at least one of the compounds shown in Formula (12) to Formula (14) as an electrolyte salt.

Example 14-1

A procedure was executed in the same manner as that of Example 12-3, except that sulfopropionic magnesium (SPHMg) as an alkali earth metal salt was contained in the anode coat 52C. In forming the anode coat 52C, SPHMg was dissolved in a 3 wt % aqueous solution in which the compound shown in Formula (2-1) was dissolved so that the content of SPHMg became 3 wt %.

Example 14-2

A procedure was executed in the same manner as that of Example 12-3, except that in forming the anode active material layer 52B, after a plurality of anode active material particles were formed, an oxide of silicon (SiO$_2$) as an oxide-containing film was precipitated on the surface of the anode active material particles by liquid-phase precipitation method. In forming the oxide-containing film, the anode current collector 52A on which the anode active material particles were formed was dipped in a solution obtained by dissolving boron as an anion scavenger into hydrofluosilic acid for 3 hours, the oxide of silicon was precipitated on the surface of the anode active material particles, and the resultant was subsequently washed with water and dried under reduced pressure.

Example 14-3

A procedure was executed in the same manner as that of Example 12-3, except that in forming the anode active material layer 52B, after a plurality of anode active material particles were formed, a cobalt plating film was grown as a metal material by electrolytic plating method. In forming the metal material, a current was applied while supplying air to a plating bath, and therefore cobalt was deposited on the surface of the anode current collector 52A. At this time, a cobalt plating solution (Japan Pure Chemical Co., Ltd. make) was used as a plating solution, the current density was from $2 \text{ A/dm}^2$ to $5 \text{ A/dm}^2$ both inclusive, and the plating rate was 10 nm/sec.

Example 14-4

A procedure was executed in the same manner as that of Example 12-3, except that in forming the anode active material layer 52B, after a plurality of anode active material particles were formed, an oxide-containing film and a metal material were formed in this order by the procedure of Examples 14-2 and 14-3.

Examples 14-5 to 14-7

A procedure was executed in the same manner as that of Examples 14-2 to 14-4, except that the anode coat 52C was not formed.

For the secondary batteries of Examples 14-1 to 14-7, the cycle characteristics were examined. The results shown in Table 14 were obtained.

As illustrated in Table 14, even if the alkali earth metal salt was contained in the anode coat 52C or even if the oxide-containing film or the metal material was formed before the anode coat 52C was formed, results similar to those of Table 12 were obtained. In other words, in Examples 14-1 to 14-4 in which the anode coat 52C containing the compound shown in Formula (2-1) was formed, the discharge capacity retention ratio was higher than that of Examples 12-13 and 14-5 to 14-7 in which the anode coat 52C containing the compound shown in Formula (2-1) was not formed.

In this case, in Example 14-1 in which SPHMg was added to the anode coat 52C, the discharge capacity retention ratio was higher than that of Example 12-3 in which SPHMg was not added to the anode coat 52C. Further, in Examples 14-2 to 14-4 in which the oxide-containing film or the metal material was formed, the discharge capacity retention ratio was higher than that of Example 12-3 in which the oxide-containing film or the metal material was not formed. In this case, based on comparison between Examples 14-2 to 14-4, there was a tendency that in the case of forming both of the oxide-containing film and the metal material, the discharge capacity retention ratio was higher than that of the case of forming only one of the oxide-containing film and the metal material. Further, in Examples 14-1 to 14-4, in the case where the oxide-containing film and the metal material were formed, the discharge capacity retention ratio was higher than that of the case that the alkali earth metal salt was contained in the anode coat 52C.

Accordingly, it was confirmed that in the secondary battery of the present invention, in the case where the anode 52 contained silicon (electron beam evaporation method) as an anode active material, the cycle characteristics were improved not depending on the structure of the anode active material layer 52B or the composition of the anode coat 52C by providing the anode coat 52C containing the nitrile compound shown in Formula (2) on the anode active material layer 52B. It was also confirmed that in this case, the cycle characteristics were more improved in the case where the alkali metal salt or the alkali earth metal salt was contained in the anode coat 52C, or the oxide-containing film or the metal material was formed before forming the anode coat 52C. In particular, the cycle characteristics were more improved with the use of the oxide-containing film or the metal material than with the use of the alkali metal salt or the alkali earth metal salt. It was confirmed that in the case where the oxide-containing film or the metal material was used, the cycle characteristics were more improved with the use of both the oxide-containing film and the metal material than with the use of one of the oxide-containing film and the metal material.

TABLE 14

Battery structure: coin type
Cathode active material: $LiCoO_2$;
anode active material: Si (electron beam evaporation method)

| | Anode | | | Electric solution | | Discharge capacity retention ratio (%) |
| --- | --- | --- | --- | --- | --- | --- |
| | Oxide-containing film | Metal material | Anode coat | Solvent (weight ratio) DEC | FEC | Electrolyte salt (mol/kg) |
| Example 12-3 | — | — | Formula (2-1) | 70 | 30 | $LiPF_6$: 1 | 84 |
| Example 14-1 | — | — | Formula (2-1) + SPHMg | 70 | 30 | | 88 |
| Example 14-2 | $SiO_2$ | — | Formula (2-1) | 70 | 30 | | 93 |
| Example 14-3 | — | Co | | 70 | 30 | | 93 |
| Example 14-4 | $SiO_2$ | Co | | 70 | 30 | | 95 |
| Example 12-13 | — | — | — | 70 | 30 | $LiPF_6$: 1 | 62 |
| Example 14-5 | $SiO_2$ | — | | 70 | 30 | | 90 |
| Example 14-6 | — | Co | | 70 | 30 | | 90 |
| Example 14-7 | $SiO_2$ | Co | | 70 | 30 | | 92 |

Example 15-1

A procedure was executed in the same manner as that of Example 12-1, except that the cathode coat 51C was formed on the cathode active material layer 51B instead of forming the anode coat 52C. In forming the cathode coat 51C, the aqueous solution used at the time of forming the anode coat 52C was prepared, the cathode current collector 51A on which the cathode active material layer 51B was formed was dipped in the aqueous solution for several seconds, was taken out, and was subsequently dried at 150 degrees C. in reduced pressure atmosphere.

Example 15-2

A procedure was executed in the same manner as that of Example 12-7, except that the cathode coat 51C was formed on the cathode active material layer 51B in addition to forming the anode coat 52C. A procedure of forming the cathode coat 51C was similar to that of Example 15-1.

Example 15-3

A procedure was executed in the same manner as that of Example 12-1, except that the compound shown in Formula (2-1) was dissolved in the electrolytic solution until saturation instead of forming the anode coat 52C.

Example 15-4

A procedure was executed in the same manner as that of Example 12-13, except that acetonitrile ($CH_3CN$) was added as a solvent so that the content thereof in the solvent became 5 wt %.

For the secondary batteries of Examples 15-1 to 15-4, the cycle characteristics were examined. The results shown in Table 15 were obtained.

pound shown in Formula (2-1) was formed, the discharge capacity retention ratio was higher than that of Example 12-7 in which only the anode coat 52C was formed. Further, in Example 15-3 in which the compound shown in Formula (2-1) was added to the electrolytic solution, the discharge capacity retention ratio was higher than that of Example 12-12 in which the compound shown in Formula (2-1) was not added to the electrolytic solution. In this case, based on comparison between Examples 12-1, 15-1, and 15-3, there was a tendency that in the case where only one of the cathode 51, the anode 52, and the electrolytic solution contains the compound shown in Formula (2-1), higher discharge capacity retention ratio was able to be obtained with the use of the electrodes (the cathode 51 and the anode 52) than with the use of the electrolytic solution, and higher discharge capacity retention ratio was able to be obtained with the use of the anode 52 than with the use of the cathode 51 out of the electrodes. The result showed that in the case where one of the cathode 51, the anode 52, and the electrolytic solution contains the nitrile compound shown in Formula (2), chemical stability of the component that contained the nitrile compound was improved, and decomposition inhibition effect of the electrolytic solution was obtained. Further, the result showed that in the case where given two of the cathode 51, the anode 52, and the electrolytic solution contained the nitrile compound shown in Formula (2), if both electrodes contained the nitrile compound shown in Formula (2), higher decomposition inhibition effect was able to be obtained than in the case that one out of both electrodes contained the nitrile compound shown in Formula (2).

Further, in Examples 15-4 in which acetonitrile as a nitrile compound not containing a sulfonic ion group and a carboxylic ion group was added to the electrolytic solution, it is needless to say that the discharge capacity retention ratio was significantly lower than that of Example 12-3 in which the

TABLE 15

Battery structure: coin type
Cathode active material: $LiCoO_2$;
anode active material: Si (electron beam evaporation method)

| | Anode coat | Cathode coat | \multicolumn{5}{c|}{Solvent (weight ratio)} | Electrolyte salt (mol/kg) | Others | Discharge capacity retention ratio (%) |
|---|---|---|---|---|---|---|---|---|---|---|
| | | | EC | PC | DEC | FEC | DFEC | | | |
| Example 12-1 | Formula (2-1) | — | 30 | — | 70 | — | — | $LiPF_6$: 1 | — | 57 |
| Example 12-3 | | — | — | — | 70 | 30 | — | | — | 84 |
| Example 12-7 | | — | 5 | 20 | 50 | 15 | 10 | | — | 89 |
| Example 15-1 | — | Formula | 30 | — | 70 | — | — | | — | 30 |
| Example 15-2 | Formula (2-1) | (2-1) | 5 | 20 | 50 | 15 | 10 | | — | 90 |
| Example 15-3 | — | — | 30 | — | 70 | — | — | | Formula (2-1) | 28 |
| Example 12-12 | — | — | 30 | — | 70 | — | — | $LiPF_6$: 1 | — | 25 |
| Example 12-13 | | | — | — | 70 | 30 | — | | — | 62 |
| Example 15-4 | | | — | — | 70 | 30 | — | | $CH_3CN$ | 50 |

As illustrated in Table 15, in Example 15-1 in which the cathode coat 51C containing the compound shown in Formula (2-1) was formed, the discharge capacity retention ratio was higher than that of Example 12-12 in which the cathode coat 51C containing the compound shown in Formula (2-1) was not formed. Further, in Example 15-2 in which the cathode coat 51C and the anode coat 52C containing the comanode coat 52C containing the compound shown in Formula (2-1) was formed, and in addition, the discharge capacity retention ratio was significantly lower than that of Example 12-13 in which the nitrile compound was not contained. The result showed that in the case where the nitrile compound shown in Formula (2) had the nitrile group and the sulfonic ion group or the carboxylic ion group, chemical stability of the component that contained the same was improved, and decomposition inhibition effect of the electrolytic solution was demonstrated.

Accordingly, it was confirmed that in the secondary battery of the present invention, in the case where in the anode 52, silicon was used as an anode active material and the anode active material layer 52B was formed by using vapor-phase deposition method (electron beam evaporation method), the cycle characteristics were improved by providing the cathode coat 51C containing the nitrile compound shown in Formula (2) on the cathode active material layer 51B or containing the nitrile compound shown in Formula (2) in the electrolytic solution. In this case, it was confirmed that in the case where the cathode 51 contained the nitrile compound shown in Formula (2), higher effect was obtained than in the case that the electrolytic solution contained the nitrile compound shown in Formula (2). It was also confirmed that higher effect was obtained with the use of the anode 52 than with the use of the cathode 51. In particular, it was confirmed that in the case where both the cathode 51 and the anode 52 contained the nitrile compound shown in Formula (2), still higher effect was obtained.

Examples 16-1 to 16-14

A procedure was executed in the same manner as that of Examples 12-1 to 12-14, except that the anode active material layer 52B was formed by sintering method instead of vapor-phase deposition method (electron beam evaporation method) so that the thickness of the anode active material layer 52B became 10 μm. In forming the anode active material layer 52B by sintering method, an anode mixture in which 95 parts by mass of silicon as an anode active material (average particle diameter: 1 μm) and 5 parts by mass of polyimide as an anode binder were mixed was dispersed in N-methyl-2-pyrrolidone to obtain a paste cathode mixture slurry. The anode current collector 52A made of a roughened electrolytic copper foil (thickness: 18 μm) was uniformly coated with the anode mixture slurry by a bar coater, which was dried. Thereafter, the resultant was compression-molded by a roll pressing machine, and was heated for 12 hours at 400 degrees C. in the vacuum atmosphere. In this case, lithium metal was prevented from being precipitated on the anode 52 at the time of full charge by adjusting the thickness of the cathode active material layer 51B so that the charge and discharge capacity of the anode 52 became larger than the charge and discharge capacity of the cathode 51.

For the secondary batteries of Examples 16-1 to 16-14, the cycle characteristics were examined. The results shown in Table 16 were obtained.

TABLE 16

Battery structure: coin type
Cathode active material: $LiCoO_2$;
anode active material: Si (sintering method)

| | Anode coat | Electrolytic solution | | | | | | | Discharge capacity retention ratio (%) |
| | | Solvent (weight ratio) | | | | | | Electrolyte salt | |
| | | EC | PC | DEC | FEC | DFEC | DFDMC | VC | (mol/kg) | |
|---|---|---|---|---|---|---|---|---|---|---|
| Example 16-1 | Formula (2-1) | 30 | — | 70 | — | — | — | — | $LiPF_6$: 1 | 48 |
| Example 16-2 | | 10 | 20 | 70 | — | — | — | — | — | 49 |
| Example 16-3 | | — | — | 70 | 30 | — | — | — | — | 85 |
| Example 16-4 | | 10 | 10 | 70 | 10 | — | — | — | — | 82 |
| Example 16-5 | | 10 | — | 70 | — | 20 | — | — | — | 86 |
| Example 16-6 | | 10 | 10 | 70 | — | 10 | — | — | — | 86 |
| Example 16-7 | | 5 | 20 | 50 | 15 | 10 | — | — | — | 88 |
| Example 16-8 | | — | — | 65 | 30 | — | 5 | — | — | 87 |
| Example 16-9 | | 10 | 19 | 70 | — | — | — | 1 | — | 50 |
| Example 16-10 | | 10 | 10 | 70 | — | — | — | 10 | — | 53 |
| Example 16-11 | Formula (2-2) | 30 | — | 70 | — | — | — | — | — | 48 |
| Example 16-12 | — | 30 | — | 70 | — | — | — | — | $LiPF_6$: 1 | 21 |
| Example 16-13 | | — | — | 70 | 30 | — | — | — | — | 80 |
| Example 16-14 | | 10 | — | 70 | — | 20 | — | — | — | 81 |

As illustrated in Table 16, in the case where silicon was used as an anode active material, and the anode active material layer 52B was formed by using sintering method, the results similar to the results of Table 12 were obtained as well. In other words, in Examples 16-1 to 16-11 in which the anode coat 52C containing the compound shown in Formula (2-1) or the compound shown in Formula (2-2) was formed, the discharge capacity retention ratio was higher than that of Examples 16-12 to 16-14 in which the anode coat 52C containing the compound shown in Formula (2-1) or the compound shown in Formula (2-2) was not formed. Further, in Examples 16-2 to 16-10 in which PC or the like was added as a solvent, the discharge capacity retention ratio was higher than that of Example 16-1 in which PC or the like was not added as a solvent.

Accordingly, in the secondary battery of the present invention, it was confirmed that in the case where silicon was used as an anode active material and the anode active material layer 52B was formed by using sintering method, the cycle characteristics were improved by providing the anode coat 52C containing the nitrile compound shown in Formula (2) on the anode active material layer 52B not depending on the solvent composition and the type of the nitrile compound shown in Formula (2).

Examples 17-1 to 17-8

A procedure was executed in the same manner as that of Examples 13-1 to 13-8, except that the anode active material layer 52B was formed by using sintering method as in Examples 16-1 to 16-14.

The cycle characteristics of the secondary batteries of Examples 17-1 to 17-8 were examined. The results shown in Table 17 were obtained.

TABLE 17

Battery structure: coin type
Cathode active material: LiCoO$_2$; anode active material: Si (sintering method)

| | Anode Anode coat | Solvent (weight ratio) EC | DEC | FEC | Others (wt %) | Electrolyte salt (mol/kg) | Discharge capacity retention ratio (%) |
|---|---|---|---|---|---|---|---|
| Example 16-1 | Formula (2-1) | 30 | 70 | — | — | LiPF$_6$: 1 | 48 |
| Example 16-3 | (2-1) | — | 70 | 30 | — | | 85 |
| Example 17-1 | | — | 70 | 30 | PRS: 1 | | 86 |
| Example 17-2 | | — | 70 | 30 | SCAH: 1 | | 86 |
| Example 17-3 | | — | 70 | 30 | SBAH: 1 | | 86 |
| Example 17-4 | | — | 70 | 30 | — | LiPF$_6$: 0.9  LiBF$_4$: 0.1 | 86 |
| Example 17-5 | | 30 | 70 | — | — | LiPF$_6$: 0.9  Formula (9-6): 0.1 | 58 |
| Example 17-6 | | 30 | 70 | — | — | LiPF$_6$: 0.9  Formula (10-2): 0.1 | 59 |
| Example 17-7 | | — | 70 | 30 | — | LiPF$_6$: 0.9  Formula (13-2): 0.1 | 86 |
| Example 16-12 | — | 30 | 70 | — | — | LiPF$_6$: 1 | 21 |
| Example 16-13 | | — | 70 | 30 | — | | 80 |
| Example 17-8 | | 30 | 70 | — | PRS: 1 | | 21 |

As illustrated in Table 17, in the case where the anode active material layer 52B was formed by sintering method, results similar to the results of Table 13 were obtained. In other words, in Examples 17-1 to 17-7 in which the anode coat 52C containing the compound shown in Formula (2-1) was formed, the discharge capacity retention ratio was higher than that of Examples 16-12, 16-13, and 17-8 in which the anode coat 52C containing the compound shown in Formula (2-1) was not formed. In this case, in Examples 17-1 to 17-7 in which PRS or the like or LiBF$_4$ or the like was added, the discharge capacity retention ratio was higher than that of Examples 16-1 and 16-3 in which PRS or the like or LiBF$_4$ or the like was not added. Meanwhile, in Example 17-8 in which PRS was added, the discharge capacity retention ratio was equal to that of Example 16-12 in which PRS was not contained.

Accordingly, it was confirmed that in the secondary battery of the present invention, in the case where silicon was used as an anode active material, and the anode active material layer 52B was formed by using sintering method, the cycle characteristics were improved by providing the anode coat 52C containing the nitrile compound shown in Formula (2) on the anode active material layer 52B not depending on the electrolytic solution composition.

Example 18

A procedure was executed in the same manner as that of Example 14-1, except that the anode active material layer 52B was formed by using sintering method in the same manner as that of Examples 16-1 to 16-14.

The cycle characteristics of the secondary battery of Example 18 were examined. The result shown in Table 18 was obtained.

TABLE 18

Battery structure: coin type
Cathode active material: LiCoO$_2$;
anode active material: Si (sintering method)

| Anode Anode coat | Solvent (weight ratio) DEC | FEC | Electrolyte salt (mol/kg) | Discharge capacity retention ratio (%) |
|---|---|---|---|---|
| Example 16-3 | Formula (2-1) | 70 | 30 | LiPF$_6$: 1 | 85 |
| Example 18 | Formula (2-1) + SPHMg | 70 | 30 | | 88 |

As illustrated in Table 18, in the case where the anode active material layer 52B was formed by sintering method, results similar to the results illustrated in Table 14 were obtained. In other words, in the case where the anode coat 52C containing the compound shown in Formula (2-1) was formed, in Example 18 in which SPHMg was contained in the anode coat 52C, the discharge capacity retention ratio was higher than that of Example 16-3 in which SPHMg was not contained in the anode coat 52C.

Accordingly, it was confirmed that in the secondary battery of the present invention, in the case where silicon was used as an anode active material, and the anode active material layer 52B was formed by using sintering method, the cycle characteristics were improved by providing the anode coat 52C containing the nitrile compound shown in Formula (2) on the anode active material layer 52B not depending on the composition of the anode coat 52. It was also confirmed that in this case, the cycle characteristics were more improved by containing the alkali metal salt or the like into the anode coat 52C.

Example 19-1

A procedure was executed in the same manner as that of Examples 12-1 to 12-10, except that an SnCoC-containing material was used instead of silicon as an anode active material, the anode active material layer 52B was formed by coating method, and the solvent composition in the electrolytic solution was changed as illustrated in Table 19.

In forming the anode active material, first, tin powder and cobalt powder were alloyed to obtain tin-cobalt alloy powder. Thereafter, the resultant was added with carbon powder and dry-mixed. Subsequently, 20 g of the foregoing mixture and about 400 g of a corundum being 9 mm in diameter were set in a reaction container of a planetary ball mill (Ito Seisakusho Co., Ltd. make). Subsequently, inside of the reaction container was substituted with argon (Ar) atmosphere. Thereafter, 10-minute operation at 250 rpm and 10-minute break were repeated until the total operation time reached 50 hours. Finally, after the reaction container was cooled down to room temperature, the synthesized anode active material powder was taken out. Thereafter, the resultant was screened through a 280 mesh sieve to remove coarse grain. The composition of the obtained SnCoC-containing material was analyzed. The tin content was 48 wt %, the cobalt content was 23 wt %, the carbon content was 20 wt %, and the ratio of cobalt to the total of tin and cobalt (Co/(Sn+Co)) was 32 wt %. In analyzing the composition of the SnCoC-containing material, a carbon sulfur analysis equipment was used for the carbon content, and Inductively Coupled Plasma (ICP) emission analysis was used for the tin content and the cobalt content. Further, the obtained SnCoC-containing material was analyzed by X-ray diffraction method. A diffraction peak having a half bandwidth with the diffraction angle $2\theta$ of 1.0 degree or more was observed in the range of $2\theta=20$ to 50 degrees. Further, when the SnCoC-containing material was analyzed by XPS, peak P1 was obtained as the SnCoC-containing material used in Example 8-1 as illustrated in FIG. 20. When the peak P1 was analyzed, peak P2 of the surface contamination carbon and peak P3 of C1s in the SnCoC-containing material existing on the lower energy side were obtained. Peak P3 was obtained in a region lower than 284.5 eV. In other words, it was confirmed that carbon in the SnCoC-containing material was bonded with other element.

In forming the anode active material layer 52B, first, 80 parts by mass of the SnCoC-containing material powder as an anode active material, 11 parts by mass of graphite and 1 part by mass of acetylene black as an anode electrical conductor, 8 parts by mass of polyvinylidene fluoride as an anode binder were mixed to obtain an anode mixture. Thereafter, the anode mixture was dispersed in N-methyl-2-pyrrolidone to obtain a paste anode mixture slurry. Subsequently, one face of the anode current collector 52A made of an electrolytic copper foil (thickness: 10 μm) was uniformly coated with the anode mixture slurry and the resultant was dried. Finally, the resultant was compression-molded by using a rolling press machine. In this case, the thickness of the cathode active material layer 51B was adjusted so that the charge and discharge capacity of the anode 52 was larger than the charge and discharge capacity of the cathode 51, and thereby lithium metal was prevented from being precipitated on the anode 52 at the time of full charge.

As a solvent, dimethyl carbonate (DMC) was used together with EC, PC, and FEC.

Example 8-2

A procedure was executed in the same manner as that of Example 19-1, except that the anode coat 52 was not formed.

For the secondary batteries of Examples 19-1 and 19-2, the cycle characteristics were examined. The results illustrated in Table 19 were obtained.

TABLE 19

Battery structure: coin type
Cathode active material: $LiCoO_2$;
anode active material: SnCoC-containing material
(coating method)

| | | Electrolytic solution | | | | Discharge capacity retention ratio (%) |
|---|---|---|---|---|---|---|
| | Anode coat | Solvent (weight ratio) | | | Electrolyte salt (mol/kg) | |
| | | EC | PC | DMC | FEC | |
| Example 19-1 | Formula (2-1) | 20 | 10 | 69 | 1 | $LiPF_6$: 1 | 91 |
| Example 19-2 | — | 20 | 10 | 69 | 1 | $LiPF_6$: 1 | 89 |

As illustrated in Table 19, in the case where the SnCoC-containing material was used as an anode active material, and the anode active material layer 52B was formed by using coating method, results similar to the results of Table 12 were obtained. In other words, in Example 19-1 in which the anode coat 52C containing the compound shown in Formula (2-1) was formed, the discharge capacity retention ratio was higher than that of Example 19-2 in which the anode coat 52C containing the compound shown in Formula (2-1) was not formed.

Accordingly, it was confirmed that in the secondary battery of the present invention, in the case where the SnCoC-containing material was used as an anode active material, and the anode active material layer 52B was formed by using coating method, if the anode coat 52C containing the nitrile compound shown in Formula (2) was formed on the anode active material layer 52B, the cycle characteristics were improved.

Example 20-1

A procedure was executed in the same manner as that of Example 19-1, except that artificial graphite was used instead of the SnCoC-containing material as an anode active material, and the anode active material layer 52B was formed by using coating method so that the thickness became 70 μm. In forming the anode 52, first, 97 parts by mass of artificial graphite powder as an anode active material and 3 parts by mass of polyvinylidene fluoride as an anode binder were mixed to obtain an anode mixture. Thereafter, the anode mixture was dispersed in N-methyl-2-pyrrolidone to obtain a paste anode mixture slurry. Subsequently, both faces of the anode current collector 52A made of a copper foil (thickness: 15 μm) were uniformly coated with the anode mixture slurry by a bar coater, which was dried, was compression-molded by using a roll pressing machine to form the anode active material layer 52B. Subsequently, 3 wt % aqueous solution of the compound shown in Formula (2-1) to which perfluorobutanesulfonic lithium as a surfactant was added so that the content thereof became 0.5 wt % was prepared. Finally, the anode current collector 52A on which the anode active material layer 52B was formed was dipped in the aqueous solution for several seconds, was taken out, and was subsequently dried at 150 degrees C. in reduced pressure atmosphere. Accordingly, the anode coat 52C was formed on the anode active material layer 52B. In this case, the thickness of the cathode active material layer 51B was adjusted so that the charge and discharge capacity of the anode 52 was larger than the charge and discharge capacity of the cathode 51, and therefore lithium metal was prevented from being precipitated on the anode 52 at the time of full charge.

Example 20-2

A procedure was executed in the same manner as that of Example 20-1, except that the anode coat 52C was not formed.

For the secondary batteries of Examples 20-1 and 20-2, the cycle characteristics were examined. The results illustrated in Table 20 were obtained.

TABLE 20

Battery structure: coin type
Cathode active material: $LiCoO_2$;
anode active material: Artificial graphite (coating method)

| | | Electrolytic solution | | | | Discharge capacity retention ratio |
|---|---|---|---|---|---|---|
| | Anode | Solvent (weight ratio) | | | Electrolyte salt | |
| Anode | coat | EC | PC | DMC | FEC | (mol/kg) | (%) |
| Example 20-1 | Formula (2-1) | 20 | 10 | 69 | 1 | $LiPF_6$: 1 | 93 |
| Example 20-2 | — | 20 | 10 | 69 | 1 | $LiPF_6$: 1 | 92 |

As illustrated in Table 20, in the case where the artificial graphite was used as an anode active material, and the anode active material layer 52B was formed by using coating method, results similar to the results of Table 12 were obtained. In other words, in Example 20-1 in which the anode coat 52C containing the compound shown in Formula (2-1) was formed, the discharge capacity retention ratio was higher than that of Example 20-2 in which the anode coat 52C containing the compound shown in Formula (2-1) was not formed.

Accordingly, it was confirmed that in the secondary battery of the present invention, in the case where the carbon material was used as an anode active material, and the anode active material layer 52B was formed by using coating method, if the anode coat 52C containing the nitrile compound shown in Formula (2) was provided on the anode active material layer 52B, the cycle characteristics were improved.

Example 21-1

A procedure was executed in the same manner as that of Example 12-3, except that $LiCo_{0.98}Al_{0.01}Mg_{0.01}O_2$ was used instead of $LiCoO_2$ as a cathode active material, and the cathode coat 51C was formed on the cathode active material layer 51B instead of forming the anode coat 52C on the anode active material layer 52B. A procedure of forming the cathode coat 51C was similar to that of Example 15-1.

Example 21-2

A procedure was executed in the same manner as that of Example 21-1, except that the particle coating film 212 was formed on the surface of the particulate cathode active material (cathode active material particles 211), instead of forming the cathode coat 51C on the cathode active material layer 51B. In forming the cathode 51, first, 100 parts by mass of $LiCo_{0.98}Al_{0.01}Mg_{0.01}O_2$ as a cathode active material and 1 part by mass of the compound shown in Formula (2-1) were put into 100 $cm^3$ pure water, which was mixed while being stirred for 1 hour. Subsequently, after moisture was removed from the mixture by using an evaporator, the resultant was dried for 12 hours at 120 degrees C. in an oven. Thereby, the particle coating film 212 containing the compound shown in Formula (2-1) was formed to cover the surface of the cathode active material particle 211. Subsequently, 91 parts by mass of the cathode active material particles 211 ($LiCo_{0.98}Al_{0.01}Mg_{0.01}O_2$) on which the particle coating film 212 was formed, 6 parts by mass of graphite as a cathode electrical conductor, 3 parts by mass of polyvinylidene fluoride as a cathode binder were mixed to obtain a cathode mixture. Thereafter, the cathode mixture was dispersed in N-methyl-2-pyrrolidone to obtain a paste cathode mixture slurry. Subsequently, one face of the cathode current collector 51A made of a strip-shaped aluminum foil (thickness: 12 μm) was uniformly coated with the cathode mixture slurry by using a bar coater, which was dried. Finally, the resultant was compression-molded by using a roll pressing machine to form the cathode active material layer 51B.

Example 21-3

A procedure was executed in the same manner as that of Examples 21-1 and 21-2, except that the cathode coat 51 or the particle coating film 212 was not formed.

For the secondary batteries of Examples 21-1 to 21-3, the cycle characteristics were examined and the resistance characteristics were examined in the same manner as that of Examples 10-1 to 10-3. The results illustrated in Table 21 were obtained.

TABLE 21

Battery structure: coin type
Cathode active material: $LiCo_{0.98}Al_{0.01}Mg_{0.01}O_2$;
anode active material: Si (electron beam evaporation method)

| Cathode | | | Electrolytic solution | | | Discharge capacity retention ratio | Reaction resistance |
|---|---|---|---|---|---|---|---|
| | Particle | | Solvent (weight ratio) | | Electrolyte | | |
| Cathode coat | coating film | | DEC | FEC | salt (mol/kg) | (%) | (Ω) |
| Example 21-1 | Formula (2-1) | — | 70 | 30 | $LiPF_6$: 1 | 65 | 16 |
| Example 21-2 | — | Formula (2-1) | 70 | 30 | | 63 | 13 |
| Example 21-3 | — | — | 70 | 30 | $LiPF_6$: 1 | 62 | 23 |

As illustrated in Table 21, in the case where $LiCo_{0.98}Al_{0.01}Mg_{0.01}O_2$ was used as a cathode active material, and the cathode coat 51C or the particle coating film 212 containing the compound shown in Formula (2-1) was formed, results similar to the results of Table 15 were obtained. In other words, in Examples 21-1 and 21-2 in which the cathode coat 51C or the particle coating film 212 containing the compound shown in Formula (2-1) was formed, the discharge capacity retention ratio was higher than that of Example 21-3 in which the cathode coat 51C or the particle coating film 212 containing the compound shown in Formula (2-1) was not formed.

In this case, in Example 21-1 in which the cathode coat 51C was formed, the discharge capacity retention ratio was higher than that of Example 21-2 in which the particle coating film 212 was formed. The result showed that the cathode coat 51C was more advantageous than the particle coating film 212 to increase the discharge capacity retention ratio.

Further, in Examples 21-1 and 21-2 in which the cathode coat 51C or the particle coating film 212 was formed, the reaction resistance was lower than that of Example 21-3 in which the cathode coat 51C or the particle coating film 212 was not formed. The result showed that increase of resistance component in the anode 52 was inhibited. In other words, adhesion of decomposed matter to the anode 52 was inhibited by providing the cathode coat 51C or the particle coating film 212.

In this case, in Example 21-1, the reaction resistance was higher than that of Example 21-2. The result showed that the particle coating film 212 was more advantageous than the cathode coat 51C to decrease reaction resistance.

Accordingly, it was confirmed that in the secondary battery of the present invention, in the case where the cathode coat 51C or the particle coating film 212 containing the nitrile compound shown in Formula (2) was provided, the cycle characteristics were improved and reaction resistance characteristics were improved.

In the foregoing Table 12 to Table 21, as the nitrile compound shown in Formula (2), only the results in the case that the compound shown in Formula (2-1) or the like was used are shown, but results in the case that the compounds other than the compound shown in Formula (2-1) (for example, the compound shown in Formula (2-3) or the like) was used are not shown. However, since the compound shown in Formula (2-3) or the like plays a function similar to that of the compound shown in Formula (2-1) or the like, result similar to that in the case of using the compound shown in Formula (2-1) or the like is able to be obtained as well if the compound shown in Formula (2-3) or the like is used or a plurality of the foregoing compounds are used by mixture.

The foregoing description for the nitrile compound shown in Formula (2) is similarly applied to the chain ester carbonate having a halogen shown in Formula (4) as an element, the cyclic ester carbonate having a halogen shown in Formula (5) as an element, the cyclic ester carbonates having an unsaturated carbon bond shown in Formula (6) to Formula (8), or the compounds shown in Formula (9) to Formula (14). In other words, in the case where a compound corresponding to the chain ester carbonate or the like having a halogen shown in Formula (4) as an element is used as a solvent or an electrolyte salt, result similar to that of the case using the compounds practically used in Table 12 to Table 21 is obtained even if the foregoing corresponding compound is not a compound practically used in Table 12 to Table 21.

From the foregoing results of Table 12 to Table 21, in the secondary battery of the present invention, in the case where at least one of the cathode, the anode, and the electrolyte contained the nitrile compound shown in Formula (2), the cycle characteristics were able to be improved not depending on the electrolyte composition, the type of the anode active material and the cathode active material, the method of forming the cathode active material layer and the anode active material layer or the like. In this case, in particular, in the case where the anode contained the nitrile compound shown in Formula (2), the characteristics were able to be more improved.

Further, in the case that a high capacity material such as silicon and a tin-cobalt alloy was used as an anode active material, increase ratio of the discharge capacity retention ratio was higher than that of the case using a carbon material such as artificial graphite. In other words, in the case that a material having at least one of silicon and tin as an element was used as an anode active material, higher effect was able to be obtained. It is regarded that the result showed that in the case where the high capacity material was used as an anode active material, the electrolyte was more easily decomposed than the case of using the carbon material, and thus electrolyte decomposition inhibition effect was significantly demonstrated.

Examples 22-1 to 22-10

Next, the coin type secondary battery illustrated in FIG. 10 was fabricated by using the compound shown in Formula (3) instead of the nitrile compound shown in Formula (2) by the following procedure. At this time, the secondary battery was fabricated as a lithium ion secondary battery in which the capacity of the anode 52 was expressed based on insertion and extraction of lithium.

First, the cathode 51 was formed. First, lithium carbonate ($Li_2CO_3$) and cobalt carbonate ($CoCO_3$) were mixed at a molar ratio of 0.5:1. Thereafter, the mixture was fired in the air at 900 degrees C. for 5 hours. Thereby, lithium cobalt composite oxide ($LiCoO_2$) was obtained. Subsequently, 91 parts by mass of the lithium cobalt composite oxide as a cathode active material, 6 parts by mass of graphite as an electrical conductor, and 3 parts by mass of polyvinylidene fluoride as a binder were mixed to obtain a cathode mixture. Thereafter, the cathode mixture was dispersed in N-methyl-2-pyrrolidone to obtain a paste cathode mixture slurry. Subsequently, the cathode current collector 51A made of a strip-shaped aluminum foil (thickness: 12 μm) was uniformly coated with the cathode mixture slurry by a bar coater, which was dried. Thereafter, the resultant was compression-molded by a roll pressing machine to form the cathode active material layer 51B. Finally, the cathode current collector 51A on which the cathode active material layer 51B was formed was punched out into a pellet having a diameter of 15.5 mm.

Next, the anode 52 was formed. First, the anode current collector 52A made of a roughened electrolytic copper foil (thickness: 10 μm) was prepared. Thereafter, silicon as an anode active material was deposited on the anode current collector 52A to form a plurality of anode active material particles by electron beam evaporation method, and thereby the anode active material layer 52B was formed. The thickness of the anode active material layer 52B formed on the anode current collector 52A was 5 μm. Subsequently, as a solution containing the compound shown in Formula (3), 3 wt % aqueous solution of the compound shown in Formula (3A-1) as the compound shown in Formula (3A) was prepared. Subsequently, the anode current collector 52A on which the anode active material layer 52B was formed was dipped in the solution for several seconds, was taken out, and was subsequently dried at 60 degrees C. in reduced pressure atmosphere. Thereby, the anode coat 52C was formed on the anode active material layer 52B. Finally, the anode current collector 52A on which the anode coat 52C and the anode active material layer 52B were formed was punched out into a pellet having a diameter of 16 mm.

Next, an electrolytic solution was prepared. Specifically, lithium hexafluorophosphate ($LiPF_6$) as an electrolyte salt was dissolved in a solvent obtained by mixing at least one of ethylene carbonate (EC), propylene carbonate (PC), 4-fluoro-1,3-dioxolane-2-one (FEC), 4,5-difluoro-1,3-dioxolane-2-one (DFEC), bis carbonate (fluoromethyl) (DFDMC), and vinylene carbonate (VC) and diethyl carbonate (DEC) as a solvent to obtain the compositions illustrated in Table 22. In this case, the concentration of lithium hexafluorophosphate in the electrolytic solution was 1 mol/kg.

Finally, the secondary battery was assembled by using the cathode 51, the anode 52, and the electrolytic solution. First, the cathode 51, the anode 52, and the separator 53 made of a microporous polypropylene film were layered so that the cathode active material layer 51B and the anode active material layer 52B were opposed to each other with the separator 53 in between, and the resultant laminated body was subsequently contained in the package can 54. Thereafter, the electrolytic solution was injected therein. The package cup 55 was laid on the package can 54, the package cup 55 and the package can 54 were caulked with a gasket 56, and thereby the coin type secondary battery was completed.

Examples 22-11 and 22-12

A procedure similar to that of Example 22-3 was executed, except that the compound shown in Formula (3A-14) (Example 22-11) or the compound shown in Formula (3A-27) (Example 22-12) was used as the compound shown in Formula (3) instead of the compound shown in Formula (3A-1).

Examples 22-13 to 22-15

A procedure similar to that of Examples 22-1, 22-3, and 22-5 was executed, except that the anode coat 52C was not formed.

Example 22-16

A procedure similar to that of Example 22-3 was executed, except that benzene sulfonic lithium shown in Formula (15) was used instead of the compound shown in Formula (3A-1).

For the secondary batteries of Examples 22-1 to 22-16, the cycle characteristics were examined. The results illustrated in Table 22 were obtained.

As illustrated in Table 22, in Example 22-1 in which the anode coat 52C containing the compound shown in Formula (3A-1) was formed, the discharge capacity retention ratio was higher than that of Example 22-13 in which the anode coat 52C containing the compound shown in Formula (3A-1) was not formed. The result showed that in the case where the anode coat 52C containing the compound shown in Formula (3A-1) was formed, lithium ions were easily inserted and extracted in the anode 52, and the electrolytic solution was hardly decomposed even after repetition of charge and discharge. In other words, it is regarded that chemical stability of the anode 52 was improved by forming the anode coat 52C containing the compound shown in Formula (3A-1).

Accordingly, it was confirmed that in the secondary battery of the present invention, in the case where the anode 52 contained silicon as an anode active material (electron beam evaporation method), the cycle characteristics were improved by providing the anode coat 52C containing the compound shown in Formula (3) on the anode active material layer 52B.

Further, in Examples 22-2 to 22-10 in which PC or the like was added as a solvent, the discharge capacity retention ratio was higher than that of Example 22-1 in which PC or the like was not contained as a solvent. In this case, again, in Examples 22-3 and 22-5 in which the anode coat 52C was formed, the discharge capacity retention ratio was higher than that of Examples 22-14 and 22-15 in which the anode coat 52C was not formed. Focusing attention on the solvent type, there was a tendency that the discharge capacity retention ratio was higher in the case where PC was contained, and the discharge capacity retention ratio was still higher in the case where VC, FEC, DFEC, or DFDMC was added. Specially, the discharge capacity retention ratio was particularly higher in the case where FEC, DFEC, or DFDMC was contained. In this case, if a solvent in which the number of fluorine was 2

TABLE 22

Battery structure: coin type
Cathode active material: $LiCoO_2$;
anode active material: Si (electron beam evaporation method)

| | Anode coat | Electrolytic solution | | | | | | | Discharge capacity retention ratio (%) |
|---|---|---|---|---|---|---|---|---|---|
| | | Solvent (weight ratio) | | | | | | Electrolyte salt (mol/kg) | |
| | | EC | PC | DEC | FEC | DFEC | DFDMC | VC | | |
| Example 22-1 | Formula (3A-1) | 30 | — | 70 | — | — | — | — | $LiPF_6$: 1 | 55 |
| Example 22-2 | | 10 | 20 | 70 | — | — | — | — | | 57 |
| Example 21-3 | | — | — | 70 | 30 | — | — | — | | 82 |
| Example 22-4 | | 10 | 10 | 70 | 10 | — | — | — | | 78 |
| Example 22-5 | | 10 | — | 70 | — | 20 | — | — | | 87 |
| Example 22-6 | | 10 | 10 | 70 | — | 10 | — | — | | 85 |
| Example 22-7 | | 5 | 20 | 50 | 15 | 10 | — | — | | 87 |
| Example 22-8 | | — | — | 65 | 30 | — | 5 | — | | 85 |
| Example 22-9 | | 10 | 19 | 70 | — | — | — | 1 | | 58 |
| Example 22-10 | | 10 | 10 | 70 | — | — | — | 10 | | 60 |
| Example 22-11 | Formula (3A-14) | — | — | 70 | 30 | — | — | — | | 73 |
| Example 22-12 | Formula (3A-27) | — | — | 70 | 30 | — | — | — | | 65 |
| Example 22-13 | — | 30 | — | 70 | — | — | — | — | $LiPF_6$: 1 | 25 |
| Example 22-14 | | — | — | 70 | 30 | — | — | — | | 62 |
| Example 22-15 | | 10 | — | 70 | — | 20 | — | — | | 63 |
| Example 22-16 | Formula (15) | — | — | 70 | 30 | — | — | — | | 60 |

(DFEC or DFDMC) was used, the discharge capacity retention ratio was still higher than that of a case in which the number of fluorine was 1. Further, there was a tendency that the discharge capacity retention ratio was increased as the content of the solvent containing fluorine such as FEC in the solvent was increased.

Only the result in the case of using the cyclic ester carbonates having an unsaturated carbon bond shown in Formula (6) was used is shown, but results in the case of using the cyclic ester carbonates having an unsaturated carbon bond shown in Formula (7) or Formula (8) are not shown. However, since the cyclic ester carbonates having an unsaturated carbon bond shown in Formula (7) or the like plays a function to inhibit decomposition of the electrolytic solution as the cyclic ester carbonates having an unsaturated carbon bond shown in Formula (6) does, result similar to that in the case of using the cyclic ester carbonates having an unsaturated carbon bond shown in Formula (6) is evidently able to be obtained as well if the cyclic ester carbonates having an unsaturated carbon bond shown in Formula (7) is used.

Accordingly, it was confirmed that in the secondary battery of the present invention, the cycle characteristics were improved by providing the anode coat 52C containing the compound shown in Formula (3) on the anode active material layer 52B not depending on the solvent composition in the electrolytic solution. It was also confirmed that in this case, the cycle characteristics were more improved by using at least one of the chain ester carbonate having a halogen shown in Formula (4) and the cyclic ester carbonate having a halogen shown in Formula (5), or at least one of the cyclic ester carbonates having an unsaturated carbon bond shown in Formula (6) to Formula (8) as a solvent of the electrolytic solution.

Further, in Examples 22-11 and 22-12 in which the anode coat 52C containing the compound shown in Formula (3A-14) or the compound shown in Formula (3A-27) as the compound shown in Formula (3) was formed, the discharge capacity retention ratio was higher than that of Example 22-14 in which the anode coat 52C containing the compound shown in Formula (3A-14) or the compound shown in Formula (3A-27) as the compound shown in Formula (3) was not formed. Meanwhile, in Example 22-16 in which the anode coat containing benzene sulfonic lithium shown in Formula (15) was formed, the discharge capacity retention ratio was lower than that of Example 22-14. The result showed that in order to improve chemical stability of the anode 52, the anode coat 52C should contain the compound shown in Formula (3) containing two or more of at least one ring out of a benzene ring and a cyclohexane ring in total. In this case, based on comparison between Examples 22-3, 22-11, and 22-12, there was a tendency that in the case where two or more of a carbonyl group (—C(=O)—X1) and a sulfonyl group (—S(=O)$_2$—Y1) in the compound shown in Formula (3) in total were included, the discharge capacity retention ratio was higher than that in the case that one of the carbonyl group (—C(=O)—X1) and the sulfonyl group (—S(=O)$_2$—Y1) in the compound shown in Formula (3) in total was included. In particular, there was a tendency that in the case where two sulfonyl groups were included, the discharge capacity retention ratio was still higher.

Only the result in the case of using part of the compound shown in Formula (3A) out of the compound shown in Formula (3) is shown, but results in the case of using other compounds out of the compounds shown in Formula (3A) or the compounds shown in Formula (3B) are not shown. However, as evidenced by the results of Examples 22-1 to 22-12, since all compounds shown in Formula (3A-1) and the like singly play a role to increase the discharge capacity retention ratio and other compounds shown in Formula (3) play a similar role, similar result is evidently able to be obtained as well if such other compounds shown in Formula (3) are used. The same is applied to a case that two or more out of the compounds shown in Formula (3) are mixed.

Accordingly, it was confirmed that in the secondary battery of the present invention, the cycle characteristics were improved by providing the anode coat 52C containing the compound shown in Formula (3) on the anode active material layer 52B not depending on the compound type shown in Formula (3). It was also confirmed that in this case, the higher cycle characteristics were obtained if the anode coat 52C contained the compound shown in Formula (3A-1) as the compound shown in Formula (3).

Examples 23-1 to 23-3

A procedure was executed in the same manner as that of Example 22-3, except that propene sultone (PRS: Example 23-1) as sultone, succinic anhydride (SCAH: Example 23-2) as an acid anhydride, or anhydro-2-sulfobenzoic acid (SBAH: Example 23-3) as an acid anhydride was added as a solvent. At this time, the content of PRS or the like in the solvent was 1 wt %.

Examples 23-4 to 23-7

A procedure was executed in the same manner as that of Example 22-1 or Example 22-3, except that lithium tetrafluoroborate (LiBF$_4$: Example 23-4), the compound shown in Formula (9-6) as the compound shown in Formula (9) (Example 23-5), the compound shown in Formula (10-2) as the compound shown in Formula (10) (Example 23-6), or the compound shown in Formula (13-2) as the compound shown in Formula (13) (Example 23-7) was added as an electrolyte salt, the concentration of LiPF$_6$ in the electrolytic solution was 0.9 mol/kg, and the concentration of LiBF$_4$ or the like in the electrolytic solution was 0.1 mol/kg.

Example 23-8

A procedure was executed in the same manner as that of Example 22-13, except that PRS as a solvent was added so that the content thereof in the solvent became 1 wt %.

For the secondary batteries of Examples 23-1 to 23-8, the cycle characteristics were examined. The results shown in Table 23 were obtained.

TABLE 23

Battery structure: coin type
Cathode active material: $LiCoO_2$;
anode active material: Si (electron beam evaporation method)

| | Anode coat | Solvent (weight ratio) EC | DEC | FEC | Others (wt %) | Electrolyte salt (mol/kg) | | Discharge capacity retention ratio (%) |
|---|---|---|---|---|---|---|---|---|
| Example 22-1 | Formula (3A-1) | 30 | 70 | — | — | $LiPF_6$: 1 | | 55 |
| Example 22-3 | (3A-1) | — | 70 | 30 | — | | | 82 |
| Example 23-1 | | — | 70 | 30 | PRS: 1 | | | 83 |
| Example 23-2 | | — | 70 | 30 | SCAH: 1 | | | 83 |
| Example 23-3 | | — | 70 | 30 | SBAH: 1 | | | 83 |
| Example 23-4 | | — | 70 | 30 | — | $LiPF_6$: 0.9 | $LiBF_4$: 0.1 | 83 |
| Example 23-5 | | 30 | 70 | — | — | $LiPF_6$: 0.9 | Formula (9-6): 0.1 | 61 |
| Example 23-6 | | 30 | 70 | — | — | $LiPF_6$: 0.9 | Formula (10-2): 0.1 | 62 |
| Example 23-7 | | — | 70 | 30 | — | $LiPF_6$: 0.9 | Formula (13-2): 0.1 | 84 |
| Example 22-13 | — | 30 | 70 | — | — | $LiPF_6$: 1 | | 25 |
| Example 22-14 | | — | 70 | 30 | — | | | 62 |
| Example 23-8 | | 30 | 70 | — | PRS: 1 | | | 23 |

As illustrated in Table 23, in the case where PRS or the like or $LiBF_4$ or the like was added to the electrolytic solution, results similar to the results illustrated in Table 22 were obtained. In other words, in Examples 23-1 to 23-7 in which the anode coat 52C containing the compound shown in Formula (3A-1) was formed, the discharge capacity retention ratio was higher than that of Examples 22-13, 22-14, and 23-8 in which the anode coat 52C containing the compound shown in Formula (3A-1) was not formed. In this case, in Examples 23-1 to 23-7 in which PRS or the like or $LiBF_4$ or the like was added, the discharge capacity retention ratio was higher than that of Examples 22-1 and 22-3 in which PRS or the like or $LiBF_4$ or the like was not contained. Meanwhile, in Example 23-8 in which PRS was added, the discharge capacity retention ratio was lower than that of Example 22-13 in which PRS was not contained. From the result, it is regarded that in the case where the anode coat 52C containing the compound shown in Formula (3A-1) was included and PRS or the like was contained, the discharge capacity retention ratio was increased by synergy effect thereof.

Only the results in the case of using lithium tetrafluoroborate, the compound shown in Formula (9), the compound shown in Formula (10), or the compound shown in Formula (13) are shown, but results in the case of using lithium perchlorate, lithium hexafluoroarsenate, the compound shown in Formula (11), the compound shown in Formula (12), or the compound shown in Formula (14) are not shown. However, since lithium perchlorate or the like plays a function to inhibit decomposition of the electrolytic solution as lithium tetrafluoroborate or the like does, it is evident that even if lithium perchlorate or the like is used, result similar to that in the case that lithium tetrafluoroborate or the like is used is able to be obtained.

Accordingly, it was confirmed that in the secondary battery of the present invention, in the case where the anode 52 contained silicon as an anode active material (electron beam evaporation method), the cycle characteristics were improved not depending on the electrolytic solution composition by providing the anode coat 52C containing the compound shown in Formula (3) on the anode active material layer 52B. It was also confirmed that in this case, the higher characteristics were obtained by adding sultone or acid anhydride as a solvent to the electrolytic solution, or adding at least one of the compounds shown in Formula (9) to Formula (11) or at least one of the compounds shown in Formula (12) to Formula (14).

Example 24-1

A procedure was executed in the same manner as that of Example 22-3, except that sulfopropionic magnesium (SPHMg) as an alkali earth metal salt was contained in the anode coat 52C. In forming the anode coat 52C, a 3 wt % aqueous solution in which the compound shown in Formula (3A-1) was dissolved to which 3 wt % of SPHMg was added was used.

Example 24-2

A procedure was executed in the same manner as that of Example 22-3, except that in forming the anode active material layer 52B, after a plurality of anode active material particles were formed, an oxide of silicon ($SiO_2$) as an oxide-containing film was precipitated on the surface of the anode active material particles by liquid-phase precipitation method. In forming the oxide-containing film, the anode current collector 52A on which the anode active material particles were formed was dipped in a solution obtained by dissolving boron as an anion scavenger into hydrofluosilic acid for 3 hours, the oxide of silicon was precipitated on the surface of the anode active material particles, and the resultant was subsequently washed with water and dried under reduced pressure.

Example 24-3

A procedure was executed in the same manner as that of Example 22-3, except that in forming the anode active material layer 52B, after a plurality of anode active material particles were formed, a cobalt (Co) plating film was grown as a metal material by electrolytic plating method. In forming the metal material, a current was applied while supplying air to a plating bath, and therefore cobalt was deposited on both faces of the anode current collector 52A. At this time, a cobalt plating solution (Japan Pure Chemical Co., Ltd. make) was used as a plating solution, the current density was from 2 $A/dm^2$ to 5 $A/dm^2$ both inclusive, and the plating rate was 10 nm/sec.

Example 24-4

A procedure was executed in the same manner as that of Example 22-3, except that in forming the anode active material layer 52B, after a plurality of anode active material particles were formed, an oxide-containing film and a metal material were formed in this order by the procedure of Examples 24-2 and 24-3.

Examples 24-5 to 24-7

A procedure was executed in the same manner as that of Examples 24-2 to 24-4, except that the anode coat 52C was not formed.

For the secondary batteries of Examples 24-1 to 24-7, the cycle characteristics were examined. The results shown in Table 24 were obtained.

tion ratio was higher than that of Example 22-3 in which the oxide-containing film or the metal material was not formed. In this case, based on comparison between Examples 24-2 to 24-4, there was a tendency that in the case of forming both of the oxide-containing film and the metal material, the discharge capacity retention ratio was higher than that of the case of forming only one of the oxide-containing film and the metal material. In this case, there was a tendency that if only one thereof was formed, in the case of forming the metal material, the discharge capacity retention ratio was higher than that of the case of forming the oxide-containing film. Further, in Examples 24-1 to 24-4, in the case where the oxide-containing film and the metal material were formed, the discharge capacity retention ratio was higher than that of the case that the alkali earth metal salt was contained in the anode coat 52C.

Only the result in the case of containing the alkali earth metal salt in the anode coat 52C is shown, but results in the case of containing the alkali metal salt in the anode coat 52C is not shown. However, since the alkali metal salt plays a function to increase the discharge capacity retention ratio as the alkali earth metal salt does, if the alkali metal salt is used, a result similar to that in the case that the alkali earth metal salt is used is evidently able to be obtained as well.

Accordingly, it was confirmed that in the secondary battery of the present invention, in the case where the anode 52 contained silicon (electron beam evaporation method) as an

TABLE 24

Battery structure: coin type
Cathode active material: $LiCoO_2$;
anode active material: Si (electron beam evaporation method)

| | Anode | | | Electric solution | | | Discharge |
| | | | | Solvent (weight ratio) | | Electrolyte salt | capacity retention ratio |
| | Oxide-containing film | Metal material | Anode coat | DEC | FEC | (mol/kg) | (%) |
|---|---|---|---|---|---|---|---|
| Example 22-3 | — | — | Formula (3A-1) | 70 | 30 | $LiPF_6$: 1 | 82 |
| Example 24-1 | — | — | Formula (3A-1) + SPHMg | 70 | 30 | | 86 |
| Example 24-2 | $SiO_2$ | — | Formula (3A-1) | 70 | 30 | | 92 |
| Example 24-3 | — | Co | Formula (3A-1) | 70 | 30 | | 93 |
| Example 24-4 | $SiO_2$ | Co | Formula (3A-1) | 70 | 30 | | 94 |
| Example 22-14 | — | — | — | 70 | 30 | $LiPF_6$: 1 | 62 |
| Example 24-5 | $SiO_2$ | — | — | 70 | 30 | | 90 |
| Example 24-6 | — | Co | — | 70 | 30 | | 90 |
| Example 24-7 | $SiO_2$ | Co | — | 70 | 30 | | 92 |

As illustrated in Table 24, even if the alkali earth metal salt was contained in the anode coat 52C or even if the oxide-containing film or the metal material was formed before the anode coat 52C was formed, results similar to those of Table 22 were obtained. In other words, in Examples 24-1 to 24-4 in which the anode coat 52C containing the compound shown in Formula (3A-1) was formed, the discharge capacity retention ratio was higher than that of Examples 24-5 to 24-7 in which the anode coat 52C containing the compound shown in Formula (3A-1) was not formed. In this case, in Example 24-1 in which the alkali earth metal salt was contained in the anode coat 52C, the discharge capacity retention ratio was higher than that of Example 22-3 in which the alkali earth metal salt was not contained in the anode coat 52C. Further, in Examples 24-2 to 24-4 in which the oxide-containing film or the metal material was formed, the discharge capacity retenanode active material, the cycle characteristics were improved not depending on the structure of the anode active material layer 52B or the composition of the anode coat 52C by providing the anode coat 52C containing the compound shown in Formula (3) on the anode active material layer 52B. It was also confirmed that in this case, the cycle characteristics were more improved in the case where the alkali metal salt or the alkali earth metal salt was contained in the anode coat 52C, or the oxide-containing film or the metal material was formed before forming the anode coat 52C. In particular, the cycle characteristics were more improved with the use of the oxide-containing film or the metal material than with the use of the alkali metal salt or the alkali earth metal salt. It was confirmed that in the case where the oxide-containing film or the metal material was used, the cycle characteristics were more improved with the use of only the metal material than with the use of only the oxide-containing film, and the cycle characteristics were more improved with the use of both the oxide-containing film and the metal material than with the use of one of the oxide-containing film and the metal material.

Example 25-1

A procedure was executed in the same manner as that of Example 22-3, except that in forming the cathode 51, after the cathode active material layer 51B was formed, the cathode coat 51C containing the compound shown in Formula (3A-1) was formed on the cathode active material layer 51B. In forming the cathode coat 51C on the cathode active material layer 51B, the cathode current collector 51A on which the cathode active material layer 51B was formed was dipped in 3 wt % aqueous solution in which the compound shown in Formula (3A-1) was dissolved for several seconds, taken out, and was subsequently dried at 60 degrees C. in reduced pressure atmosphere.

Example 25-2

A procedure was executed in the same manner as that of Example 22-13, except that the compound shown in Formula (3A-1) was dissolved in the electrolytic solution until saturation.

For the secondary batteries of Examples 25-1 and 25-2, the cycle characteristics were examined. The results shown in Table 25 were obtained.

contained silicon as an anode active material (electron beam evaporation method), the cycle characteristics were more improved by providing the cathode coat 51C and the anode coat 52C containing the compound shown in Formula (3) on the cathode active material layer 51B and the anode active material layer 52B.

Further, in Example 25-2 in which the electrolytic solution contained the compound shown in Formula (3A-1), the discharge capacity retention ratio was higher than that of Example 22-13 in which the electrolytic solution did not contain the compound shown in Formula (3A-1), but the discharge capacity retention ratio was significantly lower than that of Example 22-1 in which the anode coat 52C contained the compound shown in Formula (3A-1). The result showed that to inhibit decomposition of the electrolytic solution, it was more effective to contain the compound shown in Formula (3A-1) into at least one of the cathode 51 and the anode 52 than to contain the compound shown in Formula (3A-1) into the electrolytic solution.

Accordingly, it was confirmed that in the foregoing secondary battery, in the case where at least one of the cathode 51 and the anode 52 contained the compound shown in Formula (3), the secondary battery effectively functioned to improve the cycle characteristics.

Examples 26-1 to 26-12

A procedure was executed in the same manner as that of Examples 22-1 to 22-12, except that the anode active material

TABLE 25

Battery structure: coin type
Cathode active material: LiCoO$_2$;
anode active material: Si (electron beam evaporation method)

| | | | Electrolytic solution | | | | Discharge capacity |
| | Anode | Cathode | Solvent (weight ratio) | | | Electrolyte salt | retention ratio |
| | Anode coat | Cathode coat | EC | DEC | FEC | (mol/kg) | Others | (%) |
|---|---|---|---|---|---|---|---|---|
| Example 22-1 | Formula (3A-1) | — | 30 | 70 | — | LiPF$_6$: 1 | — | 55 |
| Example 22-3 | Formula (3A-1) | — | — | 70 | 30 | | — | 82 |
| Example 25-1 | Formula (3A-1) | Formula (3A-1) | — | 70 | 30 | | — | 83 |
| Example 22-13 | — | — | 30 | 70 | — | LiPF$_6$: 1 | — | 25 |
| Example 22-14 | — | — | — | 70 | 30 | | — | 62 |
| Example 25-2 | — | — | 30 | 70 | — | | Formula (3A-1) (saturation) | 30 |

As illustrated in Table 25, in the case where the cathode coat 51C and the anode coat 52C containing the compound shown in Formula (3A-1) were provided, result similar to that of Table 22 was obtained. In other words, in Example 25-1 in which the cathode coat 51C and the anode coat 52C containing the compound shown in Formula (3A-1) was formed, the discharge capacity retention ratio was higher than that of Example 22-14 in which the cathode coat 51C and the anode coat 52C containing the compound shown in Formula (3A-1) were not formed. In this case, in Example 25-1 in which the cathode coat 51C and the anode coat 52C were formed, the discharge capacity retention ratio was higher than that of Example 22-3 in which only the anode coat 52C was formed.

Accordingly, it was confirmed that in the secondary battery of the present invention, in the case where the anode 52 layer 52B was formed by sintering method instead of vapor-phase deposition method (electron beam evaporation method) so that the thickness of the anode active material layer 52B became 10 μm. In forming the anode active material layer 52B by sintering method, an anode mixture in which 95 parts by mass of silicon as an anode active material (average particle diameter: 1 μm) and 5 parts by mass of polyimide as a binder were mixed was dispersed in N-methyl-2-pyrrolidone to obtain a paste anode mixture slurry. The anode current collector 52A made of a roughened electrolytic copper foil (thickness: 18 μm) was uniformly coated with the anode mixture slurry by a bar coater, which was dried. Thereafter, the resultant was compression-molded by a roll pressing machine, and was heated for 12 hours at 400 degrees C. in the vacuum atmosphere. In this case, lithium metal was prevented from being precipitated on the anode 52 at the time of full charge by adjusting the thickness of the cathode active material layer 51B so that the charge and discharge capacity of the anode 52 became larger than the charge and discharge capacity of the cathode 51.

Examples 26-13 to 26-16

A procedure was executed in the same manner as that of Examples 22-13 to 22-16, except that the anode active material layer 52B was formed by sintering method as in Examples 26-1 to 26-12.

For the secondary batteries of Examples 26-1 to 26-16, the cycle characteristics were examined. The results shown in Table 26 were obtained.

that of Example 26-14 in which the anode coat 52C containing the compound shown in Formula (3A-14) or the compound shown in Formula (3A-27) was not formed. Meanwhile, in Example 26-16 in which the anode coat containing benzene sulfonic lithium shown in Formula (15) was formed, the discharge capacity retention ratio was equal to that of Example 26-14.

Accordingly, in the secondary battery of the present invention, it was confirmed that in the case where the anode 52 contained silicon (sintering) as an anode active material, the cycle characteristics were improved by providing the anode coat 52C containing the compound shown in Formula (3) on the anode active material layer 52B not depending on the

TABLE 26

Battery structure: coin type
Cathode active material: LiCoO$_2$; anode active material: Si (sintering method)

| | Anode Anode coat | Electrolytic solution | | | | | | | Discharge capacity retention ratio (%) |
|---|---|---|---|---|---|---|---|---|---|
| | | Solvent (weight ratio) | | | | | | Electrolyte salt (mol/kg) | |
| | | EC | PC | DEC | FEC | DFEC | DFDMC | VC | | |
| Example 26-1 | Formula (3A-1) | 30 | — | 70 | — | — | — | — | LiPF$_6$: 1 | 45 |
| Example 26-2 | | 10 | 20 | 70 | — | — | — | — | | 46 |
| Example 26-3 | | — | — | 70 | 30 | — | — | — | | 83 |
| Example 26-4 | | 10 | 10 | 70 | 10 | — | — | — | | 81 |
| Example 26-5 | | 10 | — | 70 | — | 20 | — | — | | 85 |
| Example 26-6 | | 10 | 10 | 70 | — | 10 | — | — | | 84 |
| Example 26-7 | | 5 | 20 | 50 | 15 | 10 | — | — | | 86 |
| Example 26-8 | | — | — | 65 | 30 | — | 5 | — | | 82 |
| Example 26-9 | | 10 | 19 | 70 | — | — | — | 1 | | 50 |
| Example 26-10 | | 10 | 10 | 70 | — | — | — | 10 | | 52 |
| Example 26-11 | Formula (3A-14) | — | — | 70 | 30 | — | — | — | | 81 |
| Example 26-12 | Formula (3A-27) | — | — | 70 | 30 | — | — | — | | 81 |
| Example 26-13 | — | 30 | — | 70 | — | — | — | — | LiPF$_6$: 1 | 21 |
| Example 26-14 | | — | — | 70 | 30 | — | — | — | | 80 |
| Example 26-15 | | 10 | — | 70 | — | 20 | — | — | | 81 |
| Example 26-16 | Formula (15) | — | — | 70 | 30 | — | — | — | | 80 |

As illustrated in Table 26, in the case where the anode active material layer 52B was formed by sintering method, the results similar to the results of Table 22 were obtained as well. In other words, in Example 26-1 in which the anode coat 52C containing the compound shown in Formula (3A-1) was formed, the discharge capacity retention ratio was higher than that of Example 26-13 in which the anode coat 52C containing the compound shown in Formula (3A-1) was not formed. Further, in Examples 26-2 to 26-10 in which PC or the like was added as a solvent, the discharge capacity retention ratio was higher than that of Example 26-1 in which PC or the like was not added as a solvent. It is needless to say that in Examples 26-3 and 26-5 in which the anode coat 52C containing the compound shown in Formula (3A-1) was formed, the discharge capacity retention ratio was higher than that of Examples 26-14 and 26-15 in which the anode coat 52C containing the compound shown in Formula (3A-1) was not formed. Further, in Examples 26-11 and 26-12 in which the anode coat 52C containing the compound shown in Formula (3A-14) or the compound shown in Formula (3A-27) was formed, the discharge capacity retention ratio was higher than solvent composition and the type of the compound shown in Formula (3).

Examples 27-1 to 27-7

A procedure was executed in the same manner as that of Examples 23-1 to 23-7, except that the anode active material layer 52B was formed by sintering method as in Examples 26-1 to 26-12.

Example 27-8

A procedure was executed in the same manner as that of Example 23-8, except that the anode active material layer was formed by sintering method as in Examples 26-1 to 26-12.

The cycle characteristics of the secondary batteries of Examples 27-1 to 27-8 were examined. The results shown in Table 27 were obtained.

TABLE 27

Battery structure: coin type
Cathode active material: LiCoO$_2$; anode active material: Si (sintering method)

| | Anode Anode coat | Solvent (weight ratio) EC | DEC | FEC | Others (wt %) | Electrolyte salt (mol/kg) | Discharge capacity retention ratio (%) |
|---|---|---|---|---|---|---|---|
| Example 26-1 | Formula (3A-1) | 30 | 70 | — | — | LiPF$_6$: 1 | 45 |
| Example 26-3 | (3A-1) | — | 70 | 30 | — | | 83 |
| Example 27-1 | | — | 70 | 30 | PRS: 1 | | 84 |
| Example 27-2 | | — | 70 | 30 | SCAH: 1 | | 84 |
| Example 27-3 | | — | 70 | 30 | SBAH: 1 | | 84 |
| Example 27-4 | | — | 70 | 30 | — | LiPF$_6$: 0.9  LiBF$_4$: 0.1 | 84 |
| Example 27-5 | | 30 | 70 | — | — | LiPF$_6$: 0.9  Formula (9-6): 0.1 | 57 |
| Example 27-6 | | 30 | 70 | — | — | LiPF$_6$: 0.9  Formula (10-2): 0.1 | 58 |
| Example 27-7 | | — | 70 | 30 | — | LiPF$_6$: 0.9  Formula (13-2): 0.1 | 84 |
| Example 26-13 | — | 30 | 70 | — | — | LiPF$_6$: 1 | 21 |
| Example 26-14 | | — | 70 | 30 | — | | 80 |
| Example 27-8 | | 30 | 70 | — | PRS: 1 | | 21 |

As illustrated in Table 27, in the case where the anode active material layer 52B was formed by sintering method, results similar to the results illustrated in Table 23 were obtained. In other words, in Examples 27-1 to 27-7 in which the anode coat 52C containing the compound shown in Formula (3A-1) was formed, the discharge capacity retention ratio was higher than that of corresponding Examples 26-13, 26-14, and 27-8 in which the anode coat 52C containing the compound shown in Formula (3A-1) was not formed. In this case, in Examples 27-1 to 27-7 in which PRS or the like or LiBF$_4$ or the like was added, the discharge capacity retention ratio was higher than that of Examples 26-1 and 26-3 in which PRS or the like or LiBF$_4$ or the like was not contained. Meanwhile, in Example 27-8 in which PRS was added, the discharge capacity retention ratio was equal to that of Example 26-13 in which PRS was not contained.

Accordingly, it was confirmed that in the secondary battery of the present invention, in the case where the anode 52 contained silicon (sintering method) as an anode active material, the cycle characteristics were improved by providing the anode coat 52C containing the compound shown in Formula (3) on the anode active material layer 52B not depending on the electrolytic solution composition.

Example 28

A procedure was executed in the same manner as that of Example 24-1, except that the anode active material layer 52B was formed by sintering method in the same manner as that of Examples 26-1 to 26-12.

The cycle characteristics of the secondary battery of Example 28 were examined. The results shown in Table 28 were obtained.

TABLE 28

Battery structure: coin type
Cathode active material: LiCoO$_2$;
anode active material: Si (sintering method)

| | Anode Anode coat | Solvent (weight ratio) DEC | FEC | Electrolyte salt (mol/kg) | Discharge capacity retention ratio (%) |
|---|---|---|---|---|---|
| Example 26-3 | Formula (3A-1) | 70 | 30 | LiPF$_6$: 1 | 83 |
| Example 28 | Formula (3A-1) + SPHMg | 70 | 30 | | 86 |

As illustrated in Table 28, in the case where the anode active material layer 52B was formed by sintering method, results similar to the results of Table 24 were obtained. In other words, in Example 28 in which the alkali earth metal salt was contained in the anode coat 52C containing the compound shown in Formula (3A-1), it is needless to say that the discharge capacity retention ratio was higher than that of Example 26-14 in which the alkali earth metal salt was not contained in the anode coat 52C containing the compound shown in Formula (3A-1), and the discharge capacity retention ratio was higher than that of Example 26-3 in which the alkali earth metal salt was not contained.

Accordingly, it was confirmed that in the secondary battery of the present invention, in the case where the anode 52 contained silicon (sintering method) as an anode active material, the cycle characteristics were improved by providing the anode coat 52C containing the compound shown in Formula (3) on the anode active material layer 52B not depending on the composition of the anode coat 52C.

Example 29-1

A procedure was executed in the same manner as that of Example 25-1, except that the anode active material layer was formed by sintering method as in Examples 26-1 to 26-12.

Example 29-2

A procedure was executed in the same manner as that of Example 25-2, except that the anode active material layer was formed by sintering method as in Examples 26-1 to 26-12.

The cycle characteristics of the secondary batteries of Examples 29-1 and 29-2 were examined. The results shown in Table 29 were obtained.

TABLE 29

Battery structure: coin type
Cathode active material: $LiCoO_2$; anode active material: Si (sintering method)

| | | | Electrolytic solution | | | | Discharge capacity retention ratio (%) |
|---|---|---|---|---|---|---|---|
| | | | Solvent (weight ratio) | | | Electrolyte salt | |
| Anode | Cathode | | EC | DEC | FEC | (mol/kg) | Others |
| Anode coat | Cathode coat | | | | | | |
| Example 26-1 | Formula (3A-1) | — | 30 | 70 | — | $LiPF_6$: 1 | — | 45 |
| Example 26-3 | Formula (3A-1) | — | — | 70 | 30 | | — | 83 |
| Example 29-1 | Formula (3A-1) | Formula (3A-1) | — | 70 | 30 | | — | 84 |
| Example 26-13 | — | — | 30 | 70 | — | $LiPF_6$: 1 | — | 21 |
| Example 26-14 | | | — | 70 | 30 | | — | 80 |
| Example 29-2 | | | 30 | 70 | — | | Formula (3A-1) (saturation) | 30 |

As illustrated in Table 29, in the case where the anode active material layer 52B was formed by sintering method, results similar to the results of Table 25 were obtained. In other words, in Example 29-1 in which the anode coat 52C and the cathode coat 51C containing the compound shown in Formula (3A-1) were formed, the discharge capacity retention ratio was higher than that of Example 26-14 in which the anode coat 52C and the cathode coat 51C containing the compound shown in Formula (3A-1) were not formed, and the discharge capacity retention ratio was higher than that of Example 26-3 in which only the anode coat 52C was formed. Further, in Example 29-2 in which the electrolytic solution contained the compound shown in Formula (3A-1), the discharge capacity retention ratio was higher than that of Example 26-12 in which the electrolytic solution did not contain the compound shown in Formula (3A-1), but the discharge capacity retention ratio was significantly lower than that of Example 26-1 in which the anode coat 52C contained the compound shown in Formula (3A-1).

Accordingly, it was confirmed that in the secondary battery of the present invention, in the case where the anode 52 contained silicon (sintering method) as an anode active material, the cycle characteristics were more improved by providing the cathode coat 51C and the anode coat 52C containing the compound shown in Formula (3) on the cathode active material layer 51B and the anode active material layer 52B respectively.

Examples 30-1 to 30-3

A procedure was executed in the same manner as that of Example 22-1, except that a tin cobalt carbon (SnCoC)-containing material was used instead of silicon as an anode active material, the anode active material layer 52B was formed by coating method, and the electrolytic solution composition was changed as illustrated in Table 30. In forming the anode active material layer 52B containing the SnCoC-containing material by coating method, first, tin cobalt indium titanium alloy powder and carbon powder were mixed. Thereafter, the SnCoC-containing material was synthesized by using mechanochemical reaction. At this time, the composition of the obtained SnCoC-containing material was analyzed. The tin content was 48 wt %, the cobalt content was 23 wt %, the carbon content was 20 wt %, and the ratio of cobalt to the total of tin and cobalt (Co/(Sn+Co)) was 32 wt %. In analyzing the composition of the SnCoC-containing material, the carbon content was measured by a carbon sulfur analysis equipment, and the tin content and the cobalt content were measured by Inductively Coupled Plasma (ICP) emission analysis. Further, the obtained SnCoC-containing material was analyzed by X-ray diffraction method. A diffraction peak having a wide half bandwidth with the diffraction angle 2θ of 1.0 degree or more was observed in the range of 2θ=20 to 50 degrees. Further, when the SnCoC-containing material was analyzed by XPS, peak P1 was also obtained as in the SnCoC-containing material used in Example 8-1 as illustrated in FIG. 20. When the peak P1 was analyzed, peak P2 of the surface contamination carbon and peak P3 of C1s in the SnCoC-containing material existing on the lower energy side were obtained. Peak P3 was obtained in a region lower than 284.5 eV. In other words, it was confirmed that carbon in the SnCoC-containing material was bonded with other element. Subsequently, 80 parts by mass of the SnCoC-containing material powder as an anode active material, 11 parts by mass of graphite and 1 part by mass of acetylene black as an electrical conductor, 8 parts by mass of polyvinylidene fluoride as a binder were mixed to obtain an anode mixture. Thereafter, the anode mixture was dispersed in N-methyl-2-pyrrolidone to obtain a paste anode mixture slurry. Finally, the anode current collector 52A made of a copper foil (thickness: 10 μm) was uniformly coated with the anode mixture slurry and the resultant was dried. Finally, the resultant was compression-molded by a rolling press machine to form the anode active material layer 52B. In this case, the thickness of the cathode active material layer 51B was adjusted so that the charge and discharge capacity of the anode 52 was larger than the charge and discharge capacity of the cathode 51, and therefore lithium metal was prevented from being precipitated on the anode 52 at the time of full charge.

Examples 30-4 to 30-6

A procedure was executed in the same manner as that of Examples 30-1 to 30-3, except that the anode active material layer 52B containing the SnCoC-containing material was formed in the same manner as that of Examples 30-1 to 30-3, and the anode cot 52C was not formed.

For the secondary batteries of Examples 30-1 and 30-6, the cycle characteristics were examined. The results illustrated in Table 30 were obtained.

TABLE 30

Battery structure: coin type
Cathode active material: LiCoO$_2$; anode active material: SnCoC-containing material

| | | Electrolytic solution | | | | | Discharge capacity retention ratio (%) |
|---|---|---|---|---|---|---|---|
| | Anode Anode coat | Solvent (weight ratio) | | | | Electrolyte salt (mol/kg) | |
| | | EC | PC | DEC | FEC | DFEC | |
| Example 30-1 | Formula (3A-1) | 10 | 10 | 70 | 10 | — | LiPF$_6$: 1 | 86 |
| Example 30-2 | | 10 | 10 | 70 | — | 10 | | 87 |
| Example 30-3 | | 15 | 20 | 50 | 10 | 5 | | 89 |
| Example 30-4 | — | 10 | 10 | 70 | 10 | — | LiPF$_6$: 1 | 85 |
| Example 30-5 | | 10 | 10 | 70 | — | 10 | | 86 |
| Example 30-6 | | 15 | 20 | 50 | 10 | 5 | | 87 |

As illustrated in Table 30, in the case where the anode active material layer 52B containing the SnCoC-containing material was formed, results similar to the results of Table 22 were obtained. In other words, in Examples 30-1 to 30-3 in which the anode coat 52C containing the compound shown in Formula (3A-1) was formed, the discharge capacity retention ratio was higher than that of Examples 30-4 to 30-6 in which the anode coat 52C containing the compound shown in Formula (3A-1) was not formed. In this case, there was a tendency that the discharge capacity retention ratio was increased as the content of FEC or the like as a solvent of the electrolytic solution was increased.

Accordingly, it was confirmed that in the secondary battery of the present invention, in the case where the anode 52 contained the SnCoC-containing material as an anode active material, if the anode coat 52C containing the compound shown in Formula (3) was formed on the anode active material layer 52B, the cycle characteristics were improved.

Examples 31-1 to 31-4

Artificial graphite was used instead of silicon as an anode active material, and the anode active material layer 52B was formed by using coating method so that the thickness became 70 μm. Thereafter, 3 wt % aqueous solution of the compound shown in Formula (3A-1) to which a surfactant was added was used to form the anode coat 52C. In addition, dimethyl carbonate (DMC) was used instead of DEC as a solvent of the electrolytic solution, and the composition was changed as illustrated in Table 31. A procedure was executed in the same manner as that of Example 22-1, except that the structure of the anode active material layer 52B and the anode coat 52C and the electrolytic solution composition were changed as described above. In forming the anode active material layer 52B containing artificial graphite by coating method and subsequently forming the anode coat 52C, first, 97 parts by mass of artificial graphite powder as an anode active material and 3 parts by mass of polyvinylidene fluoride as a binder were mixed to obtain an anode mixture. Thereafter, the anode mixture was dispersed in N-methyl-2-pyrrolidone to obtain a paste anode mixture slurry. Subsequently, both faces of the anode current collector 52A made of a copper foil (thickness: 15 μm) were uniformly coated with the anode mixture slurry by a bar coater, which was dried, was compression-molded by a roll pressing machine to form the anode active material layer 52B. Thereafter, 3 wt % aqueous solution of the compound shown in Formula (3A-1) to which perfluorobutanesulfonic lithium as a surfactant was added so that the concentration thereof became 0.5 wt % was prepared. Subsequently, the anode current collector 52A on which the anode active material layer 52B was formed was dipped in the aqueous solution for several seconds, was taken out, and was subsequently dried at 60 degrees C. in reduced pressure atmosphere. Thereby, the anode coat 52C was formed on the anode active material layer 52B. In this case, the thickness of the cathode active material layer 51B was adjusted so that the charge and discharge capacity of the anode 52 was larger than the charge and discharge capacity of the cathode 51, and thereby lithium metal was prevented from being precipitated on the anode 52 at the time of full charge.

Examples 31-5 to 31-8

A procedure was executed in the same manner as that of Examples 31-1 to 31-4, except that the anode coat 52C was not formed.

For the secondary batteries of Examples 31-1 to 31-8, the cycle characteristics were examined. The results illustrated in Table 31 were obtained.

TABLE 31

Battery structure: coin type
Cathode active material: LiCoO$_2$; anode active material: Artificial graphite

| | | Electrolytic solution | | | | | | Discharge capacity retention ratio (%) |
|---|---|---|---|---|---|---|---|---|
| | Anode Anode coat | Solvent (weight ratio) | | | | | Electrolyte salt (mol/kg) | |
| | | EC | PC | DMC | FEC | VC | | |
| Example 31-1 | Formula (3A-1) | 30 | — | 70 | — | — | LiPF$_6$: 1 | 93 |
| Example 31-2 | | 20 | 10 | 70 | | | | 94 |
| Example 31-3 | | 29 | — | 70 | 1 | — | | 96 |
| Example 31-4 | | 29 | — | 70 | — | 1 | | 95 |
| Example 31-5 | — | 30 | — | 70 | — | — | LiPF$_6$: 1 | 92 |
| Example 31-6 | | 20 | 10 | 70 | | | | 93 |
| Example 31-7 | | 29 | — | 70 | 1 | — | | 95 |
| Example 31-8 | | 29 | — | 70 | — | 1 | | 94 |

As illustrated in Table 31, in the case where the anode active material layer 52B containing the artificial graphite was formed, results similar to the results of Table 22 were obtained. In other words, in Examples 31-1 to 31-4 in which the anode coat 52C containing the compound shown in Formula (3A-1) was formed, the discharge capacity retention ratio was higher than that of Examples 31-5 to 31-8 in which the anode coat 52C containing the compound shown in Formula (3A-1) was not formed. In this case, the discharge capacity retention ratio was higher by adding PC or the like as a solvent of the electrolytic solution. In particular, the discharge capacity retention ratio was highest in the case where FEC was added.

Accordingly, it was confirmed that in the secondary battery of the present invention, in the case where the anode 52 contained the artificial graphite as an anode active material, and the anode coat 52C containing the compound shown in Formula (3) was formed on the anode active material layer 52B, the cycle characteristics were improved.

Example 32-1

A procedure was executed in the same manner as that of Example 22-3, except that the particle coating film 212 was included, the cathode active material layer 51B was formed by using the cathode active material particles 211 composed of $LiCo_{0.98}Al_{0.01}Mg_{0.01}O_2$, and the anode coat 52C was not formed on the anode 52.

In forming the cathode active material layer 51B having the cathode active material particles 211, first, a lithium cobalt composite oxide having a composition of $LiCo_{0.98}Al_{0.01}Mg_{0.01}O_2$ as a cathode active material and the compound shown in Formula (3A-1) having 1 part by mass in relation to 100 parts by mass of the lithium cobalt composite oxide were put into 100 $cm^3$ pure water, which was mixed while being stirred for 1 hour. Subsequently, after moisture was removed from the mixture by using an evaporator, the resultant was dried for 12 hours at 120 degrees C. in an oven. Thereby, the particle coating film 212 containing the compound shown in Formula (3A-1) was formed on the surface of the cathode active material particle 211 composed of $LiCo_{0.98}Al_{0.01}Mg_{0.01}O_2$. Subsequently, 91 parts by mass (reduced quantity to the lithium cobalt composite oxide) of the cathode active material particles 211 having the particle coating film 212, 6 parts by mass of graphite as an electrical conductor, 3 parts by mass of polyvinylidene fluoride as a binder were mixed to obtain a cathode mixture. Thereafter, the cathode mixture was dispersed in N-methyl-2-pyrrolidone to obtain a paste cathode mixture slurry. Finally, the cathode current collector 51A made of a strip-shaped aluminum foil (thickness: 12 μm) was uniformly coated with the cathode mixture slurry by a bar coater, which was dried. Finally, the resultant was compression-molded by a roll pressing machine to form the cathode active material layer 51B. In this case, lithium metal was prevented from being precipitated on the anode 52 at the time of full charge by adjusting the thickness of the cathode active material layer 51B so that the charge and discharge capacity of the anode 52 became larger than the charge and discharge capacity of the cathode 51.

Example 32-2

A procedure was executed in the same manner as that of Examples 32-1, except that the particle coating film 212 was not formed.

Example 32-3

A procedure was executed in the same manner as that of Example 32-2, except that the compound shown in Formula (3A-1) was dissolved in the electrolytic solution to saturation.

For the secondary batteries of Examples 32-1 to 32-3, the cycle characteristics and the reaction resistance characteristics were examined. The results illustrated in Table 32 and FIG. 21 were obtained.

Figure 21:
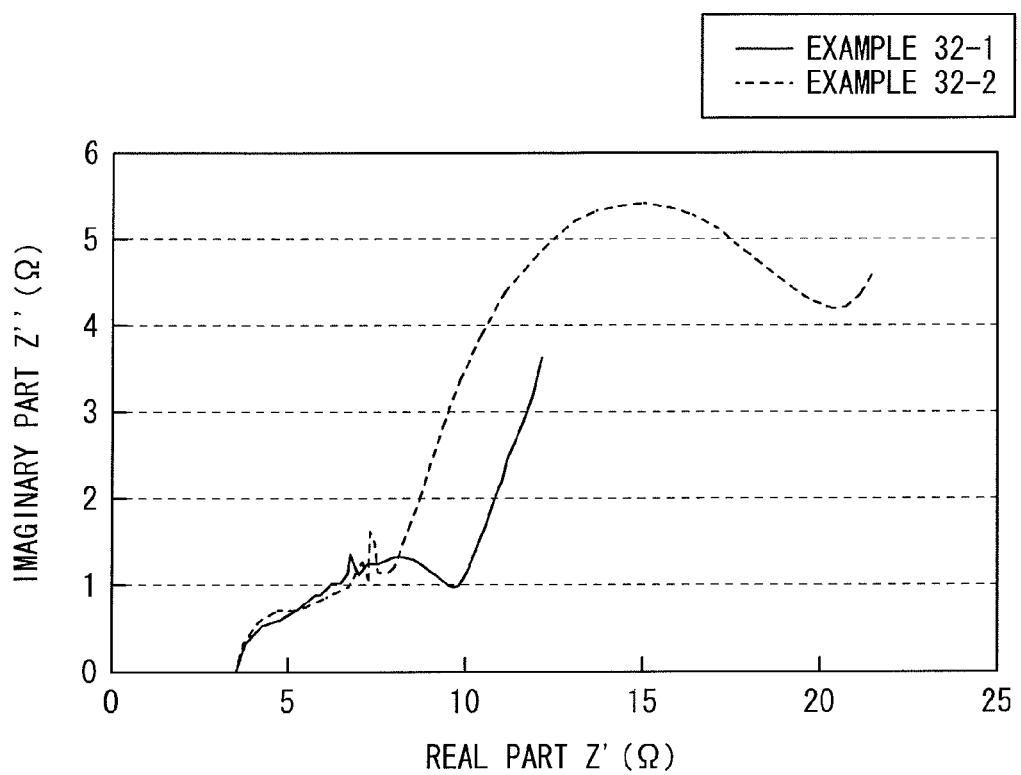
FIG. 21 is a diagram illustrating an analytical result of impedance of the secondary battery based on AC impedance method.

In examining the reaction resistance characteristics, 100 cycles of charge and discharge were performed under the conditions similar to those in examining the cycle characteristics. Thereafter, complex impedance of the secondary battery in frequency band from $10^{-2}$ Hz to $10^6$ Hz was measured by using AC impedance method in the atmosphere of 23 degrees C. The complex impedance was expressed by Cole-Cole plot in which the horizontal axis indicates impedance real part (Z') and the vertical axis indicates impedance imaginary part (Z") as illustrated in FIG. 21. Thereafter, circular arc of the resistance component (anode) was approximated as a half circle to obtain reaction resistance as the maximum value.

The foregoing procedure and the foregoing conditions in examining the foregoing reaction resistance characteristics are similarly applied to the following examples. FIG. 21 shows only the results of Examples 32-1 and 32-2.

TABLE 32

Battery structure: coin type
Cathode active material: $LiCo_{0.98}Al_{0.01}Mg_{0.01}O_2$; anode active material: Si (electron beam evaporation method)

| | Cathode Particle coating film | Solvent (weight ratio) | | Electrolyte salt | | Discharge capacity retention ratio | Reaction resistance |
|---|---|---|---|---|---|---|---|
| | | DEC | FEC | (mol/kg) | Others | (%) | (Ω) |
| Example 32-1 | Formula (3A-1) | 70 | 30 | $LiPF_6$: 1 | — | 63 | 8 |
| Example 32-2 | — | 70 | 30 | $LiPF_6$: 1 | — | 62 | 23 |
| Example 32-3 | | 70 | 30 | | Formula (3A-1) (saturation) | 63 | 18 |

As illustrated in Table 32 and FIG. 21, in Example 32-1 in which the particle coating film 212 was formed on the surface of the cathode active material particles 211, the discharge capacity retention ratio was equal to or was higher than that of Example 32-2 in which the particle coating film 212 was not formed on the surface of the cathode active material particles 211 and Example 32-3 in which the electrolytic solution contained the compound shown in Formula (3A-1), and the reaction resistance was significantly kept low. The result showed that decomposition reaction of the electrolytic solution was inhibited and increase of the resistance component in the anode 52 was inhibited by forming the particle coating film 212, and showed that even if the electrolytic solution contained the compound shown in Formula (3A-1), increase of the resistance component was not sufficiently inhibited. In other words, it is regarded that by providing the particle coating film 212 containing the compound shown in Formula (3A-1) for the cathode 51, adhesion of decomposed matter to the anode 52 was inhibited and chemical stability of the cathode 51 and the anode 52 was improved.

Accordingly, it was confirmed that in the secondary battery of the present invention, in the case where the anode 52 contained silicon (electron beam evaporation method) as an anode active material, if the particle coating film 212 containing the compound shown in Formula (3) was provided on the surface of the cathode active material particles 211 in the cathode active material layer 51B having the plurality of cathode active material particles 211, the cycle characteristics were secured and the reaction resistance characteristics were improved.

Example 33-1

A procedure was executed in the same manner as that of Example 32-1, except that the battery structure was laminated film type instead of the coin type, artificial graphite was used instead of silicon as an anode active material, the anode active material layer 34B was formed by coating method, and the composition of the solvent of the electrolytic solution was changed as illustrated in Table 33.

In forming the laminated film type secondary battery, first, in the same manner as that of Example 32-1, the cathode 33 was formed by forming the cathode active material layer 33B that had the particle coating film 212 containing the compound shown in Formula (3A-1) and had the plurality of cathode active material particles 211 composed of $LiCo_{0.98}Al_{0.01}Mg_{0.01}O_2$ on the cathode current collector 33A. Subsequently, the anode 34 was formed. First, 90 parts by mass of artificial graphite powder as an anode active material and 10 parts by mass of polyvinylidene fluoride as a binder were mixed to obtain an anode mixture. Thereafter, the anode mixture was dispersed in N-methyl-2-pyrrolidone to obtain a paste anode mixture slurry. Subsequently, both faces of the anode current collector 34A made of a copper foil (thickness: 15 µm) was uniformly coated with the anode mixture slurry by a bar coater, which was dried. Thereafter, the resultant was compression-molded by a roll pressing machine to form the anode active material layer 34B. Thereafter, the cathode lead 31 and the anode lead 32 were respectively attached to the formed cathode 33 and the formed anode 34.

Subsequently, the separator 35 having a microporous layer composed of polyvinylidene fluoride with a thickness of 4 µm was formed. First, polyvinylidene fluoride (average molecular weight: 150000) was dissolved in N-methylpyrrolidone so that the weight ratio became 10:90 to prepare a polyvinylidene fluoride solution. Subsequently, a microporous film (thickness: 7 µm) composed of a mixed body of polyethylene and polypropylene was coated with the solution by a desk coater, and phase separation was made in a water bath. Thereafter, the microporous film was dried by hot wind, and thereby the microporous layer composed of polyvinylidene fluoride with a thickness of 4 µm was formed on the surface of the microporous film.

Subsequently, the cathode 33, the separator 35, and the anode 34 were layered in this order, and the resultant was spirally wound several times in the longitudinal direction. Thereafter, the resultant was contained in the package members 40 made of a dampproof aluminum laminated film (thickness: 180 µm). Finally, the electrolytic solution was injected into the package member 40 in a manner of reduced pressure. Thereby, the plate-like laminated film type secondary battery (approximate dimensions: 34 mm*50 mm*3.8 mm) was completed. In this case, the thickness of the cathode active material layer 33B was adjusted so that the charge and discharge capacity of the anode 34 was larger than the charge and discharge capacity of the cathode 33, and therefore lithium metal was prevented from being precipitated on the anode 34 at the time of full charge.

Example 33-2

A procedure was executed in the same manner as that of Example 33-1, except that the particle coating film 212 was not formed but the cathode active material layer 33B was formed.

Example 33-3

A procedure was executed in the same manner as that of Example 33-2, except that the compound shown in Formula (3A-1) was added to the electrolytic solution until saturation.

The swollenness characteristics together with the cycle characteristics and the reaction resistance characteristics of the secondary batteries of Examples 33-1 to 33-2 were examined. The results shown in Table 33 were obtained. In this example, 1 cycle charge and discharge conditions in examining the swollenness characteristics were similarly applied to 1 cycle charge and discharge conditions in examining the cycle characteristics.

In examining the swollenness characteristics, after charge and discharge were performed 1 cycle in the atmosphere of 45 degrees C., charge was performed again and therefore the thickness of the secondary battery was measured. Subsequently, the secondary battery in a state of being charged was stored in atmosphere of 80 degrees C. for 12 hours to measure the thickness of the secondary battery after storage. Thereafter, swollenness (mm)=(thickness after storage-thickness before storage) was calculated. At this time, 1 cycle charge and discharge conditions were as follows. That is, charge was performed at a constant voltage of 4.2 V and at a constant current of 800 mA for 2.5 hours, and subsequently discharge was performed at a constant current of 800 mA until the final voltage reached 3.0 V.

TABLE 33

Battery structure: laminated film type
Cathode active material: $LiCo_{0.98}Al_{0.01}Mg_{0.01}O_2$; anode active material: artificial graphite

| | Cathode Particle coating film | Solvent (weight ratio) EC | Solvent (weight ratio) DEC | Electrolyte salt (mol/kg) | Others | Discharge capacity retention ratio (%) | Reaction resistance (Ω) | Swollenness (mm) |
|---|---|---|---|---|---|---|---|---|
| Example 33-1 | Formula (3A-1) | 50 | 50 | LiPF$_6$: 1 | — | 95 | 100 | 0.4 |
| Example 33-2 | — | 50 | 50 | LiPF$_6$: 1 | — | 94 | 110 | 0.6 |
| Example 33-3 | — | 50 | 50 | | Formula (3A-1) (Saturation) | 94 | 100 | 0.5 |

As illustrated in Table 33, in the case where the battery structure was the laminated film type and artificial graphite was used as an anode active material, in Example 33-1 in which the particle coating film 212 was formed on the surface of the cathode active material particles 211, the discharge capacity retention ratio was higher and reaction resistance was significantly kept lower compared to those of Example 33-2 in which the particle coating film 212 was not formed on the surface of the cathode active material particles 211. Further, in Example 33-1, reaction resistance was kept low to the same level as that of Example 33-3 in which the electrolytic solution contained the compound shown in Formula (3A-1), but the discharge capacity retention ratio was higher than that of Example 33-3. In Example 33-1, swollenness was kept lower than that of Examples 33-2 and 33-3. The result showed that decomposition reaction of the electrolytic solution was inhibited and chemical stability of the cathode 33 and the anode 34 was improved by forming the particle coating film 212, and showed that the chemical stability was favorably retained even in high temperature environment.

Accordingly, it was confirmed that in the laminate type secondary battery, in the case where the anode 34 contained artificial graphite as an anode active material, the reaction resistance characteristics were ensured and the cycle characteristics and the swollenness characteristics were improved by providing the particle coating film 212 containing the compound shown in Formula (3) on the surface of the cathode active material particles 211 in the cathode active material layer 33B having the plurality of cathode active material particles 211.

From the results of the foregoing Table 22 to Table 33, it was confirmed that in the secondary battery of the present invention, in the case where at least one of the cathode and the anode contained the compound shown in Formula (3), the battery characteristics such as the cycle characteristics, the reaction resistance characteristics, and the swollenness characteristics were able to be improved not depending on the electrolytic solution composition, the type of the anode active material and the cathode active material, the structure of the cathode active material layer and the anode active material layer or the like. In this case, in the case where silicon was used, the increase ratio of the discharge capacity retention ratio was larger and the lowering ratio of reaction resistance was larger than in the case that the carbon material was used as an anode active material. It is regarded that the result showed that in the case where silicon advantageous for realizing high capacity was used as an anode active material, the electrolytic solution was more easily decomposed than in the case that the carbon material was used, and thus chemical stability of the cathode and the anode containing the compound shown in Formula (3) was improved and therefore decomposition inhibition effect of the electrolytic solution was significantly demonstrated.

The present invention has been described with reference to the embodiments and the examples. However, the invention is not limited to the aspects described in the foregoing embodiments and the foregoing examples, and various modifications may be made. For example, usage applications of the compound shown in Formula (1), Formula (2), or Formula (3) are not limited to the secondary battery, but may include electrochemical devices other than the secondary battery. Examples of other usage application include a capacitor.

Further, in the foregoing embodiments and the foregoing examples, the description has been given of the lithium ion secondary battery in which the anode capacity is expressed based on inserting and extracting lithium ions as a secondary battery type. However, the secondary battery of the present invention is not limited thereto. The present invention is able to be similarly applied to a secondary battery in which the anode capacity includes the capacity associated with inserting and extracting lithium ions and the capacity associated with precipitation and dissolution of lithium, and the anode capacity is expressed by the sum of these capacities, by setting the charge capacity of the anode material capable of inserting and extracting lithium ions to a smaller value than that of the charge capacity of the cathode.

Further, in the foregoing embodiments and the foregoing examples, the description has been given of the case using the electrolytic solution or the gel electrolyte in which an electrolytic solution is held by a polymer compound as an electrolyte of the secondary battery of the invention. However, other type of electrolyte may be used. Examples of other electrolyte include a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte; and a solid electrolyte obtained by mixing an electrolyte salt and an ion conductive polymer compound.

Further, in the foregoing embodiments and the foregoing examples, the description has been given with the specific examples in which the battery structure is the cylindrical type, the laminated film type, or the coin type, and with the specific example in which the battery element has the spirally wound structure. However, the secondary battery of the present invention is able to be similarly applied to a battery having other structure such as a square type battery and a button type battery or a battery in which the battery element has other structure such as a lamination structure.

Further, in the foregoing embodiments and the foregoing examples, the description has been given of the case using lithium (lithium ions) as an electrode reactant. However, as an electrode reactant, other Group 1 element such as sodium and potassium, a Group 2 element such as magnesium and calcium, or other light metal such as aluminum may be used. Since the effect of the present invention is able to be obtained not depending on the type of electrode reactant, similar effect is able to be obtained even if the type of electrode reactant is changed.

Further, in the foregoing embodiments, as an application example of the secondary battery of the present invention, the description has been given of the case that the secondary battery is used as a notebook type personal computer or a digital still camera. However, the secondary battery of the present invention is able to be suitably used as a power source of other electronic device. Examples of other electronic device include a portable electronic device such as a video camera and a mobile phone, an electric power tool such as an electric power driver, and a power source supply system mounted on an electric car, an auto car or the like.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A secondary battery comprising:
   a cathode containing a cathode active material capable of inserting and extracting an electrode reactant;
   an anode containing an anode active material capable of inserting and extracting the electrode reactant; and
   an electrolyte containing a solvent and an electrolyte salt, wherein at least one of the cathode, the anode, and the electrolyte contains a compound shown in Formula (1) or a nitrile compound shown in Formula (2):

[Chemical Formula 1]

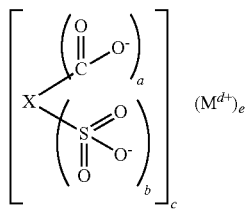

(1)

where x is a group with (a+b) valency having a radical scavenger function, and M is a metal element; where a and b are an integer equal to or more than 0; where c, d, and e are an integer equal to or more than 1; and where (a+b)≥1 is satisfied;

[Chemical formula 2]

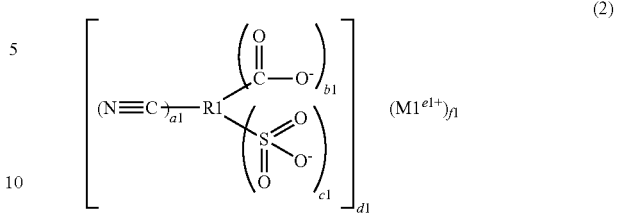

(2)

where R1 is a group with (a1+b1+c1) valency composed of an element selected from the group consisting of hydrogen (H), oxygen (O), and halogen elements and carbon (C); where M1 is a metal element; where a1, d1, f1, and e1 are an integer equal to or more than 1; where b1 and c1 are an integer equal to or more than 0; and where (b1+c1)≥1 is satisfied; wherein the compound shown in the Formula (1) is the compound shown in the Formula (1-1) or the compound shown in the Formula (1-2), and
   the nitrile compound shown in the Formula (2) is the compound shown in the Formula (2-1) or the compound shown in the Formula (2-2):

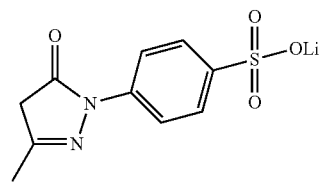

(1-1)

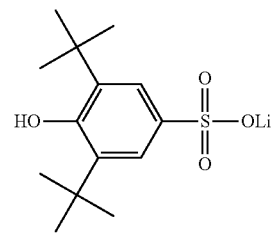

(1-2)

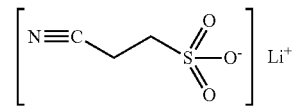

(2-1)

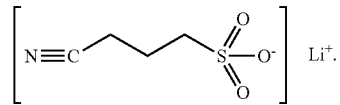

(2-2)

2. The secondary battery according to claim 1, wherein M in the Formula (1) and M1 in the Formula (2) are an alkali metal element or an alkali earth metal element.

3. The secondary battery according to claim 1, wherein the electrode reactant is a lithium ion, and
   M in the Formula (1) and M1 in the Formula (2) are lithium (Li).

4. The secondary battery according to claim 1, wherein the anode has an anode coat on an anode active material layer provided on an anode current collector, and
   the anode coat contains the compound shown in the Formula (1) or the nitrile compound shown in the Formula (2).

5. The secondary battery according to claim 1, wherein the anode active material has at least one of silicon and tin as an element.

6. The secondary battery according to claim 1, wherein the cathode has a cathode coat on a cathode active material layer provided on a cathode current collector, and the cathode coat contains the compound shown in the Formula (1) or the nitrile compound shown in the Formula (2).

7. The secondary battery according to claim 1, wherein the cathode has a cathode active material layer on a cathode current collector, the cathode active material is composed of a plurality of particles, the cathode active material layer contains a particle coating film covering a surface of the cathode active material, and the particle coating film contains the compound shown in the Formula (1) or the nitrile compound shown in the Formula (2).

8. The secondary battery according to claim 1, wherein the electrolyte contains the compound shown in the Formula (1) or the nitrile compound shown in the Formula (2).

\* \* \* \* \*